US011997497B2

(12) United States Patent
Edge

(10) Patent No.: US 11,997,497 B2
(45) Date of Patent: May 28, 2024

(54) SYSTEMS AND METHODS FOR SUPPORTING LOCATION AND COUNTRY DETERMINATION FOR 5G SATELLITE ACCESS

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 17/387,905

(22) Filed: Jul. 28, 2021

(65) Prior Publication Data

US 2022/0046425 A1    Feb. 10, 2022

Related U.S. Application Data

(60) Provisional application No. 63/060,989, filed on Aug. 4, 2020.

(51) Int. Cl.
*H04W 12/63* (2021.01)
*G01S 19/05* (2010.01)
(Continued)

(52) U.S. Cl.
CPC ............. *H04W 12/63* (2021.01); *G01S 19/05* (2013.01); *H04W 12/122* (2021.01);
(Continued)

(58) Field of Classification Search
CPC ... H04W 12/63; H04W 12/122; H04W 60/04; H04W 84/042; H04W 84/06; G01S 19/05
(Continued)

(56) References Cited

U.S. PATENT DOCUMENTS

2004/0259571 A1\* 12/2004 Joshi ..................... H04W 64/00
455/414.2
2007/0182547 A1\* 8/2007 Wachter ................ H04W 4/029
340/539.13
(Continued)

FOREIGN PATENT DOCUMENTS

WO    WO-2020051508 A1    3/2020

OTHER PUBLICATIONS

International Search Report and Written Opinion—PCT/US2021/043772—ISA/EPO dated Dec. 3, 2021.

*Primary Examiner* — Nghi H Ly
(74) *Attorney, Agent, or Firm* — Weaver Austin Villenueve & Sampson LLP

(57) ABSTRACT

Satellite access to a PLMN with a Fifth Generation (5G) core network (5GCN) is supported by a serving satellite NodeB (gNB). The gNB determines or verifies the country in which a user equipment (UE) is located to ensure that the UE is located in the same country as the PLMN. The gNB may determine the country of the UE based on UE measurements from broadcast satellite signals and a positioning ID (PID) broadcast for each radio cell. The PID frequently changes to prevent spoofing. The gNB may use multiple UE measurements from a moving radio cell over a period of time to generate a more accurate location for the UE. The gNB may indicate to a 5GCN whether the country of the UE has been verified. The 5GCN will determine the location and country of the UE if the gNB indicates that the country is not fully verified.

30 Claims, 20 Drawing Sheets

(51) Int. Cl.
*H04W 12/122* (2021.01)
*H04W 60/04* (2009.01)
*H04W 84/04* (2009.01)
*H04W 84/06* (2009.01)

(52) U.S. Cl.
CPC .......... *H04W 60/04* (2013.01); *H04W 84/042* (2013.01); *H04W 84/06* (2013.01)

(58) Field of Classification Search
USPC ....... 455/456.1, 404.2, 422.1, 410, 418, 423
See application file for complete search history.

(56) References Cited

U.S. PATENT DOCUMENTS

2009/0042585 A1* 2/2009 Matsuda ................ G01S 5/021
 455/456.1
2013/0325323 A1* 12/2013 Breed ................ G01C 21/3667
 701/420

* cited by examiner

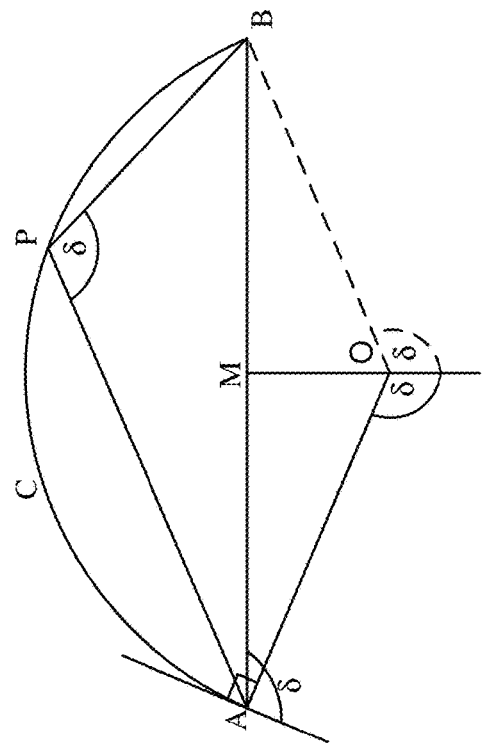
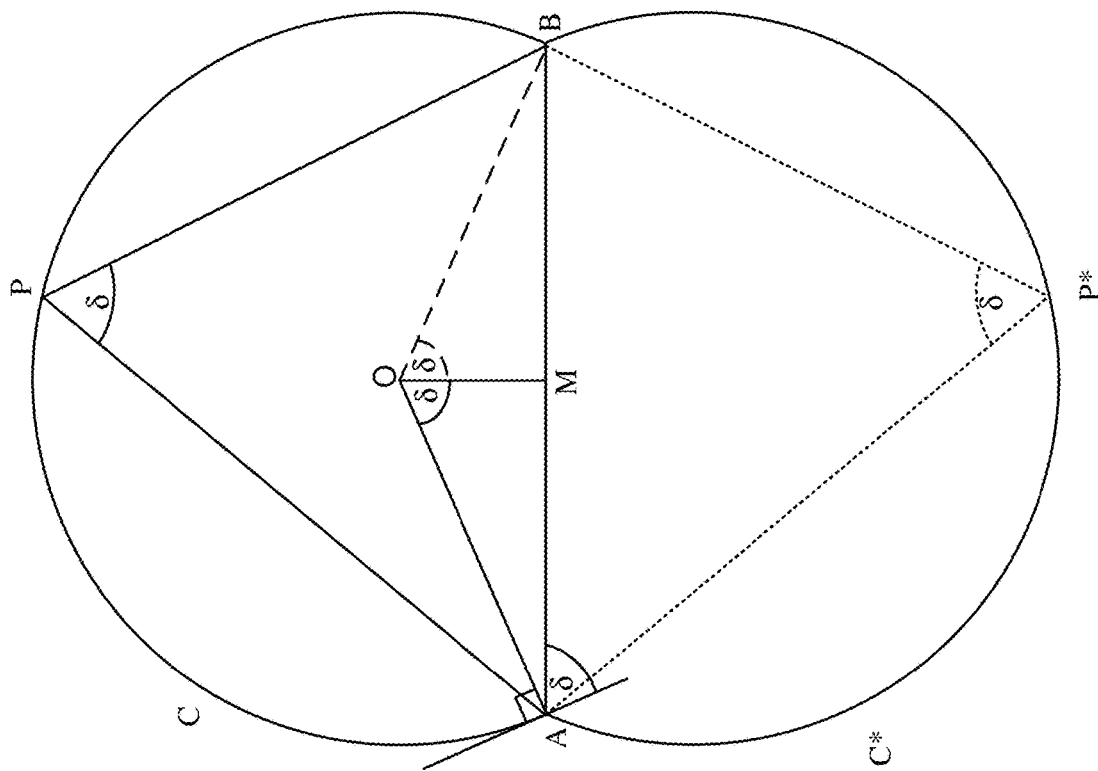
FIG. 7B
FIG. 7A

SYSTEMS AND METHODS FOR SUPPORTING LOCATION AND COUNTRY DETERMINATION FOR 5G SATELLITE ACCESS

CLAIM OF PRIORITY UNDER 35 U.S.C. § 119

This application claims under 35 USC § 119 the benefit of and priority to U.S. Provisional Application No. 63/060,989, filed Aug. 4, 2020, and entitled "SYSTEMS AND METHODS FOR SUPPORTING LOCATION AND COUNTRY DETERMINATION FOR 5G SATELLITE ACCESS," which is assigned to the assignee hereof and is incorporated herein by reference in its entirety.

BACKGROUND

Field of the Disclosure

Various aspects described herein generally relate to wireless communication systems, and more particularly, to accessing a wireless network using communication satellites.

Description of Related Technology

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Standardization is ongoing to combine satellite-based communication systems with terrestrial wireless communications systems, such as 5G New Radio (NR) networks. In such a system, a user equipment (UE) would access a satellite, also referred to as a space vehicle (SV), instead of a base station, which would connect to an earth station, also referred to as a ground station or non-terrestrial (NTN) gateway, which in turn would connect to a 5G network (e.g., directly or via a base station). A 5G network could treat the satellite system as another type of Radio Access Technology (RAT) distinct from, but also similar to, terrestrial 5G NR.

Since satellites typically differ from terrestrial base stations in terms of the size of their coverage areas, movement of coverage areas, longer propagation delays and different carrier frequencies, a 5G satellite RAT may need different implementation and support than a 5G terrestrial RAT for providing common services to end users. It may then be preferable to both optimize, and to minimize the impact for, such different implementation and support.

One example of common services concerns support of regulatory requirements such as emergency (EM) calls, Lawful Interception (LI) and Wireless Emergency Alerting (WEA). Supporting these common services using a satellite RAT should preferably have minimum new impact to a terrestrial 5G Core Network (5GCN) while still provided an equal or better level of service than a terrestrial 5G RAT.

Another common service concerns continuity of radio access by UEs to 5GCNs and to external entities accessed via 5GCNs. Since satellites in low and medium earth orbits have moving coverage areas, radio access by UEs can be subject to interruption. Means of mitigating or avoiding such interruption in an efficient manner may then be useful.

A further type of service concerns an ability to support access by UEs to 5GCNs in the same country as the UEs—e.g. in the case that a satellite coverage area spans an international border. Means to enable same country 5GCN access may then be desirable.

SUMMARY

Satellite access to a public land mobile network (PLMN) with a Fifth Generation (5G) core network (5GCN) is supported by a serving satellite NodeB (gNB). The gNB determines or verifies the country in which a user equipment (UE) is located to ensure that the UE is located in the same country as the PLMN. The gNB may determine the country of the UE based on UE measurements from broadcast satellite signals along with a positioning ID (PID) that is broadcast for each radio cell. The PID frequently changes to prevent spoofing by the UE. The gNB may additionally use multiple UE measurements from a moving radio cell over a period of time to generate a more accurate location for the UE. The gNB may indicate to a 5GCN whether the country of the UE has been verified. The 5GCN will determine the location and country of the UE only if the gNB indicates that the country is not fully verified.

In one implementation, a method performed by a user equipment (UE) for supporting satellite wireless access by the UE to a serving public land mobile network (PLMN), including receiving broadcast signaling from a plurality of communications satellites for a plurality of radio cells supported by the plurality of communications satellites, the broadcast signaling for each radio cell including a positioning identifier (PID), wherein the PID is changed periodically according to a sequence of periodic intervals, wherein the sequence of periodic intervals occur within the lifetime of the each radio cell; obtaining measurements of the broadcast signaling for at least one radio cell of the plurality of radio cells; and sending the measurements and the PID for the at least one radio cell to a satellite NodeB (gNB), wherein the measurements and the PID enable a determination of a location and a country for the UE by the gNB.

In one implementation, a user equipment (UE) configured to support satellite wireless access by the UE to a serving public land mobile network (PLMN), including a wireless transceiver configured to wirelessly communicate with a communication satellite; at least one memory; at least one processor coupled to the wireless transceiver and the at least one memory, wherein the at least one processor is configured to: receive, via the wireless transceiver, broadcast signaling from a plurality of communications satellites for a plurality of radio cells supported by the plurality of communications satellites, the broadcast signaling for each radio cell including a positioning identifier (PID), wherein the PID is changed periodically according to a sequence of periodic intervals, wherein the sequence of periodic intervals occur within the lifetime of the each radio cell; obtain measurements of the broadcast signaling for at least one radio cell of the plurality of radio cells; and send, via the wireless transceiver, the measurements and the PID for the at least one radio cell to a satellite NodeB (gNB), wherein the measurements and the PID enable a determination of a location and a country for the UE by the gNB.

In one implementation, a user equipment (UE) configured to support satellite wireless access by the UE to a serving public land mobile network (PLMN), including means for receiving broadcast signaling from a plurality of communications satellites for a plurality of radio cells supported by the plurality of communications satellites, the broadcast signaling for each radio cell including a positioning identifier (PID), wherein the PID is changed periodically according to a sequence of periodic intervals, wherein the sequence of periodic intervals occur within the lifetime of the each radio cell; means for obtaining measurements of the broadcast signaling for at least one radio cell of the plurality of radio cells; and means for sending the measurements and the PID for the at least one radio cell to a satellite NodeB (gNB), wherein the measurements and the PID enable a determination of a location and a country for the UE by the gNB.

In one implementation, a non-transitory computer-readable storage medium including program code stored thereon, the program code is operable to configure at least one processor in a user equipment (UE) for supporting satellite wireless access by the UE to a serving public land mobile network (PLMN), the program code comprising instructions to receive broadcast signaling from a plurality of communications satellites for a plurality of radio cells supported by the plurality of communications satellites, the broadcast signaling for each radio cell including a positioning identifier (PID), wherein the PID is changed periodically according to a sequence of periodic intervals, wherein the sequence of periodic intervals occur within the lifetime of the each radio cell; obtaining measurements of the broadcast signaling for at least one radio cell of the plurality of radio cells; and sending the measurements and the PID for the at least one radio cell to a satellite NodeB (gNB), wherein the measurements and the PID enable a determination of a location and a country for the UE by the gNB.

In one implementation, a method performed by a satellite NodeB (gNB) for supporting satellite wireless access by a user equipment (UE) to a serving public land mobile network (PLMN), including receiving from the UE measurements of broadcast signaling for a plurality of radio cells and a positioning identifier (PID) for each radio cell of the plurality of radio cells, the broadcast signaling received by the UE from a plurality of communications satellites for the plurality of radio cells, wherein the PID for the each radio cell is changed periodically according to a sequence of periodic intervals, wherein the sequence of periodic intervals occur within the lifetime of the each radio cell; and determining a location and a country for the UE based on the measurements and the PID for the each radio cell.

In one implementation, a satellite NodeB (gNB) configured to support satellite wireless access by a user equipment (UE) to a serving public land mobile network (PLMN), including an external interface configured to communicate with network entities; at least one memory; at least one processor coupled to the external interface and the at least one memory, wherein the at least one processor is configured to: receive, via the external interface, from the UE measurements of broadcast signaling for a plurality of radio cells and a positioning identifier (PID) for each radio cell of the plurality of radio cells, the broadcast signaling received by the UE from a plurality of communications satellites for the plurality of radio cells, wherein the PID for the each radio cell is changed periodically according to a sequence of periodic intervals, wherein the sequence of periodic intervals occur within the lifetime of the each radio cell; and determine a location and a country for the UE based on the measurements and the PID for the each radio cell.

In one implementation, a satellite NodeB (gNB) configured to support satellite wireless access by a user equipment (UE) to a serving public land mobile network (PLMN), including means for receiving from the UE measurements of broadcast signaling for a plurality of radio cells and a positioning identifier (PID) for each radio cell of the plurality of radio cells, the broadcast signaling received by the UE from a plurality of communications satellites for the plurality of radio cells, wherein the PID for the each radio cell is changed periodically according to a sequence of periodic intervals, wherein the sequence of periodic intervals occur within the lifetime of the each radio cell; and means for determining a location and a country for the UE based on the measurements and the PID for the each radio cell.

In one implementation, a non-transitory computer-readable storage medium including program code stored thereon, the program code is operable to configure at least one processor in a satellite NodeB (gNB) for supporting satellite wireless access by a user equipment (UE) to a serving public land mobile network (PLMN), the program code comprising instructions to receive from the UE measurements of broadcast signaling for a plurality of radio cells and a positioning identifier (PID) for each radio cell of the plurality of radio cells, the broadcast signaling received by the UE from a plurality of communications satellites for the plurality of radio cells, wherein the PID for the each radio cell is changed periodically according to a sequence of periodic intervals, wherein the sequence of periodic intervals occur within the lifetime of the each radio cell; and determine a location and a country for the UE based on the measurements and the PID for the each radio cell.

BRIEF DESCRIPTION OF THE DRAWINGS

FIGS. 7A and 7B illustrate the use of differential Angle of Arrival to determine a location of a user equipment (UE).

Figure 1:
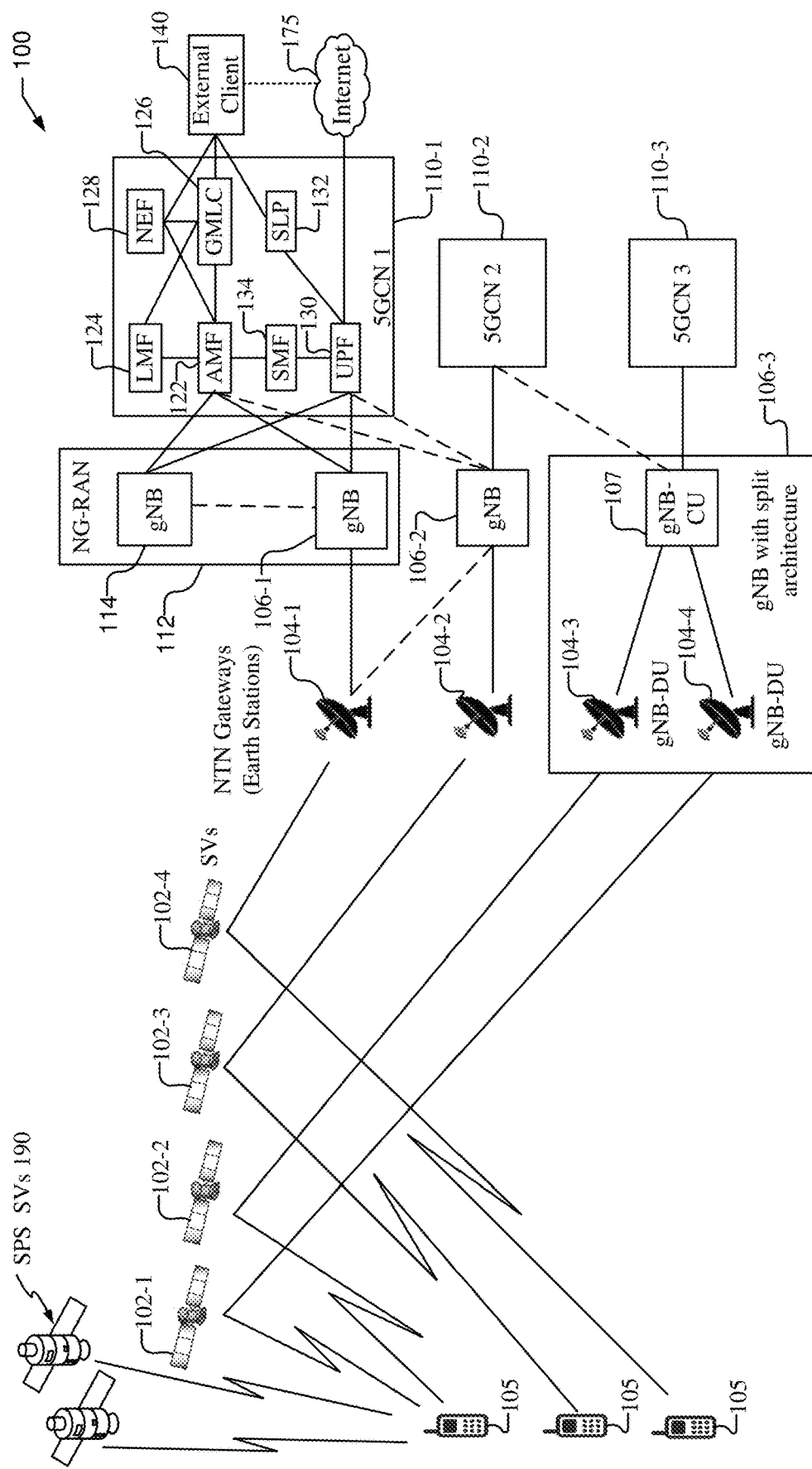
FIG. 1 shows a diagram of a communication system with a network architecture having transparent space vehicles (SVs) that is capable of supporting satellite access to a wireless network.

Like reference symbols in the various drawings indicate like elements, in accordance with certain example implementations. In addition, multiple instances of an element may be indicated by following a first number for the element with a letter or a hyphen and a second number. For example, multiple instances of an element 102 may be indicated as 102-1, 102-2, 102-3 etc. When referring to such an element using only the first number, any instance of the element is to be understood (e.g. element 102 in the previous example would refer to elements 102-1, 102-2, 102-3).

DETAILED DESCRIPTION

Satellites, also referred to as space vehicles (SVs) or communication satellites, may be used in communication systems, for example, using gateways and one or more satellites to relay communication signals between the gateways and one or more UEs. A UE, for example, may access a satellite (instead of a terrestrial base station) which may be connected to an earth station (ES), which is also referred to as a ground station or Non-Terrestrial Network (NTN) Gateway. The earth station in turn would connect to an element in a 5G Network such as a modified base station (without a terrestrial antenna) or a network node in a 5G Core Network (5GCN). This element would in turn provide access to other elements in the 5G Network and ultimately to entities external to the 5G Network such as Internet web servers and other user devices.

A rationale for 5G (or other cellular network) satellite access for UEs may include ubiquitous outdoor coverage for both users and Mobile Network Operators (MNOs). For example, in many countries, including the United States, unavailable or poor cellular coverage is a common problem. Moreover, cellular access is not always possible even when there is normally good cellular coverage. For example, cellular access may be hampered due to congestion, physical obstacles, a local cellular outage caused by weather (e.g. a hurricane or tornado), or a local power outage. Satellite access to cellular networks could provide a new independent access potentially available everywhere outdoors. Current satellite capable phones for low Earth orbit (LEO) SVs may be of similar size to a cellular smartphone and, thus, mobile NR support with satellite capable phones need not produce a significant increase in the size of phones. Moreover, satellite capable smartphones may help drive handset sales, and may add revenue for carriers. Potential users, for example, may include anyone with limited or no cellular access, anyone wanting a backup to a lack of cellular access, and anyone involved in public safety or who otherwise needs (nearly) 100% reliable mobile communication. Additionally, some users may desire an improved or more reliable E911 service, e.g., for a medical emergency or vehicle trouble in remote areas.

The use of 5G satellite access may provide other benefits. For example, 5G satellite access may reduce Mobile Network Operator (MNO) infrastructure cost. For example, an MNO may use satellite access to reduce terrestrial base stations, such as NR NodeBs, also referred to as gNBs, and backhaul deployment in sparsely populated areas. Further, 5G satellite access may be used to overcome internet blockage, e.g., in certain countries. Additionally, 5G satellite access may provide diversification to Space Vehicle Operators (SVOs). For example, 5G NR satellite access could provide another revenue stream to SVOs who would otherwise provide fixed Internet access.

In order to enable 5G satellite access by a UE to a public land mobile network (PLMN), it may be necessary (e.g. due to national regulatory requirements) to enable the PLMN to determine or verify a country in which the UE is located during 5G satellite access to ensure that the UE is located in the same country as the PLMN. It may then be desirable that the network, rather than the UE, perform this determination or verification, as the UE may not be trusted to perform a reliable determination. For example, a user who is subject to regulatory services, such as being a target of lawful interception (LI), might use 5G satellite access to gain access to a PLMN in another country where lawful interception is not in effect. Access to PLMNs in another country may be possible by a UE because the radio beam coverage of a low Earth orbit (LEO) or medium Earth orbit (MEO) satellite may be up to or more than 1000 kms across and thereby provide access to more than one country. As a consequence, due to regulatory services, such as LI, as well as for emergency calls and wireless emergency alerting, it may be desirable or required that a UE always access a PLMN that is in the same country as the UE, with the network, rather than UE, verifying this condition. Additionally, due to signaling and overhead considerations, it may also be preferred that the Next Generation (NG) Radio Access Network (RAN) (NG-RAN), rather than the 5GCN, perform the location and country determination for the UE. Accordingly, efficient and reliable methods to support network, and particularly, NG-RAN, verification of UE country are desirable.

FIG. 1 shows a diagram of a communication system 100 capable of supporting satellite access using 5G New Radio (NR) or some other wireless access type such as Code Division Multiple Access (CDMA), according to an embodiment. FIG. 1 illustrates a network architecture with transparent space vehicles (SVs). A transparent SV may implement frequency conversion and a radio frequency (RF) amplifier in both uplink (UL) and downlink (DL) directions and may correspond to an analog RF repeater. A transparent SV, for example, may receive uplink (UL) signals from all served UEs and may redirect the combined signals DL to an earth station without demodulating or decoding the signals. Similarly, a transparent SV may receive an UL signal from an earth station and redirect the signal DL to served UEs without demodulating or decoding the signal. However, the SV may frequency convert received signals and may amplify and/or filter received signals before transmitting the signals.

The communication system 100 comprises a number of UEs 105, a number of SVs 102-1 to 102-4 (collectively referred to herein as SVs 102), a number of Non-Terrestrial Network (NTN) gateways 104-1 to 104-4 (collectively referred to herein as NTN gateways 104) (sometimes referred to herein simply as gateways 104, earth stations 104, or ground stations 104), a number of satellite NodeBs (gNBs) 106-1 to 106-3 (collectively referred to herein as gNBs 106) capable of communication with UEs via SVs 102 and that are part of a Next Generation (NG) Radio Access Network (RAN) (NG-RAN) 112.

It is noted that the term "gNB" traditionally refers to an NR NodeB base station used for terrestrial access with a New Radio (NR) radio interface. The same term (gNB) may also be used to refer to a base station supporting satellite access with an NR radio interface. The two variants of gNB (satellite and terrestrial) may support many of the same functions, protocols and interfaces, but are also distinct in other ways. To distinguish gNBs supporting terrestrial access from gNBs supporting satellite access, different labels are used herein. A gNB could also support both terrestrial and satellite NR access, though, for simplification, this is not further discussed here.

The communication system 100 is illustrated as further including components of a number of Fifth Generation (5G) networks including 5G Core Networks (5GCNs) 110-1 to 110-3 (collectively referred to herein as 5GCNs 110). The 5GCNs 110 may be public land mobile networks (PLMN) that may be located in the same or in different countries. FIG. 1 illustrates various components within 5GCN1 110-1 that may operate with the NG-RAN 112. It should be understood that 5GCN2 110-2 and 5GCN3 110-3 may include identical, similar or different components and associated NG-RANs, which are not illustrated in FIG. 1 in order to avoid unnecessary obfuscation. A 5G network may also be referred to as a New Radio (NR) network; NG-RAN 112 may be referred to as a 5G RAN or as an NR RAN; and 5GCN 110 may be referred to as an NG Core network (NGC). The communication system 100 may further utilize information from space vehicles (SVs) 190 for Satellite Positioning System (SPS) including Global Navigation Satellite Systems (GNSS) like Global Positioning System (GPS), GLObal NAvigation Satellite System (GLONASS), Galileo or Beidou or some other local or regional SPS, such as Indian Regional Navigation Satellite System (IRNSS), European Geostationary Navigation Overlay Service (EGNOS), or Wide Area Augmentation System (WAAS), all of which are sometimes referred to herein as GNSS. It is noted that SVs 190 act as navigation SVs and are separate and distinct from SVs 102, which act as communication SVs. However, it is not precluded that some of SVs 190 may also act as some of SVs 102 and/or that some of SVs 102 may also act as some of SVs 190. In some implementations, for example, the SVs 102 may be used for both communication and positioning. Additional components of the communication system 100 are described below. The communication system 100 may include additional or alternative components.

Permitted connections in the communication system 100 having the network architecture with transparent SVs illustrated in FIG. 1, allow a gNB 106 to access multiple Earth stations 104 and/or multiple SVs 102. A gNB 106, e.g., illustrated by gNB 106-2, may also be shared by multiple PLMNs (5GCNs 110), which may all be in the same country or possibly in different countries, and an Earth station 104, e.g., illustrated by Earth station 104-1, may be shared by more than one gNB 106.

It should be noted that FIG. 1 provides only a generalized illustration of various components, any or all of which may be utilized as appropriate, and each of which may be duplicated or omitted, as necessary. Specifically, although only three UEs 105 are illustrated, it will be understood that many UEs (e.g., hundreds, thousands, millions, etc.) may utilize the communication system 100. Similarly, the communication system 100 may include a larger (or smaller) number of SVs 190, SVs 102, earth stations 104, gNBs 106, NG-RAN 112, gNBs 114, 5GCNs 110, external clients 140, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, 4G Long Term Evolution (LTE), etc.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 140), etc. The UE 105 may also support wireless communication using a Wireless Local Area Network (WLAN) which may connect to other networks (e.g. the Internet) using a Digital Subscriber Line (DSL) or packet cable for example. The UE 105 further supports wireless communications using space vehicles, such as SVs 102. The use of one or more of these RATs may allow the UE 105 to communicate with an external client 140 (via elements of 5GCN 110 not shown in FIG. 1, or possibly via a Gateway Mobile Location Center (GMLC) 126).

The UE 105 may include a single entity or may include multiple entities such as in a personal area network where a user may employ audio, video and/or data I/O devices and/or body sensors and a separate wireline or wireless modem.

The UE 105 may support position determination, e.g., using signals and information from space vehicles 190 in an SPS, such as GPS, GLONASS, Galileo or Beidou or some other local or regional SPS such as IRNSS, EGNOS or WAAS, all of which may be generally referred to herein as GNSS. Position measurements using SPS are based on measurements of propagation delay times of SPS signals broadcast from a number of orbiting satellites to a SPS receiver in the UE 105. Once the SPS receiver has measured the signal propagation delays for each satellite, the range to each satellite can be determined and precise navigation information including 3-dimensional position, velocity and time of day of the SPS receiver can then be determined using the measured ranges and the known locations of the satellites. Positioning methods which may be supported using SVs 190 may include Assisted GNSS (A-GNSS), Real Time Kinematic (RTK), Precise Point Positioning (PPP) and Differential GNSS (DGNSS). Information and signals from SVs 102 may also be used to support positioning. The UE 105 may further support positioning using terrestrial positioning methods, such as Downlink (DL) Time Difference of Arrival (DL-TDOA), Enhanced Cell ID (ECID), Round Trip signal propagation Time (RTT), multi-cell RTT, angle of arrival (AOA), angle of departure (AOD), time of arrival (TOA), receive-transmit transmission-time difference (RxTx) and/or other positioning methods. It is noted that the terms "position method" and "positioning method" can be synonymous and can be used interchangeably.

An estimate of a location of the UE 105 may be referred to as a geodetic location, location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

The UEs 105 are configured to communicate with 5GCNs 110 via the SVs 102, earth stations 104, and gNBs 106. As illustrated by NG-RAN 112, the NG-RANs associated with the 5GCNs 110 may include one or more gNBs 106. The NG-RAN 112 may further include a number of terrestrial gNBs, as exemplified by gNB 114, that are not capable of communication with UEs via SVs 102. Pairs of terrestrial and/or satellite base stations, e.g., gNB 114 and gNB 106-1 in NG-RAN 112, may be connected to one another using terrestrial links—e.g. directly or indirectly via other gNBs 114 or gNBs 106 and communicate using an Xn interface. Access to the 5G network is provided to UEs 105 via wireless communication between each UE 105 and a serving gNB 106, via an SV 102 and an earth station 104. The gNBs 106 may provide wireless communications access to the 5GCN 110 on behalf of each UE 105 using 5G NR. 5G NR radio access may also be referred to as NR radio access or as 5G radio access and may be as defined by the Third Generation Partnership Project (3GPP).

Base stations (BSs) in the NG-RAN 112 shown in FIG. 1 may also or instead include a next generation evolved Node B, also referred to as an ng-eNB. An ng-eNB may be connected to one or more gNBs 106 and/or gNBs 114 in NG-RAN 112—e.g. directly or indirectly via other gNBs 106, gNBs 114 and/or other ng-eNBs. An ng-eNB may provide LTE wireless access and/or evolved LTE (eLTE) wireless access to a UE 105.

A satellite NodeB (gNB 106) may be referred to by other names or terms such as an sNB or a "satellite node" or "satellite access node." The gNBs 106 are not the same as terrestrial gNB 114, but may be based on a terrestrial gNB 114 with additional capability. For example, a gNB 106 may terminate the radio interface and associated radio interface protocols to UEs 105 and may transmit DL signals to UEs 105 and receive UL signals from UEs 105 via SVs 102 and earth stations 104. An gNB 106 may also support signaling connections and voice and data bearers to UEs 105 and may support handover of UEs 105 between different radio cells for the same SV 102, between different SVs 102 and/or between different gNBs 106. In some systems, a gNB 106 may be referred to as a gNB or as an enhanced gNB. The gNBs 106 may be configured to manage moving radio beams (for LEO SVs) and associated mobility of UEs 105. The gNBs 106 may assist in the handover (or transfer) of SVs 102 between different Earth stations 104, different gNBs 106, and between different countries. The gNBs 106 may hide or obscure specific aspects of connected SVs 102 from the 5GCN 110, e.g. by interfacing to a 5GCN 110 in the same way or in a similar way to a gNB 114, and may avoid a 5GCN 110 from having to maintain configuration information for SVs 102 or perform mobility management related to SVs 102. The gNBs 106 may further assist in sharing of SVs 102 over multiple countries. The gNBs 106 may communicate with one or more earth stations 104, e.g., as illustrated by gNB 106-2 communicating with earth stations 104-2 and 104-1. The gNBs 106 may be separate from earth stations 104, e.g., as illustrated by gNBs 106-1 and 106-2, and earth stations 104-1 and 104-2. The gNBs 106 may include or may be combined with one or more earth stations 104, e.g., using a split architecture. For example, gNB 106-3 is illustrated with a split architecture, with a gNB central unit (gNB-CU) 107 and the earth stations 104-3 and 104-4 acting as Distributed Units (DUs) (which may sometimes be referred to as gNB-DU 104-3 and gNB-DU 104-4). An gNB 106 may typically be fixed on the ground with transparent SV operation. In one implementation, one gNB 106 may be physically combined with, or physically connected to, one earth station 104 to reduce complexity and cost.

The earth stations 104 may be shared by more than one gNB 106 and may communicate with UE 105 via the SVs 102. An earth station 104 may be dedicated to just one SVO and to one associated constellation of SV 102 and hence may be owned and managed by the SVO. While earth stations 104 may be included within a gNB 106, e.g., as a gNB-DU within gNB 106-3, this may only occur when the same SVO or the same MNO owns both the gNB 106 and the included earth stations 104. Earth stations 104 may communicate with SVs 102 using control and user plane protocols that may be proprietary to an SVO. The control and user plane protocols between earth stations 104 and SVs 102 may: (i) establish and release Earth Station 104 to SV 102 communication links, including authentication and ciphering; (ii) update SV software and firmware; (iii) perform SV Operations and Maintenance (O&M); (iv) control radio beams (e.g., direction, power, on/off status) and mapping between radio beams and earth station uplink (UL) and downlink (DL) payload; and (v) assist with handoff of an SV 102 or radio cell to another Earth station 104.

As noted, while FIG. 1 depicts nodes configured to communicate according to 5G NR and LTE communication protocols for an NG-RAN 112, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 112 and the EPC corresponds to 5GCN 110 in FIG. 1. The methods and techniques described herein for support of a RAN location server function may be applicable to such other networks.

The gNBs 106 and gNBs 114 may communicate with an Access and Mobility Management Function (AMF) 122 in a 5GCN 110, which, for positioning functionality, may communicate with a Location Management Function (LMF) 124. For example, the gNBs 106 may provide an N2 interface to the AMF 122. An N2 interface between a gNB 106 and a 5GCN 110 may be the same as an N2 interface supported between a gNB 114 and a 5GCN 110 for terrestrial NR access by a UE 105 and may use the Next Generation Application Protocol (NGAP) defined in 3GPP Technical Specification (TS) 38.413 between a gNB 106 and the AMF 122. The AMF 122 may support mobility of the UE 105, including radio cell change and handover and may participate in supporting a signaling connection to the UE 105 and possibly data and voice bearers for the UE 105. The LMF 124 may support positioning of the UE 105 when UE accesses the NG-RAN 112 and may support position procedures/methods such as A-GNSS, DL-TDOA, RTK, PPP, DGNSS, ECID, AOA, AOD, multi-cell RTT and/or other positioning procedures including positioning procedures based on communication signals from one or more SVs 102. The LMF 124 may also process location services requests for the UE 105, e.g., received from the AMF 122 or from a Gateway Mobile Location Center (GMLC) 126. The LMF 124 may be connected to AMF 122 and/or to GMLC 126. In some embodiments, a node/system that implements the LMF 124 may additionally or alternatively implement other types of location-support modules, such as an Enhanced Serving Mobile Location Center (E-SMLC). It is noted that in some embodiments, at least part of the positioning functionality (including derivation of a location of UE 105) may be performed at the UE 105 (e.g., using signal measurements obtained by UE 105 for signals transmitted by SVs 102, SVs 190, gNBs 114 and assistance data provided to the UE 105, e.g. by LMF 124).

The GMLC 126 may support a location request for the UE 105 received from an external client 140 and may forward such a location request to the AMF 122 for forwarding by the AMF 122 to the LMF 124 or may forward the location request directly to the LMF 124. A location response from the LMF 124 (e.g. containing a location estimate for the UE 105) may be similarly returned to the GMLC 126 either directly or via the AMF 122, and the GMLC 126 may then return the location response (e.g., containing the location estimate) to the external client 140. The GMLC 126 is shown connected to both the AMF 122 and LMF 124 in FIG. 1 though only one of these connections may be supported by 5GCN 110 in some implementations.

A Network Exposure Function (NEF) 128 may be included in 5GCN 110, e.g., connected to the GMLC 126 and the AMF 122. In some implementations, the NEF 128 may be connected to communicate directly with the external client 140. The NEF 128 may support secure exposure of capabilities and events concerning 5GCN 110 and UE 105 to an external client 140 and may enable secure provision of information from external client 140 to 5GCN 110.

A User Plane Function (UPF) 130 may support voice and data bearers for UE 105 and may enable UE 105 voice and data access to other networks such as the Internet 175. The UPF 130 may be connected to gNBs 106 and gNBs 114. UPF 130 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 130 may be connected to a Secure User Plane Location (SUPL) Location Platform (SLP) 132 to enable support of positioning of UE 105 using SUPL. SLP 132 may be further connected to or accessible from external client 140.

As illustrated, a Session Management Function (SMF) 134 connects to the AMF 122 and the UPF 130. The SMF 134 may have the capability to control both a local and a central UPF within a PDU session. SMF 134 may manage the establishment, modification and release of PDU sessions for UE 105, perform IP address allocation and management for UE 105, act as a Dynamic Host Configuration Protocol (DHCP) server for UE 105, and select and control a UPF 130 on behalf of UE 105.

The external client 140 may be connected to the core network 110 via the GMLC 126 and/or the SLP 132, and/or NEF 128. The external client 140 may optionally be connected to the core network 110 and/or to a location server, which may be, e.g., an SLP, that is external to 5GCN 110, via the Internet 175. The external client 140 may be connected to the UPF 130 directly (not shown in FIG. 1) or through the Internet 175. The external client 140 may be a server, a web server, or a user device, such as a personal computer, a UE, etc.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GCN 110 may be configured to control different air interfaces. For example, in some embodiments, 5GCN 110 may be connected to a WLAN, either directly or using a Non-3GPP InterWorking Function (N3IWF, not shown FIG. 1) in the 5GCN 110. For example, the WLAN may support IEEE 802.11 WiFi access for UE 105 and may comprise one or more WiFi APs. Here, the N3IWF may connect to the WLAN and to other elements in the 5GCN 110 such as AMF 122.

Support of transparent SVs with the network architecture shown in FIG. 1 may impact the communication system as follows. The 5GCN 110 may treat a satellite RAT as a new type of terrestrial RAT with longer delay, reduced bandwidth and higher error rate. Consequently, while there may be some impact to Protocol Data Unit (PDU) session establishment and mobility management (MM) and connection management (CM) procedures. Impacts to an AMF 122 (or LMF 124) may be small—e.g. such as providing pre-configured data for fixed tracking areas (TAs) and cells to a UE 105 during Registration. There may be no impact to the SVs 102. The SVs 102 may be shared with other services (e.g. satellite TV, fixed Internet access) with 5G NR mobile access for UEs added in a transparent manner. This may enable legacy SVs 102 to be used and may avoid the need to deploy a new type of SV 102. Further, the gNBs 106 may be fixed and may be configured to support one country and one or more PLMNs in that country. The gNBs 106 may need to assist assignment and transfer of SVs 102 and radio cells between gNBs 106 and earth stations 104 and support handover of UEs 105 between radio cells, SVs 102 and other gNBs 106. Thus, the gNB 106 may differ from a terrestrial gNB 114. Additionally, a coverage area of a gNB 106 may be much larger than the coverage area of a gNB 114.

In some implementations, the radio beam coverage of an SV 102 may be large, e.g., up to or greater than 1000 kms across, and may provide access to more than one country. An earth station 104 may be shared by multiple gNBs (e.g., earth station 104-1 may be shared by gNBs 106-1 and 106-2), and a gNB 106 may be shared by multiple core networks in separate PLMNs located in the same country or in different countries (e.g., gNB 106-2 may be shared by 5GCN1 110-1 and 5GCN2 110-1, which may be in different PLMNs in the same country or in different countries).

Figure 2:
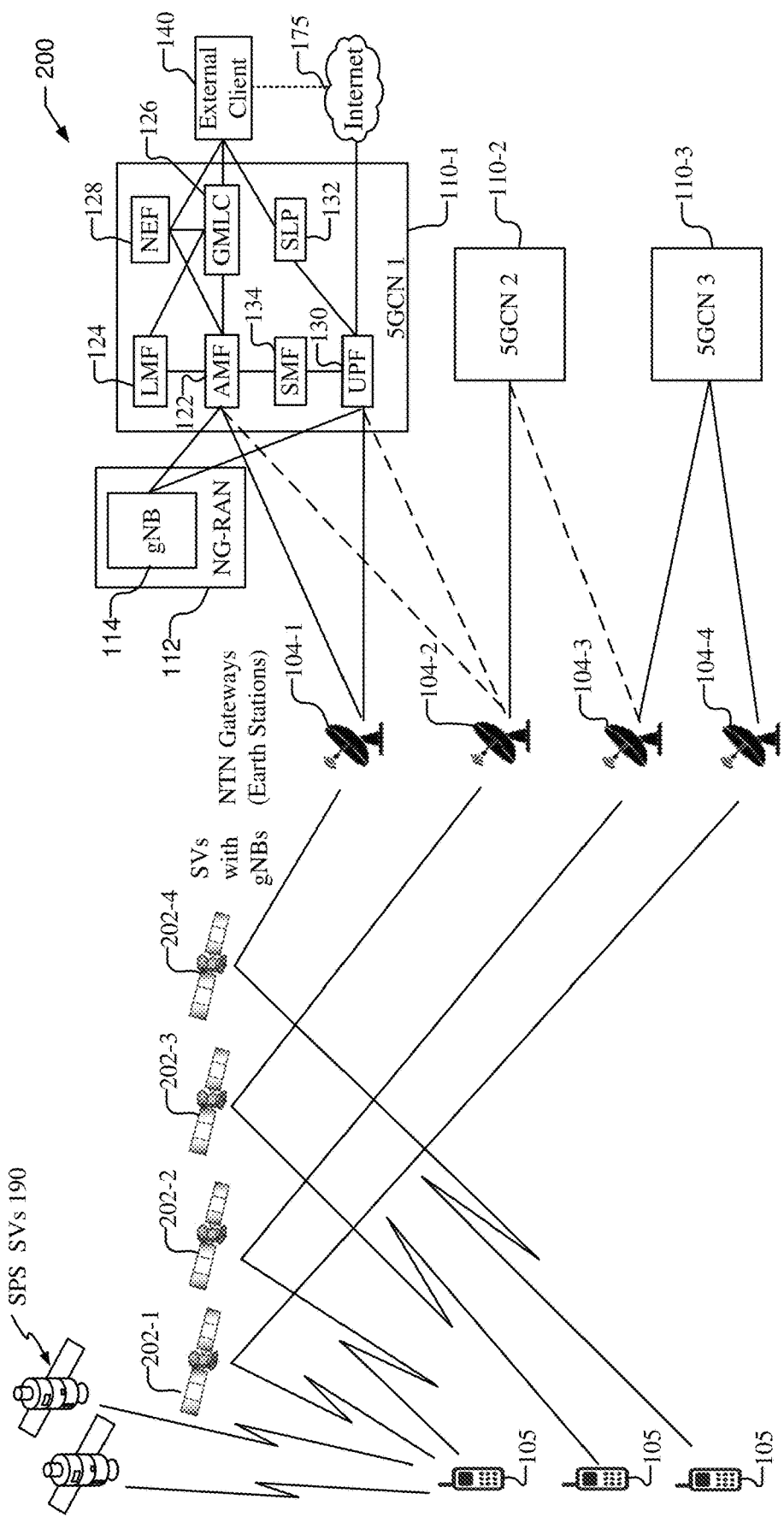
FIG. 2 shows a diagram of a communication system with a network architecture having regenerative SVs that is capable of supporting satellite access to a wireless network.

FIG. 2 shows a diagram of a communication system 200 capable of supporting satellite access using 5G New Radio (NR) or some other wireless access type such as Code Division Multiple Access (CDMA), according to an embodiment. The network architecture shown in FIG. 2 is similar to that shown in FIG. 1, like designated elements being similar or the same. FIG. 2, however, illustrates a network architecture with regenerative SVs 202-1, 202-2, 202-3, and 202-4 (collectively SVs 202), as opposed to transparent SVs 102 shown in FIG. 1. A regenerative SV 202, unlike a transparent SV 102, includes an on-board satellite NodeB, referred to as a gNB 202, which may include the functional capability of a gNB 106, and is sometimes referred to herein as an SV/gNB 202. The NG-RAN 112 is illustrated as including the SV/gNBs 202. Reference to a gNB 202 is used herein when referring to SV/gNB 202 functions related to communication with UEs 105 and 5GCNs 110, whereas reference to an SV 202 is used when referring to SV/gNB 202 functions related to communication with earth stations 104 and with UEs 105 at a physical radio frequency level. However, there may be no precise delimitation of an SV 202 versus a gNB 202.

An onboard gNB 202 may perform some or all of the same functions as a gNB 106 as described previously. For example, a gNB 202 may terminate the radio interface and associated radio interface protocols to UEs 105 and may transmit DL signals to UEs 105 and receive UL signals from UEs 105, which may include encoding and modulation of transmitted signals and demodulation and decoding of received signals. A gNB 202 may also support signaling connections and voice and data bearers to UEs 105 and may support handover of UEs 105 between different radio cells for the same gNB 202 and between different gNBs 202. The gNBs 202 may assist in the handover (or transfer) of SVs 202 between different Earth stations 104, different 5GCNs 110, and between different countries. The gNBs 202 may hide or obscure specific aspects of SVs 202 from the 5GCN 110, e.g. by interfacing to a 5GCN 110 in the same way or in a similar way to a gNB 114. The gNBs 202 may further assist in sharing of SVs 202 over multiple countries. The gNBs 202 may communicate with one or more earth stations 104 and with one or more 5GCNs 110 via the earth stations 104. In some implementations, gNBs 202 may communicate directly with other gNBs 202 using Inter-Satellite Links (ISLs) (not shown in FIG. 2), which may support an Xn interface between any pair of gNBs 202.

With LEO SVs, an SV/gNB 202 needs to manage moving radio cells with coverage in different countries at different times. Earth stations 104 may be connected directly to the 5GCN 110, as illustrated. For example, as illustrated, earth station 104-1 may be connected to AMF 122 and UPF 130 of 5GCN1 110-1, while earth station 104-2 may be similarly connected to 5GCN2 110-2, and earth stations 104-3 and 104-4 are connected to 5GCN3 110-3. The earth stations 104 may be shared by multiple 5GCNs 110, for example, if Earth stations 104 are limited. For example, in some implementations (illustrated with dotted lines), earth station 104-2 may be connected to both 5GCN1 110-1 and 5GCN2 110-2, and earth station 104-3 may be connected to both 5GCN2 110-2 and 5GCN3 110-3. The 5GCN 110 may need to be aware of SV 202 coverage areas in order to page UEs 105 and to manage handover. Thus, as can be seen, the network architecture with regenerative SVs may have more impact and complexity with respect to both gNBs 202 and 5GCNs 110 than the network architecture with transparent SVs 102 shown in FIG. 1.

Support of regenerative SVs with the network architecture shown in FIG. 2 may impact the communication system 200 as follows. The 5GCN 110 may be impacted if fixed TAs and cells are not supported, since core components of mobility management and regulatory services, which are typically based on fixed cells and fixed TAs for terrestrial PLMNs, might have to be replaced by a new system (e.g. based on UE 105 location). If fixed TAs and fixed cells are supported, a 5GCN 110 (e.g. the AMF 122) may need to map any fixed TA to one or SVs 202 with current radio coverage of the TA when performing paging of a UE 105 that is located in this TA. This could require configuration in the 5GCN 110 of long term orbital data for SVs 202 (e.g. obtained from an SVO for SVs 202) and could add significant new impact to a 5GCN 110.

Legacy SVs would need a substantial software (SW) update to support gNB 202 functions, which may not be feasible. An SV 202 would also need to fully support all UEs 105 accessing the SV 202, which could be problematic with a legacy SV due to limited processing and storage capability. Hence, an SV 202 would probably need to comprise new hardware (HW) and SW rather than being based on a SW upgrade to an existing SV. A new SV/gNB 202 may need to support regulatory and other requirements for multiple countries. A GEO SV 202 coverage area would typically include several or many countries, whereas a LEO or medium earth orbit (MEO) SV 202 would typically orbit over many countries. Support of fixed TAs and fixed cells may then require that a SV/gNB 202 be configured with fixed TAs and fixed cells for an entire worldwide coverage area. Alternatively, AMFs 122 (or LMFs 124) in individual 5GCNs 110 could support fixed TAs and fixed cells for the associated PLMN to reduce SV/gNB 202 complexity and at the expense of more 5GCN 110 complexity. Additionally, SV/gNB 202 to SV/gNB 202 ISLs would typically change dynamically as relative SV/gNB 202 positions change, making Xn related procedures more complex.

Figure 3:
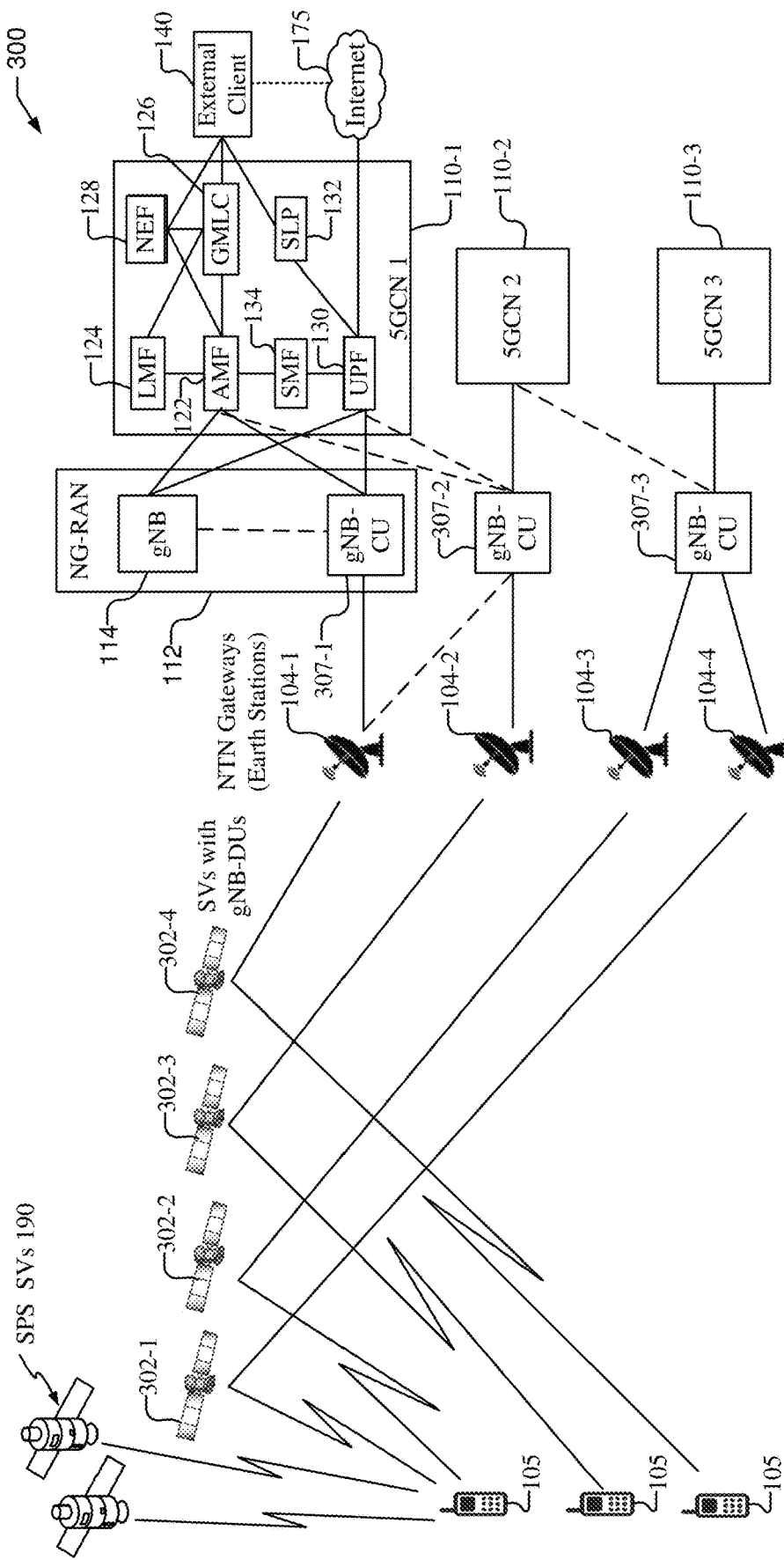
FIG. 3 shows a diagram of a communication system with a network architecture having regenerative SVs and a split satellite Node B (gNB) architecture that is capable of supporting satellite access to a wireless network.

FIG. 3 shows a diagram of a communication system 300 capable of supporting satellite access using 5G New Radio (NR) or some other wireless access type such as Code Division Multiple Access (CDMA), according to an embodiment. The network architecture shown in FIG. 3 is similar to that shown in FIGS. 1 and 2, like designated elements being similar or the same. FIG. 3, however, illustrates a network architecture with regenerative SVs 302-1, 302-2, 302-3, and 302-4 (collectively referred to as SVs 302), as opposed to transparent SVs 102 shown in FIG. 1, and with a split architecture for the satellite NodeBs. The satellite NodeBs, referred to as gNBs 307, include a central unit and may sometimes be referred as gNB-CU 307, and a regenerative SV 302, unlike a transparent SV 102, includes an on-board gNB Distributed Unit (gNB-DU) 302, and is sometimes referred to herein as an SV/gNB-DU 302. Reference to a gNB-DU 302 is used herein when referring to SV/gNB 302 functions related to communication with UEs 105 and gNB-CUs 307, whereas reference to an SV 302 is used when referring to SV/gNB-DU 302 functions related to communication with earth stations 104 and with UEs 105 at a physical radio frequency level. However, there may be no precise delimitation of an SV 302 versus a gNB-DU 302.

Each gNB-DU 302 communicates with one ground based gNB-CU 307 via one or more earth stations 104. One gNB-CU 307 together with the one or more gNB-DUs 302 which are in communication with the gNB-CU 307 performs functions, and may use internal communication protocols, which are similar to or the same as a gNB with a split architecture as described in 3GPP TS 38.401. Here a gNB-DU 302 corresponds to and performs functions similar to or the same as a gNB Distributed Unit (gNB-DU) defined in TS 38.401, while a gNB-CU 307 corresponds to and performs functions similar to or the same as a gNB Central Unit (gNB-CU) defined in TS 38.401. For example, a gNB-DU 302 and a gNB-CU 307 may communicate with one another using an F1 Application Protocol (F1AP) as defined in 3GPP TS 38.473 and together may perform some or all of the same functions as a gNB 106 or gNB 202 as described previously. To simplify references to different types of gNB is the description below, a gNB-DU 302 may sometimes be referred to a gNB 302 (without the "DU" label), and a gNB-CU 307 may sometimes be referred to a gNB 307 (without the "CU" label).

An gNB-DU 302 may terminate the radio interface and associated lower level radio interface protocols to UEs 105 and may transmit DL signals to UEs 105 and receive UL signals from UEs 105, which may include encoding and modulation of transmitted signals and demodulation and decoding of received signals. An gNB-DU 302 may support and terminate Radio Link Control (RLC), Medium Access Control (MAC) and Physical (PHY) protocol layers for the NR Radio Frequency (RF) interface to UEs 105, as defined in 3GPP TSs 38.201, 38.202, 38.211, 38.212, 38.213, 38.214, 38.215, 38.321 and 38.322. The operation of a gNB-DU 302 is partly controlled by the associated gNB-CU 307. One gNB-DU 307 may support one or more NR radio cells for UEs 105. An gNB-CU 307 may support and terminate a Radio Resource Control (RRC) protocol, Packet Data Convergence Protocol (PDCP) and Service Data Protocol (SDAP) for the NR RF interface to UEs 105, as defined in 3GPP TSs 38.331, 38.323, and 37.324, respectively. An gNB-CU 307 may also be split into separate control plane (gNB-CU-CP) and user plane (gNB-CU-UP) portions, where a gNB-CU-CP communicates with one or more AMFs 122 in one more 5GCNs 110 using the NGAP protocol and where a gNB-CU-UP communicates with one or more UPFs 130 in one more 5GCNs 110 using a General Packet Radio System (GPRS) tunneling protocol (GTP) user plane protocol (GTP-U) as defined in 3GPP TS 29.281. An gNB-DU 302 and gNB-CU 307 may communicate over an F1 interface to (a) support control plane signaling for a UE 105 using Internet Protocol (IP), Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

An gNB-CU 307 may communicate with one or more other gNB-CUs 307 and/or with one more other gNBs 114 using terrestrial links to support an Xn interface between any pair of gNB-CUs 302 and/or between any gNB-CU 307 and any gNB 114.

An gNB-DU 302 together with a gNB-CU 307 may: (i) support signaling connections and voice and data bearers to UEs 105; (ii) support handover of UEs 105 between different radio cells for the same gNB-DU 302 and between different gNB-DUs 302; and (iii) assist in the handover (or transfer) of SVs 302 between different Earth stations 104, different 5GCNs 110, and between different countries. An gNB-CU 307 may hide or obscure specific aspects of SVs 302 from a 5GCN 110, e.g. by interfacing to a 5GCN 110 in the same way or in a similar way to a gNB 114. The gNB-CUs 307 may further assist in sharing of SVs 302 over multiple countries.

In communication system 300, the gNB-DUs 302 that communicate with and are accessible from any gNB-CU 307 will change over time with LEO SVs 302. With the split gNB architecture, a 5GCN 110 may connect to fixed gNB-CUs 307 which do not change over time and which may reduce difficulty with paging of a UE 105. For example, a 5GCN 110 may not need to know which SV/gNB-DUs 302 are needed for paging a UE 105. The network architecture with regenerative SVs 302 with a split gNB architecture may thereby reduce 5GCN 119 impact at the expense of additional impact to a gNB-CU 307.

Support of regenerative SVs 302 with a split gNB architecture as shown in FIG. 3 may impact the communication system 300 as follows. The impact to 5GCN 110 may be limited as for transparent SVs 102 discussed above. For example, the 5GCN 110 may treat a satellite RAT in communication system 300 as a new type of terrestrial RAT with longer delay, reduced bandwidth and higher error rate. The impact on SV/gNB-DUs 302 may be less than the impact on SV/gNBs 202 (with non-split architecture), as discussed above in reference to FIG. 2. The SV/gNB-DU 302 may need to manage changing association with different (fixed) gNB-CUs 307. Further, an SV/gNB-DU 302 may need to manage radio beams and radio cells. The gNB-CU 307 impacts may be similar to gNB 106 impacts for a network architecture with transparent SVs 102, as discussed above, except for impacts to support radio cells and radio beams which may be to gNB-DUs 302.

There are several SVOs currently operating and several additional SVOs that are preparing to begin operations that may be capable of supporting satellite access using 5G NR or some other wireless access type such as CDMA. Various SVOs may employ different numbers of LEO SVs and Earth gateways and may use different technologies. For example, currently operating SVOs include SVOs using transparent ("bent pipe") LEO SVs with CDMA, and regenerative LEO SVs capable of ISL. New SVOs have been recently announced with plans for large constellations of LEO SVs to support fixed Internet access. These various SVOs are widely known to the industry.

While supporting satellite access to a wireless network, an SV 102/202/302 may transmit radio beams (also referred to just as "beams") over multiple countries. For example, a beam transmitted by an SV 102/202/302 may overlap two or more countries. Sharing a beam over two or more countries, however, may raise complication. For example, if a beam is shared by two or more countries, earth stations 104 and gNBs 106/202/302/307 in one country may need to support UE 105 access from other countries. Sharing a beam over multiple countries may raise security issues for privacy if both data and voice. Further, sharing an SV beam over multiple countries may raise regulatory conflicts. For example, regulatory services including WEA, LI, and EM calls in a first country could need support from gNBs 106/202/307 and earth stations 104 in a second country that shares the same SV beam.

One solution to complications raised by beam sharing amongst multiple countries is to assign one beam to one country. A possible exception to the assignment of one beam to one country may be made for small nearby countries. The assignment of a beam to a single country additionally implies assigning each radio cell to one country.

Figure 4:
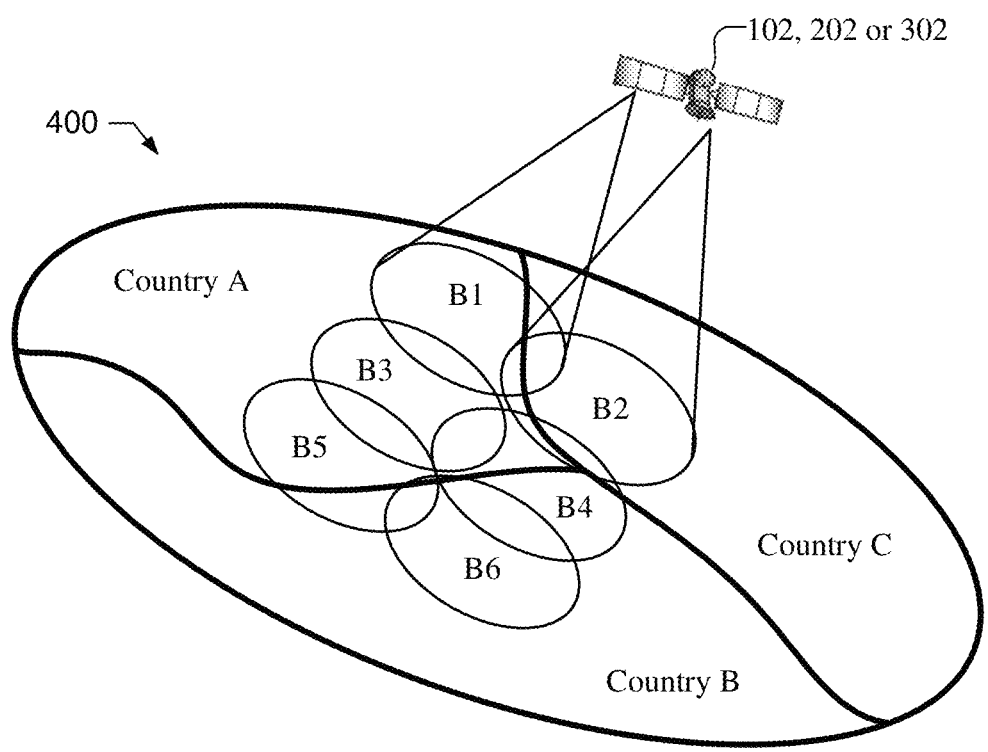
FIG. 4 illustrates a SV generating multiple beams over an area that includes multiple countries.

FIG. 4, by way of example, illustrates an SV 102, 202, 302 generating multiple beams identified as beams B1, B2, B3, B4, B5, and B6 over an area 400 that includes portions of multiple countries, e.g., country A, country B, and country C. With the assignment of each beam to just one country, beams B1, B3, B5 are assigned to country A, beams B4 and B6 are assigned to country B, and beam B2 is assigned to country C.

In one implementation, an individual beam may be assigned to a single country by controlling or steering the beam. While a Non-Geostationary Earth Orbiting (NGEO) SV has a moving coverage area, a relative beam direction may be moved via a controllable antenna array to stay. or mostly stay, within one country, which is sometimes referred to as a "steerable beam". For example, beam coverage may move slowly within one country and then hop to a new country, e.g., after an SV 102, 202, 302 has transferred to a new earth station 104 or new gNB 106 or 307.

In another implementation, a radio cell and radio beam may be allowed to support access by different UEs 105 in two or more countries at the same time. For example, beam B1 may support access from UEs 105 in countries A and C, and beams B4 and B5 may support access from UEs 105 in countries A and B. In such cases, it may be important for the support of regulatory services if a gNB 106/202/307 and/or an AMF 122 can determine the country in which a UE 105 is located.

Figure 5:
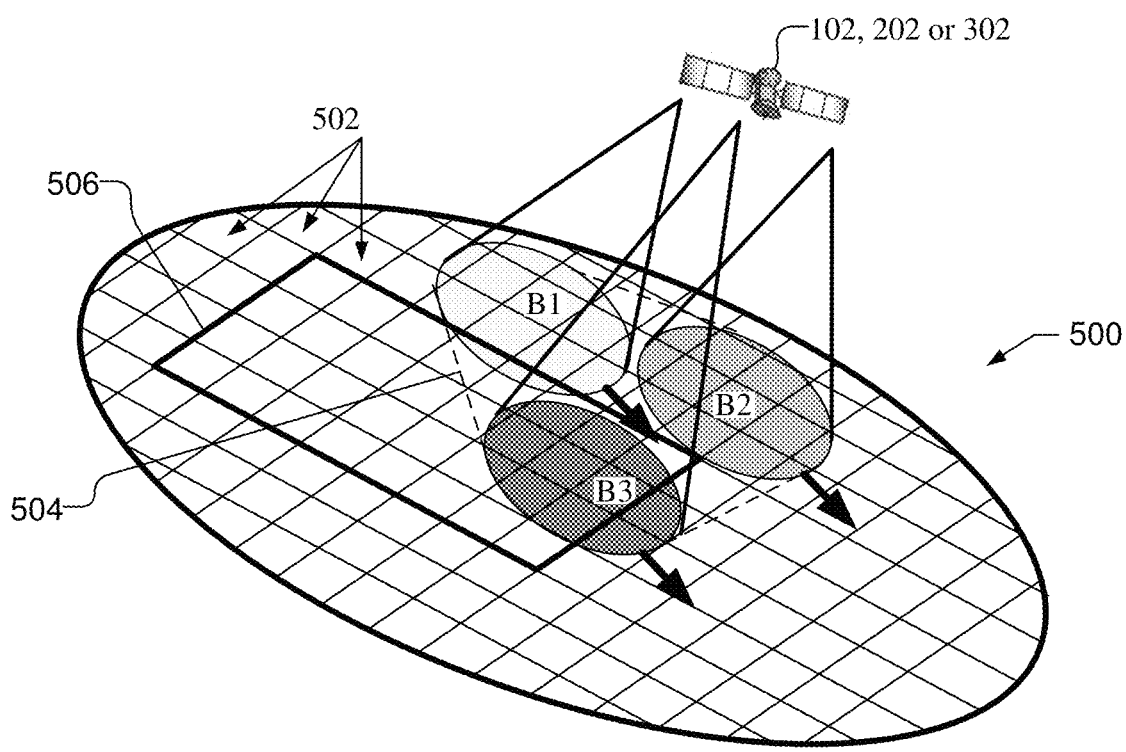
FIG. 5 illustrates radio cells produced by an SV over an area that includes a number of fixed cells.

FIG. 5 illustrates radio cells produced by an SV 102, 202, 302 over an area 500 that includes a number of Earth fixed cells 502. A radio cell may comprise a single beam or multiple beams, e.g., all beams in a radio cell may use the same frequency or a radio cell may comprise one beam for each frequency in a set of different frequencies. For example, beams B1, B2 and B3 may support three separate radio cells (one beam per radio cell) or may collectively support a single radio cell (e.g., radio cell 504 shown with dotted lines). Preferably, a radio cell covers a contiguous area.

Radio beams and radio cells produced by an SV 102, 202, 302 may not align with cells used by terrestrial wireless networks, e.g., 5GCN 110 terrestrial cells or LTE terrestrial cells. For example, in an urban area, a radio beam or radio cell produced by an SV 102, 202. 302 may overlap with many 5GCN fixed terrestrial cells. When supporting satellite access to a wireless network, radio beams and radio cells produced by an SV 102, 202, 302 may be hidden from a 5GCN 110.

As illustrated in FIG. 5, an area 500 may include a number of Earth fixed cells 502, as well as fixed tracking areas (TAs) such as TA 506. Fixed cells are not "real cells," e.g., as used for terrestrial NR and LTE access, and may be referred to as "virtual cells" or "geographic cells." A fixed cell, such as fixed cells 502, has a fixed geographic coverage area, which may be defined by a PLMN operator. For example, the coverage area of a fixed cell or a fixed TA may comprise the interior of a circle, ellipse or a polygon. The coverage area is fixed relative to the surface of the Earth and does not change with time, unlike the coverage area of a radio cell which typically changes with time for a LEO or MEO SV. A fixed cell 502 may be treated by a 5GCN 110 the same as a real cell that supports terrestrial NR access. Groups of fixed cells 502 may define a fixed TA 506, which may be treated by a 5GCN the same as TAs that are defined for terrestrial NR access. Fixed cells and fixed TAs used for 5G satellite wireless access may be used by a 5GCN 110 to support mobility management and regulatory services for UEs 105 with minimal new impact.

With regenerative SVs 202 with a non-split architecture as in communication system 200, each radio cell may remain with the same SV 202 and may have a moving coverage area supporting different 5GCNs 110 at different times.

With transparent SVs 102 and regenerative SVs 302 for a split architecture as in communication system 300, each radio cell may be assigned to and controlled by one gNB 106 or 307 on behalf of one or more PLMNs in one country. For a GEO SV 102/302, the assignment to a gNB 106/307 may be permanent or temporary. For example, the assignment may change on a daily basis to allow for peak traffic occurrence at different times in different parts of the SV 102/302 radio footprint and/or may change over a longer period to accommodate changing regional traffic demands. For a non-geostationary (NGEO) SV 102/302, the assignment might last for a short time, e.g., only 5-15 minutes. A non-permanent radio cell may then be transferred to a new gNB 106/307 as necessary (e.g. when access to the NGEO SV 102/302 is transferred to the new gNB 106/307). Each gNB 106/307, for example, may have a fixed geographic coverage area, e.g., comprising a plurality of fixed cells 502 and fixed TAs. A radio cell for a first NGEO SV 102/302 may be transferred from a first gNB 106/307 to a second gNB 106/307 when (or after) moving into the fixed coverage area of the second gNB 106/307. Prior to this transfer, UEs 105 accessing the radio cell in a connected state may be moved to a new radio cell for the first gNB 106/307 or could be handed off to the second gNB 106/307 as part of transferring the radio cell. An SV 102/302 may be accessed from only one gNB 106/307 or from multiple gNBs 106/307, possibly in different countries. In one implementation, an SV 102/302 may be assigned to multiple gNBs 106/307 by partitioning radio cells produced by the SV 102/302 among the different gNBs 106/307. Radio cells may then be transferred to new gNBs 106/307 (and to new countries) as the SV 102/302 moves or as traffic demands change. Such an implementation would be a form of a soft handoff in which SV 102/302 transfer from one gNB 106/307 to another gNB 106/307 occurs in increments of radio cells and not all at once.

Figure 6:
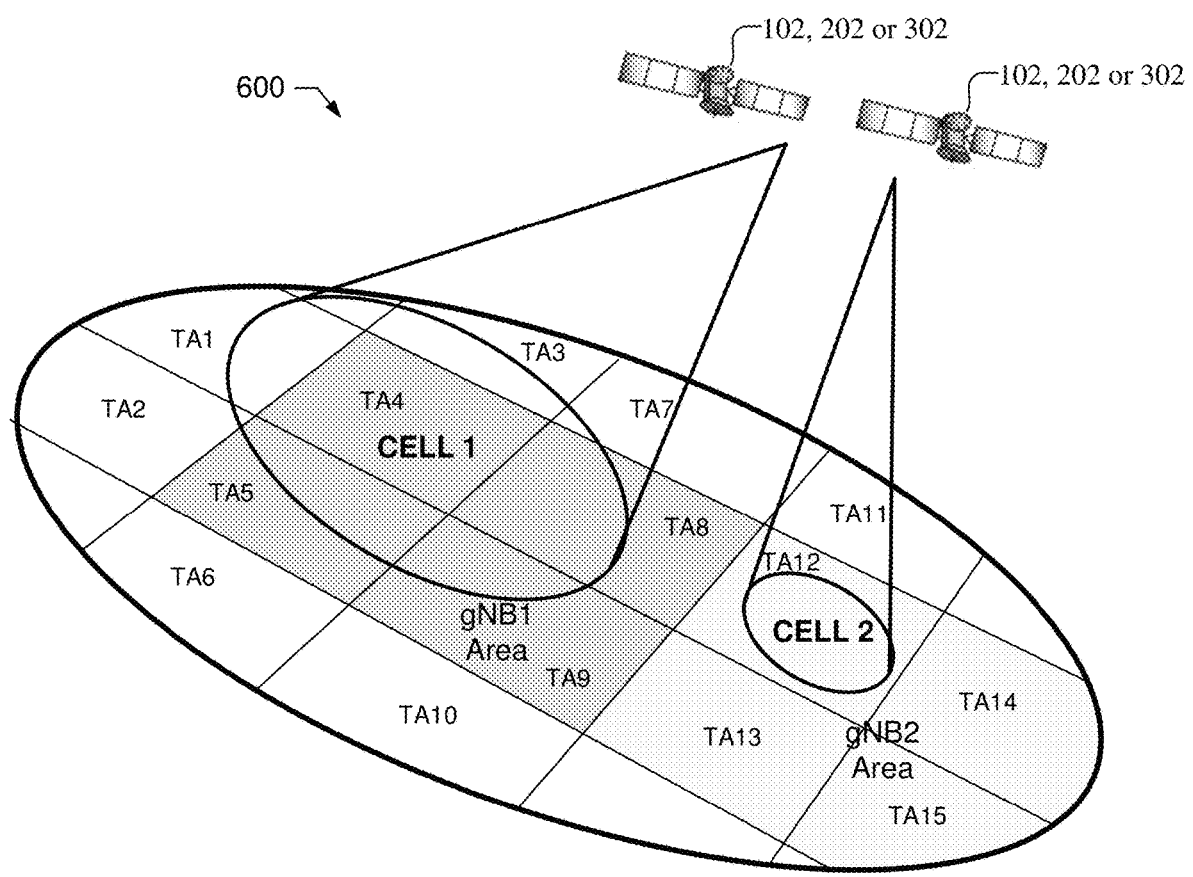
FIG. 6 illustrates an assignment of radio cells produced by an SV to fixed tracking areas (TAs).

FIG. 6 shows an example of assignment of radio cells, e.g., cell 1 and cell 2, produced by one or more SVs 102, 202, 302 over an area 600. As illustrated, the area 600 includes a number of fixed TAs, e.g., TA1-TA15, wherein TA4, TA5, TA8, and TA9 are assigned to a gNB1 (which may be a gNB 106, gNB 202 or a gNB 307), and TA12, TA13, TA14, and TA15 are assigned to a gNB2 (which may be another gNB 106, 202 or 307). In one implementation, a radio cell may be considered to support a fixed TA if the radio cell is wholly within the TA (e.g., Cell 2 within TA 12); if the TA is wholly within the radio cell (e.g., TA4 within Cell 1); or if the overlap of the area of a radio cell and a TA exceeds a predetermined threshold fraction of the total area of the radio cell or the total area of the TA (e.g., cell 1 overlap with TA1, TA3, TA5, TA8 or TA9). An SV 102, 202, 302 may broadcast, e.g., in a System Information Block type 1 (SIB1) or SIB type 2 (SIB2), the identities (IDs) of supported PLMNs (e.g., where a PLMN ID comprises a Mobile Country Code (MCC) and Mobile Network Code (MNC)) and, for each supported PLMN, the IDs of supported TAs (e.g. where the ID of TA comprises a Tracking Area Code (TAC)). For an NGEO SV, the supported PLMNs and TAs may change as radio cell coverage areas change. An gNB 106/202/307 may determine PLMN and TA support (and thus the PLMN IDs and TACs which are broadcast in a SIB for each radio cell) from known ephemeris data for each SV 102/202/302 and a known directionality and angular range for component radio beams for each radio cell (e.g. Cell 1 and Cell 2). A gNB 106/202/307 may then update SIB broadcasting.

Thus, as illustrated in FIG. 6, an SV 102/202/302 may broadcast for cell 1 a SIB that includes TACs for TA4 and possibly TA1, TA3, TA5, TA8 and/or TA9. Similarly, the SV 102/202/302 or another SV 102/202/302 may broadcast for Cell 2 a SIB that includes a TAC for TA12 only. The Cell 1 may be assigned to gNB1 (which has coverage of TA4, TA5, TA8, and TA9) and Cell 2 may be assigned to gNB2 (which has coverage of TA12, TA13, TA14, and TA15). Cell 1 and Cell 2 may be transferred from gNB1 to gNB2 or from gNB2 to gNB1 if the cell coverage area moves from one gNB area to another.

The coverage area for a fixed TA may be defined in a manner that is simple, precise, flexible and requires minimal signaling for conveyance to a UE 105 or gNB 106/202/307, or an entity in a 5GCN 110. A fixed TA area may be small enough to allow efficient paging by comprising an area supported by just a few radio cells (e.g. less than 20) and may also be large enough to avoid excessive UE registration (e.g. may extend at least several kilometers in any direction). The shape of a fixed TA area may be arbitrary, e.g., the shape may be defined by a PLMN operator, or may have one or more restrictions. For example, one restriction for the shape of the fixed TA area may be that a fixed TA along the border of a country precisely aligns with the border to avoid serving UEs 105 in another country. Additionally, a fixed TA may be restricted to align with an area of interest, e.g., a PSAP serving area, the area of a large campus, etc. Additionally, a fixed TA may be restricted so that parts of the fixed TA align with a physical obstacle, such as the bank of a river or lake.

The coverage area for fixed cells may likewise be defined in a manner that is simple, precise, flexible and requires minimal signaling for conveyance to a UE 105 or gNB 106/202/307. A fixed cell coverage area may allow for simple and precise association with a fixed TA, e.g., one fixed cell may belong unambiguously to one TA.

Fixed cells may be used by a wireless core network, such as a 5GCN 110, for support of regulatory services such as emergency (EM) call routing based on a current fixed serving cell for a UE 105, use of a fixed cell to approximate a UE 105 location, use of a fixed cell association to direct a Wireless Emergency Alerting (WEA) alert over a small defined area to a recipient UE 105, or use of a fixed cell as an approximate location or a trigger event for Lawful Interception (LI) for a UE 105. Such usage of fixed cells implies that fixed cells should be capable of being defined with a size and shape similar to that of cells that are defined and used for terrestrial wireless access, including allowing for very small (e.g., pico) cells and large (e.g., rural) cells.

FIGS. 4-6 illustrate how a radio cell may have a coverage area which spans two or more countries. In such cases, a gNB 106, gNB 202 or gNB-CU 307 which controls such as radio cell may provide UE 105 access to a PLMN or PLMNs (e.g. with 5GCNs 110) in just one country or to PLMNs (e.g. with 5GCNs 110) in two or more countries. For either scenario, a particularly critical problem can be enabling a PLMN to determine or verify the country in which a UE 105 is located during 5G satellite access to ensure that the UE 105 is located in the same country as the PLMN that the UE 105 is accessing. For example, in consideration of regulatory services, such as lawful interception (LI), as well as considerations for emergency situations, e.g., emergency calls and wireless emergency alerting, a UE 105 may be required to always access a PLMN (e.g. a gNB 106, gNB 202, gNB-CU 307 and/or a 5GCN 110) in the same country as the UE 105. It may not be appropriate to permit a UE 105 to determine or verify the country in which the UE 105 is located, as a user may manipulate this information in the UE 105 to avoid regulatory services, such as LI, and non-malicious errors may impede emergency services. Accordingly, it is desirable for the network (e.g. a gNB 106, gNB 202, gNB-CU 307 and/or a 5GCN 110), rather than the UE 105, to determine or verify the country in which the UE 105 is located. Moreover, due to signaling and processing overhead, it may also be preferred that an NG-RAN (e.g. a gNB 106, gNB 202 or gNB-CU 307) perform the location and country determination/verification rather than a 5GCN 110.

One solution for determining or verifying a country in which a UE 105 is located makes use of enhanced cell ID positioning by a serving satellite NodeB (gNB 106/202/307) with enhanced reliability. With this solution, a UE 105 may measure one or more characteristics of signals broadcast from multiple SVs 102, 202, or 302. The characteristics may include Reference Signal Received Power (RSRP), Reference Signal Received Quality (RSRQ), Receive Time-Transmit Time difference (RxTx), Angle of Arrival (AOA), or a combination thereof. The UE 105 may provide the measured characteristics of, e.g., signals from the serving radio cell and/or neighbor radio cells, and the time of each measurement (e.g. a global time such as UTC time or a local transmission time indicated by a serving cell of a serving gNB 102/202/307) to a serving gNB 106, 202 or 307, which uses the measurements and the measurement times to locate the UE using Enhanced cell ID (ECID) for satellite radio cells. With conventional ECID, a UE 105 identifies measured terrestrial cells using Physical Cell IDs (PCIs) and/or cell global identifiers (CGIs). However, for a satellite radio cell accessed by a UE, PCIs and CGIs may be static (for a GEO satellite) or have a lifetime of 5-15 minutes or more for a LEO or MEO satellite. Thus, identifying a satellite radio cell using PCIs or GCIs for ECID could allow spoofing of measurements by a UE 105 if the PCIs or CGIs are obtained some time in advance by the UE 105 and if cell coverage movement is predictable by the UE 105. For example, the UE 105 could provide spoofed measurements for satellite radio cells as seen at a different (spoofed) location to the real location for the UE 105 by including the spoofed measurements along with already known (static or semi-static) PCIs or CGIs for these radio cells. As an example, a UE located in the United States near the southern border with Mexico or northern border with Canada could spoof a location in Mexico or Canada, respectively, to avoid regulator services within the United States.

To enable greater reliability for the Enhanced cell ID (ECID) positioning method, spoofing of a measurement for a radio cell may be prevented in part by assigning a random or pseudorandom identifier to each radio cell, referred to herein as a positioning ID (PID), which is broadcast in the radio cell along with the PCI and CGI for the radio cell. A UE 105 may then be required to identify radio cells for which measurements are provided using the PIDs rather than PCIs or CGIs. The PIDs may change frequently (e.g., at 15-30 second intervals). Thus, a UE 105 (or an entity acting for the UE 105) must observe the radio cells in almost real time in order to send measurements with the correct PIDs for the positioning determination. While the use of frequently changing PIDs may not prevent spoofing where a UE 105 has another UE provide measurements from the spoofed location to the UE 105 in real time, it could prevent spoofing based on predicting measurements from previous observation of radio cells. In a variant, the PCIs of radio cells may be frequently and randomly changed and thereby act as PIDs, although this could be problematic as PCIs have many other uses to identify cells for normal operation, which could be impacted.

In one implementation, a characteristic of signals broadcast from multiple SVs 102, 202, or 302 that may be measured by a UE 105 and reported to a serving gNB 106, 202 or 307 for position determination, may be measurements of differential AOA (DAOA) for pairs of different satellites. This has a potential for accurate 3D location since, unlike DAOA for pairs of terrestrial base stations which just enables 2D location, satellites would have different angles of both azimuth and elevation.

FIG. 7A illustrates how a DAOA may be used to locate a UE 105. In FIG. 7A, it is assumed that a UE 105 has measured a DAOA equal to δ between a pair of SVs 102, 202 or 302 labelled in FIG. 7A as A and B. This can be enough to locate the UE 105 horizontally on some point P on an arc of a circle C above (or below) the chord AB where the angle APB equals δ. (It is noted that in FIG. 7A and subsequent figures, labels comprising a "P", represent virtual or physical geographic locations.) This follows from the constancy of an angle inscribed by a chord of a circle anywhere on the circle. FIG. 7A shows how the arc of the circle C can be determined using a perpendicular to the line AB through the midpoint M of the line AB. The point O on this perpendicular where the angle AOM is δ will be the center of a circle corresponding to the arc of the circle C. Since the central angle AOB will be 2δ, the inscribed angle APB will be δ from the well-known geometric theorem relating a central angle to an inscribed angle. The UE 105 will then be located on the arc of the circle C above the chord AB or an arc C* for the mirror image of C below the chord AB. (For example, and in detail, to obtain C and C*, the network, such as the gNB 106, 307 or an entity in the 5GCN 110, such as LMF 124, can obtain the distance OM as equal to the known distance AM divided by (tan δ) which may then locate the point O from which the arc of a circle C is defined from the radius OA and OB.)

If the UE 105 also determines a DAOA for another pair of SVs 102/202/302, the location of the UE 105 in two dimensions may be obtained from the intersection point of the arcs C and C* obtained for the first pair of SVs and another similar pair of arcs of circles obtained for the second pair of SVs. In some cases, to resolve ambiguity when there are two or more points of intersection, a DAOA may be needed for a third pair of SVs.

As the SVs move in three dimensions, i.e., satellites have different angles of both azimuth and elevation, the location of the UE 105 may be determined in three dimensions, by rotating the arc C in FIG. 7A through 360 degrees around the AB line axis in FIG. 7A to create a two dimensional surface. The line AB will then subtend the same angle δ at any point on this surface meaning the UE 105 can be located anywhere on this surface. DAOAs obtained for two or three further pairs of SVs can then be used to locate the UE 105 on other similar surfaces whose common intersection point can provide the UE 105 location in three dimensions.

FIG. 7B illustrates how the arc of a circle C shown in FIG. 7A may be determined (e.g. at the gNB 106, 202 or 307 or an entity in the 5GCN 110, such as LMF 124) in the case that the DAOA δ is greater than 90 degrees. The points A, B, M, O and P in FIG. 7B correspond to and have the same meaning as the points A, B, M, O and P in FIG. 7A. For clarity, an arc C* corresponding to C* in FIG. 7A is not shown in FIG. 7B, but if present would be a mirror image of the arc C with respect to the line AB.

The locations of the SVs A and B in FIGS. 7A and 7B may be determined (e.g. by a gNB 106/202/307) from a time of measurement reported by a UE 105 for the DAOA δ and known orbital (ephemeris) data for the SVs A and B. The propagation delay from each SV A and B to the UE 105 could be ignored, in which case the locations of the SVs A and B may have a small error (e.g. around 50 meters for LEO SVs) due to assuming a location for each SV A and B at the time of measurement at UE 105. Alternatively, the propagation delay from each SV A and B to the UE 105 could be used to determine a location for each SV A and B at a previous time at which the signals measured by the UE 105 were transmitted from each SV A and B. For example, a location for the UE 105 might be first obtained by ignoring the propagation delays, which may produce some small error (e.g. around 50 meters) to the location obtained for UE 105. This location may then be used to determine a propagation delay from each SV A and B to this location which may in turn be used to correct the locations of the SVs A and B to correspond to the locations of the SVs A and B when the signals measured by the UE 105 were transmitted. The UE 105 location may then be reobtained (more correctly) using the corrected locations of the SVs A and B. It is noted that while a UE 105 might deliberately spoof a time of measurement for a reported DAOA, a gNB 106, 202 or 307 or an entity in the 5GCN 110, such as LMF 124, can validate a time of measurement at least approximately, based on a time of receipt of the time of measurement, since the time of receipt should exceed the time of measurement by only a small margin (e.g. 1-5 seconds).

In some scenarios, a UE 105 may provide one or more DAOA measurements and one or more other types of measurements, such as RSRP, RSRQ, RxTx, RSTD, as well as a radio cell identifier, e.g., PIDs. In this case, a network entity, such as the gNB 106, 202 or 307 or an entity in the 5GCN 110, such as LMF 124, may determine a location for the UE 105 using the DAOA measurement(s) as described for FIGS. 7A and 7B and the other measurements using combined or "hybrid" positioning.

In order to report measurements of AOA and DAOA to, e.g., the gNB 106, 202, 307 or an entity in the 5GCN 110, such as LMF 124, a UE 105 may employ one of several techniques. In a first technique, a UE 105 may report each AOA relative to some fixed reference frame which may be local to the UE 105 (e.g. may be aligned with antennas or antenna connectors in the UE 105) or may be a global frame if the UE 105 is able to determine its absolute orientation. In this technique, the UE 105 may report angles using angles of azimuth and elevation or using polar angles. In the case of a local reference frame within UE 105, one particular plane may be selected to represent the horizontal plane to enable a definition of "azimuth" and "elevation", although this plane may not align with a true horizontal plane. In a second technique, a UE 105 may report the DAOA between pairs of SVs 102, 202 or 302. For example, one SV (or one cell) may serve as a reference SV (or reference cell) and the UE 105 reports a DAOA between this reference SV (or reference cell) and each of one or more neighbor SVs (or neighbor cells). For example, each DAOA may correspond to the angle δ in FIGS. 7A and 7B.

Another solution for determining or verifying a country in which a UE 105 is located makes use of measurements for a serving radio cell acquired over a period of time by the UE 105, where the coverage area of the serving radio cell may be moving (e.g. due to using a fixed directional antenna at an SV 102/202/302). For example, it may not always be possible for a UE 105 to observe and report measurements for several radio cells from different satellites at the same time, as discussed above. Instead, a UE 105 may report characteristics (e.g., RSRP, RSRQ, RxTx, or AoA measurements) of signals broadcast for the same serving radio cell over a period, e.g., from 5-15 minutes, which is a typical maximum duration that any one radio cell for a LEO satellite can provide radio coverage to the same location. If the radio cell is moving, a gNB 106, 202, 307 may locate the UE 105 approximately within the radio cell coverage area at a sequence of times T1, T2, T3 etc., based on the measured characteristics (e.g. RSRP, RSRQ, RxTx, AoA and/or other measurements) provided by the UE 105 at each of these times. In a simple variant, a gNB 106, 202, 307 may simply record that the UE 105 was sending UL signaling and/or receiving DL signaling at each of a plurality of times using the serving radio cell and estimate the location of the UE to be somewhere within the coverage area of the radio cell at each of these times. The gNB 106, 202, 307, thus, obtains a sequence of location areas L1, L2, L3 etc., for the UE corresponding to the coverage area of the radio cell at each respective times T1, T2, T3, etc., where each location area represents possible locations of the UE (e.g. a location point and uncertainty area) at one particular time. As an example, L3 would indicate a location area for the UE at time T3.

After a suitable number of location areas have been obtained, the gNB 106, 202, 307 may determine the location of the UE 105 as the intersection of the separate location areas. The location areas will generally be different if the radio cell is moving. The intersection of multiple location areas would then be a smaller area than each of the original location areas. Mathematically, the location L of the UE 105 may be written as L=L1∩L2∩L3∩ ... ∩ Ln, where n is the total number of location areas Li (for i between 1 and n). The intersection of all of the location areas Li can be a much smaller area than each of the individual location areas Li, and hence more accurate.

Figure 8:
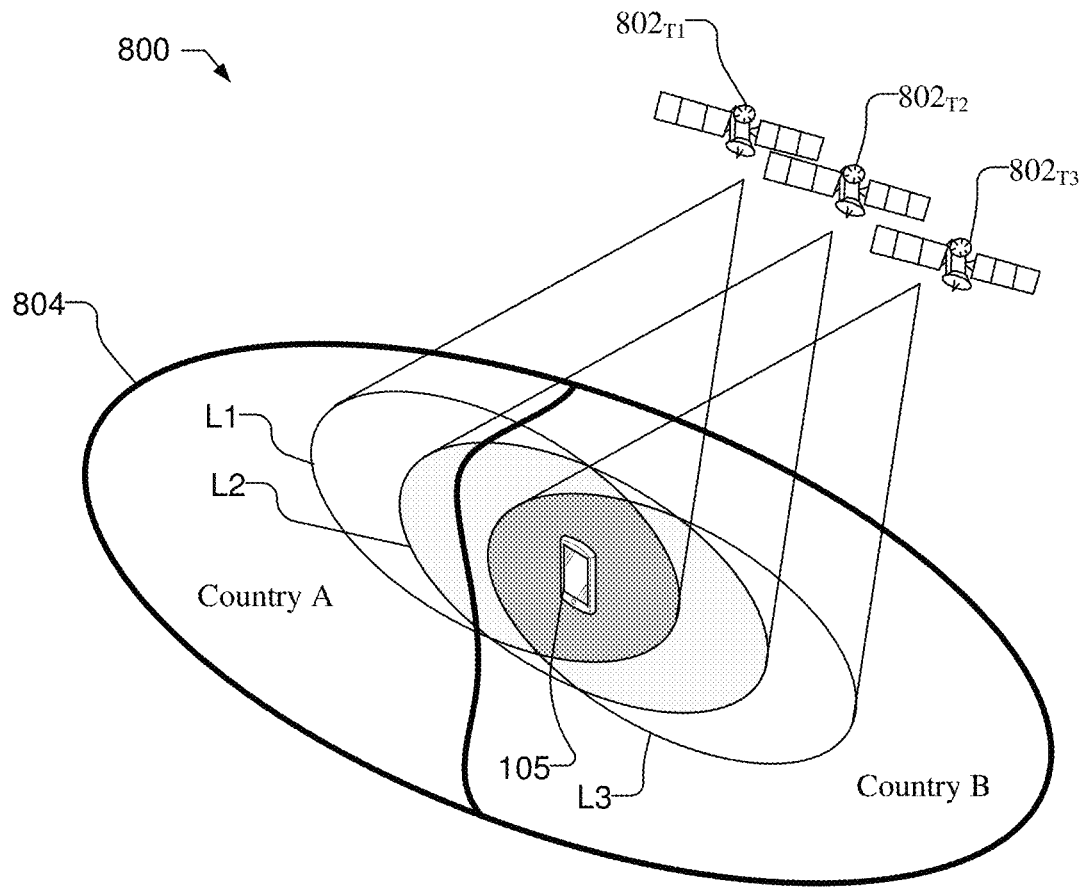
FIG. 8 illustrates using the coverage area of a radio cell produced by an SV that moves over time to determine a location of a UE.

FIG. 8, for example, illustrates an example of SV coverage 800, where an SV 802 (e.g. corresponding to an SV 102, 202 or 302) generates a radio beam to produce a serving radio cell for the UE 105 that moves over an area 804 over a period of time. The area 804 includes portions of multiple countries, e.g., portions of a country A and country B. The subscript T1, T2, and T3, is used to identify the position of the SV 802 at each time T1, T2, and T3, producing a serving radio cell with location areas L1, L2, and L3. As illustrated, the UE 105 is in the location area of the serving radio cell at each time T1, T2, and T3, but due to the size of the location area, it may not be clear in which country the UE 105 is located. The intersection of the location areas, however, reduces the possible location area of the UE 105 and thus may be used to verify which country the UE is located. For example, the intersection of location areas L1 and L2 is significantly smaller than either location area L1 or L2 alone, but does not unambiguously identify the country in which the UE 105 is located. The intersection of L1, L2, and L3, (or equivalently L1 and L3) further reduces the possible location area of the UE 105 and unambiguously indicates that the UE 105 is located in country B.

Thus, in one implementation, signaling between the UE 105 and the SV 802 for the serving radio cell, e.g., UL signaling from the UE 105 and/or DL signaling to the UE 105, at each of a plurality of times T1, T2 and T3, may be used by a gNB 106, 202, 307 to determine or verify the country in which the UE 105 is located. Additionally, measured characteristics, e.g., RSRP, RSRQ, RxTx, AoA, and/or other measurements, provided by the UE 105 at each of these times T1, T2, and T3, may be used to further reduce the possible location area of the UE 105 within the location areas L1, L2, and L3 of the serving radio cell. Intersection of these reduced possible location areas may be similarly used to determine or verify the country in which the UE 105 is located.

The use of measurements for a serving radio cell acquired over a period of time to determine or verify the location or country in which a UE 105 is located may require that the UE 105 is fairly stationary and remains in a connected state for a period of time, e.g., several minutes. However, this solution offers the possibility of more accurate location determination than other techniques within a short period of time. The solution also has the benefit that spoofing is not possible since the gNB 106, 202 307 can know that the UE 105 must be accessing the serving radio cell due to the DL and UL signaling being transferred to and from the UE 105.

Another solution for determining or verifying a country in which a UE 105 is located assumes that location determination of a UE 105 is supported by the NG-RAN 112 (e.g. a gNB 106 or gNB-CU 307) or by a gNB 202, but is not fully reliable and may not always be able to determine the country in which the UE 105 is located. By way of example, it may be difficult for the NG-RAN 112 or gNB 202 to reliably determine the country in which the UE 105 is located if the UE 105 is near an international border. When the NG-RAN 112 cannot reliably verify the UE's country, more accurate location determination of the UE 105 performed by a 5GCN 110, e.g. using the LMF 124, may be performed. However, because 5GCN location may have substantial delay (e.g., up to 30 seconds) and consume more UE 105 and network processing and signaling resources, the frequency at which 5GCN location determination is used may need to be minimal.

To minimize the frequency of 5GCN location, a gNB 106, 202, 307 may provide an indication to the 5GCN 110 (e.g., for initial UE access to a PLMN) that indicates whether the gNB 106, 202, 307 has verified (or, alternatively, has not verified) the UE 105 location and country. For example, the indication may have two values: A) location and country fully verified, and B) location and country not fully verified.

For case A, when the location and country of the UE 105 are fully verified by the gNB 106, 202, 307, the 5GCN 110 does not need to locate the UE 105. For case B, where the location and country of the UE 105 cannot be fully verified, the PLMN may employ 5GCN 110 verification of location and country. Case B, for example, may also be made optional, with a gNB 106, 202, 307 rejecting an initial UE 105 access when the location and country of the UE 105 cannot be fully verified by the gNB 106, 202, 307 (e.g., which may arise for a radio cell close to or spanning a country border).

In one implementation, when 5GCN 110 location is used, for example, when the location and country of the UE 105 cannot be fully verified by the gNB 106, 202, 307, the 5GCN 110 may ensure that the location of UE 105 is fully reliable and does not allow UE 105 spoofing. In this implementation, an LMF 124 may be provided by the serving AMF 122 with an indication of 5G satellite access for the UE 105 in an initial location request message sent by the AMF 122 to the LMF 124 to initiate the UE 105 location. This indication may be used by an LMF 124 to select more reliable and/or more satellite suitable positioning methods (e.g. UE assisted rather than UE based methods which would be more difficult to spoof by the UE 105).

Figure 9:
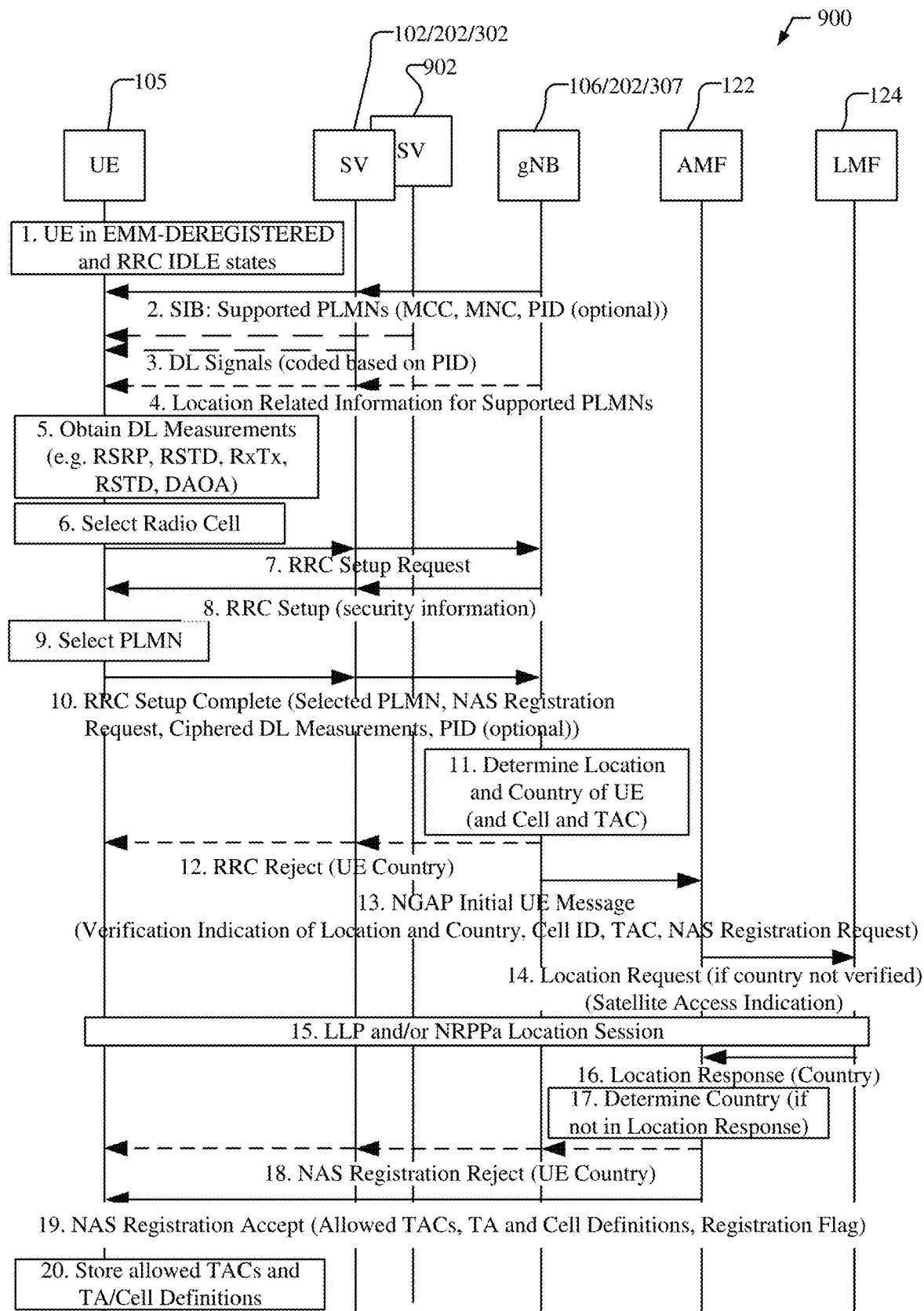
FIG. 9 shows a signaling flow that illustrates various messages sent between components of a communication system to determine whether the UE is located in the country associated with a serving public land mobile network (PLMN).

FIG. 9 shows a signaling flow 900 that illustrates various messages sent between components of a communication system in a procedure for initial PLMN access by a UE 105 in which a gNB (e.g. gNB 106, 202 or 307) determines or verifies that the UE 105 is in a country associated with a serving PLMN. FIG. 9 illustrates a plurality of techniques that may be used to determine or verify the country in which the UE 105 is located. It should be understood that any one technique or any combination of techniques, including all techniques, may be used to determine or verify the country in which the UE 105 is located by a network entity. The communication network may be part of communication system 100, 200 or 300 for FIG. 1, 2 or 3, respectively, and is illustrated as including a UE 105, an SV 102/202/302, a second SV 902 which may be another SV 102/202/302, a gNB 106/202/307, an AMF 122, and an LMF 124. It should be understood that the gNB 106/202/307 or an element of the gNB 106/202/307 may be included within the SV 102/202/302. For example, with an SV 202, a gNB 202 would be completely included within the SV 202 as described for FIG. 2. Alternatively, with an SV 302, a gNB 307 (also referred to as a gNB-CU) would be terrestrial and physically separate from the SV 302, but the SV 302 would include a gNB-DU 302 as described for FIG. 3.

At stage 1 in FIG. 9, the UE 105 is in a 5G Mobility Management (SGMM) DEREGISTERED state and RRC IDLE state.

At stage 2, the gNB 106/202/307 or gNB-CU broadcasts (via the SV 102/202/302) indications of supported PLMNs (e.g. an MCC-MNC for each PLMN) in each radio cell. The UE 105 may detect radio cells from one or more radio beams transmitted by one or more SVs, including the SV 102/202/302. The gNB 106/202/307 may control SV 102/202/302 to broadcast system information blocks (SIBs) in one or more radio cells of the gNB 106/202/307. The SIBs may indicate one or more PLMNs (referred to as supported PLMNs) supported by the gNB 106/202/307 in each radio cell for the gNB 106/202/307. The PLMNs may each be identified in a SIB by a mobile country code (MCC) and a mobile network code (MNC), where the MCC indicates a country for each identified PLMN (i.e. a country to which each identified PLMN belongs). The gNB may optionally assign a numeric value to a positioning ID (PID) for each radio cell that may be used to identify the radio cell and that is broadcast, e.g., in an SIB for each radio cell, from the SV 102/202/302. The PID, for example, may be a random or pseudorandom number that is changed frequently, e.g., by the gNB 106, 202, 307, such as at 15-60 second intervals or other intervals. The SIBs may include security information described below for stage 8 such as public key(s) and an indication of ciphering algorithm(s).

At stage 3, the UE 105 may receive DL signals (e.g. DL Positioning Reference Signals (PRSs)) from the SV 102/202/302, the SV 902 and possibly from other SVs such as other SVs 102/202/302 and/or SVs 190. The signals from SV 102/202/302 and SV 902 may be coded based on the PID for SV 102/202/302 and SV 902.

At stage 4, which is optional, the UE 105 may receive location related information for the supported PLMNs broadcast (e.g. in one or more SIBs) in the one or more radio cells from the gNB 106/202/307 via the SV 102/202/302. For example, the location related information for the supported PLMNs may comprise geographic definitions for fixed cells of each supported PLMN, geographic definitions for fixed tracking areas of each supported PLMN, or both.

At stage 5, the UE 105 may measure characteristics of the DL signals, such as RSRP, RSRQ, RxTx, AoA. The UE 105 may further measure a DAOA and/or a Reference Signal Time Difference (RSTD) for DL signals received from one or more pairs of SVs 102/202/302 and/or 902.

At stage 6, UE 105 selects a radio cell. In one implementation, the UE 105 may first select a PLMN (referred to as a selected PLMN), where the selected PLMN is a preferred PLMN in the supported PLMNs indicated at stage 2 in the one or more radio cells of the gNB 106/202/307. The UE 105 may then select the radio cell at stage 6 based on the radio cell indicating support for the preferred PLMN.

At stage 7, UE 105 may send an RRC Setup Request message to the gNB 106/202/307 that supports the selected radio cell via the SV 102/202/302 using the selected radio cell (e.g. after having performed a random access procedure to obtain initial access to the selected radio cell from the gNB 106/202/307) in order to establish an RRC Signaling Connection to the gNB 106/202/307.

At stage 8, the gNB 106/202/307 may return an RRC Setup message to the UE 105. The gNB 106/202/307 may include security information in the RRC Setup message (e.g. if not provided at stage 2) that includes a public ciphering key and an indication of a ciphering algorithm. Following stage 8, the RRC Signaling Connection between UE 105 and gNB 106/202/307 may be established and UE 105 may be in an RRC Connected state.

At stage 9, the UE 105 may select a supported PLMN (referred to below as the selected PLMN) if not previously selected at stage 6. The selected PLMN may be one the supported PLMNs indicated at stage 2 for the radio cell selected at stage 6. The selected PLMN (as selected at stage 6 or stage 9) is also referred to as a serving PLMN below since the selected PLMN acts as a serving PLMN for UE 105 following stage 19.

At stage 10, UE 105 sends an RRC Setup Complete message to the gNB 106/202/307 and includes an indication (e.g. MCC and MNC) of the selected PLMN and a Non-Access Stratum (NAS) Registration Request message. Stage 10 may be performed by UE 105 in order to complete the establishment of the RRC Signaling Connection to the gNB 106/202/307 and establish a Connection Management (CM) Connection to, and Register with, the selected PLMN. UE 105 may also include DL location measurements obtained at stage 5 in the RRC Setup Complete message, optionally the time(s) at which the DL location measurements were obtained, and optionally the PIDs received at stages 2 and 3 to identify the radio cells for which the DL location measurements were obtained. The location measurements and PIDs (if sent) may be included in a confidential (or concealed) form by ciphering the location measurements and PIDs using the public ciphering key and ciphering algorithm indicated at stage 2 or 8. The determination and encoding of the confidential location measurements and PIDs may reuse some of the functionality used to support a Subscription Concealed Identifier (SUCI) as described in 3GPP Technical Specification (TS) 23.003.

At stage 11, the gNB 106/202/307, or an embedded or attached Location Management Component (LMC), may determine a location and country for UE 105 (where the country for UE 105 corresponds to a country in which UE 105 is located). The gNB 106/202/307 (or LMC), for example, may decipher the DL measurements and PIDs sent at stage 10 based on the ciphering key and the ciphering algorithm indicated at stage 2 or stage 8. For example, the gNB 106/202/307 (or LMC) may use a private ciphering key that corresponds to a public ciphering key sent at stage 2 or stage 8, to decipher the ciphered DL measurements and PIDs based on a public key-private key ciphering algorithm (e.g. the RCA algorithm) indicated at stage 2 or stage 8.

The gNB 106/202/307 may use the PIDs that the UE 105 sent at stage 10 to identify the measured radio cells, as well as the characteristics of the received signals, e.g., RSRP, RSRQ, RxTx, AoA, RSTD, or DAOA, measured by the UE 105 at stage 5, to determine a location of the UE 105, e.g., using ECID with enhanced reliability. The country in which the UE 105 is located may then be determined based on the determined location of the UE 105. The gNB 106/202/307 (or LMC) may determine the location and country of the UE 105 using other techniques. For example, in one implementation, the gNB 106/202/307 (or LMC) may determine the location of the UE 105 based on measurements of signaling between the UE 105 and the serving SV 102/202/302, which may be acquired over a period of time. For example, the beam coverage area of the selected radio cell may be used as the approximate location of the UE 105. The beam coverage area, for example, may be inferred from a known location of the serving SV 102/202/302 and a beam direction and angular range. If the beam coverage area is completely and unambiguously within a single country, the gNB 106/202/307 may determine the UE 105 country, e.g., based on beam coverage area at a single instance. In some implementations, however, where the beam coverage area for the serving SV 102/202/302 may include multiple countries, the intersection of the beam coverage area at multiple instances over a period of time may be used to produce a more accurate location of the UE 105 (e.g. as described for FIG. 8), from which the UE 105 country may be determined.

In some implementations, measured characteristics of the serving radio cell, e.g. RSRP, RSRQ, RxTx, AoA or some combination thereof, measured by the UE 105 at stage 5, may be used to refine the location of the UE 105. In another implementation, measurements of UL signaling from the UE 105 may be obtained by the serving SV 102/202/302 and/or by the gNB 106/202/307, such as measurements of RSRP, RSRQ, RxTx and/or AOA, and may be used by gNB 106/202/307 (or an LMC) to help determine a location and a country for the UE 105.

FIG. 8 (as described previously) illustrates a procedure in which the location and country of the UE 105 are determined based on the coverage area of a serving radio cell over a period of time. In some implementations, the location determination and location mapping to a country may be performed by a Location Management Component (LMC) which may be part of, attached to, or reachable from, gNB 106/202/307. The gNB 106/202/307 may map the location to a country and verify the country is supported by the gNB 106/202/307 and matches the country of the selected PLMN indicated at stage 10. In some implementations, the gNB 106/202/307 may further determine a fixed serving cell and/or a fixed serving Tracking Area (TA) for UE 105, e.g., by mapping a UE 105 location to a Cell ID and/or TA Code (TAC), for the selected PLMN indicated at stage 9.

At stage 12, if the UE country determined at step 11 is not supported by the gNB 106/202/307 or does not match the country for the selected PLMN, the gNB 106/202/307 may return an RRC Reject or RRC Release message to UE 105. The RRC Reject or RRC Release message may indicate the country (e.g. using an MCC) that the UE 105 is located in as determined at stage 11. If an RRC Reject or RRC Release message is received, the UE 105 may restart the procedure at stage 6 using the provided country.

At stage 13, if the UE 105 is in the correct country or may be in the correct country, the gNB 106/202/307 forwards the NAS Registration Request to an AMF 122 in the selected PLMN in an NG Application Protocol (NGAP) message (e.g. an NGAP Initial UE message), and may include an indication of whether the gNB 106/202/307 has fully verified the UE 105 location and/or country. For example, the indication may indicate whether or not the gNB 106/202/307 has verified that the UE is in a country associated with the selected PLMN, which may correspond to the serving PLMN following stage 19. The NGAP message may further include an identification of the fixed serving cell and/or fixed serving TA if determined at stage 11 (e.g., the Cell ID and TAC). In some implementations, the AMF 122 or LMF 124 may perform the fixed cell and/or fixed TA (Cell ID and/or TAC) determination (and possibly location of the UE 105), in which case the NGAP message may include a UE location or UE location information instead of the Cell ID and TAC at stage 13. If the NGAP message indicates that the UE 105 location and country are fully verified by the gNB 106/202/307, the AMF 122 may accept the Registration Request without additional verification of the UE 105 location and country and the process may skip to stage 19.

At stage 14, the AMF 122 may send a location request to the LMF 124 if the NGAP message at stage 13 indicates that the UE location and/or country are not fully verified by the gNB 106/202/307. The AMF 122 may provide an indication in the location request that the UE 105 has 5G satellite access.

Figure 11:
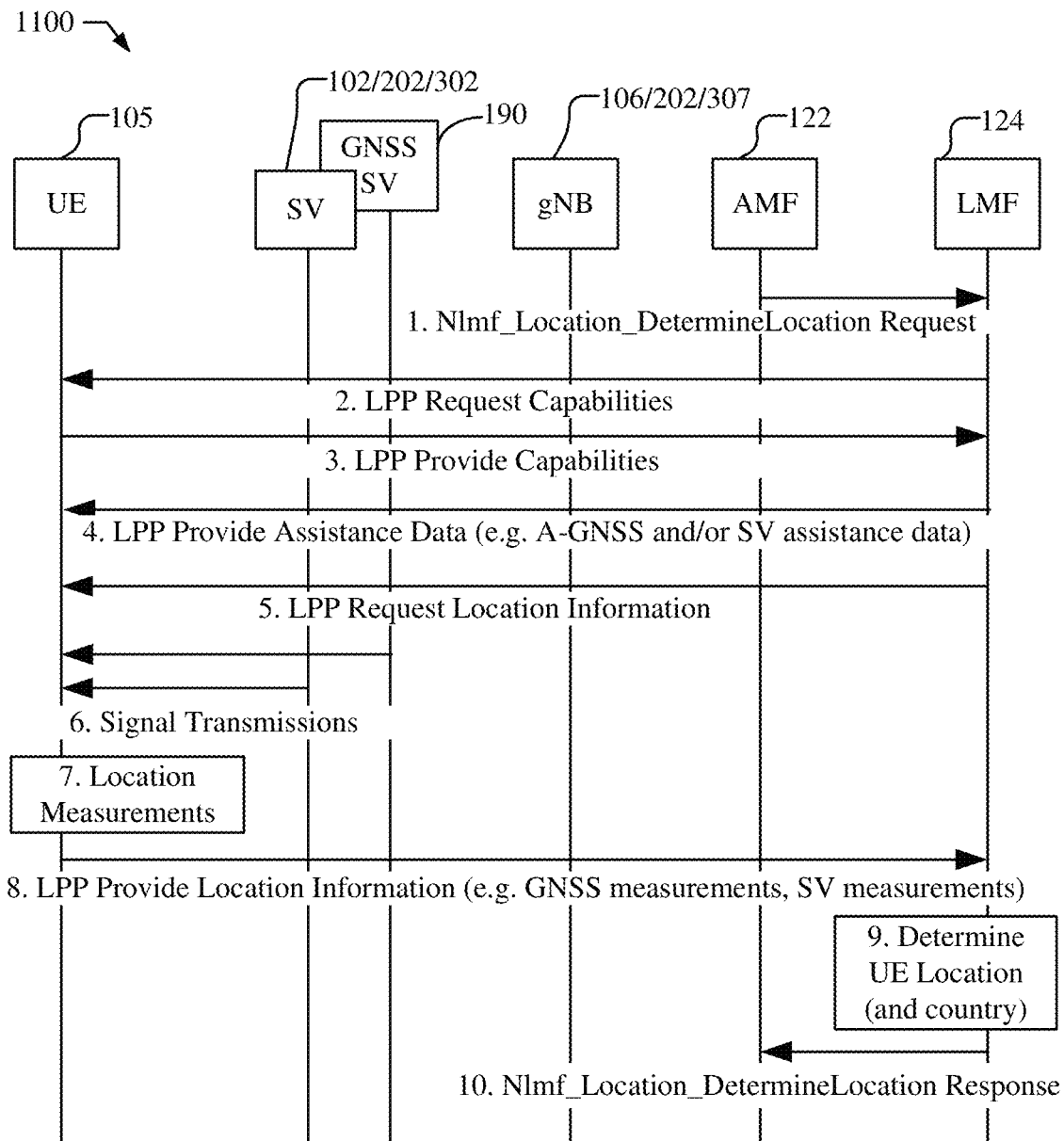
FIG. 11 shows a signaling flow that illustrates various messages sent between components of a communication system during a location session for the UE.

At stage 15, the LMF 124 may engage in a UE assisted positioning method with the UE 105 (e.g., using Long Term Evolution (LTE) Positioning Protocol (LPP)), and/or may engage in a network based positioning method with the gNB 106/202/307 (e.g. using an NR Positioning Protocol A (NRPPa)). The LMF 124 for example may select satellite suitable positioning methods, such as UE assisted methods or network based methods that would be difficult for the UE 105 to spoof. For example, a UE assisted positioning method may be based on the transfer of measurements from the UE 105 to the LMF 124 for at least one of Global Navigation Satellite System (GNSS) signals (e.g. from SVs 190), communication satellite signals, or a combination thereof. For example, FIG. 11 illustrates a procedure (described later) in which the location of the UE 105 is determined in an LPP location session between the LMF 124 and the UE 105. In some implementations, the LMF 124 may determine the country in which the UE 105 is located and may determine whether the country of the UE is verified to be the country associated with the serving PLMN. In some implementations, the LMF 124 determines the fixed cell and/or fixed TA (Cell ID and/or TAC) for the selected PLMN.

At stage 16, the LMF 124 provides a location response to the AMF 122 that includes the location for the UE 105. The location response may additionally or alternatively include an indication of the country (if determined) of the UE 105 (i.e. the country in which UE 105 is located), and optionally an indication of whether the country of the UE is verified to be the country associated with the serving PLMN. The location response may further include indications of the fixed cell and/or fixed TA (Cell ID and/or TAC) if determined by the LMF 124.

At stage 17, the AMF 122 may determine the country of the UE 105 (i.e. the country in which UE 105 is located) if it is not provided in the location response in stage 16 (e.g. the AMF 122 may map a location of UE 105 provided at stage 16 to a country) and may determine whether the country of the UE 105 is verified to be the country associated with the serving PLMN. Assuming the country of the UE 105 is the same as for the selected PLMN, the AMF 122 may further map the location of the UE 105 to an identity of a fixed serving cell and/or an identity of a fixed TA, if not performed by the LMF 124 at stage 15 or by the gNB 106/202/307 at stage 11. At stage 17, the AMF 122 may also determine allowed TAs (TACs) for the UE 105 in the selected PLMN, where the UE 105 is allowed to access the selected PLMN in each TA of the allowed TAs without needing to perform another Registration with the selected PLMN. AMF 122 may perform other actions at stage 17 associated with Registration of a UE 105 such as authenticating the UE 105 and registering the UE 105 in a home Unified Data Management (UDM) (not shown) and UE 105 and AMF 122 may perform additional actions associated with an initial registration after stage 19 which are not shown here but are well known in the art.

At stage 18, the AMF 122 may return a NAS Registration Reject message to UE 105 via gNB 106/202/307 if the country of UE 105 as indicated by LMF 124 at stage 16 or determined by the AMF 122 at stage 17 is not the same as for the selected PLMN. The NAS Registration Reject message may indicate the country (e.g. using an MCC) that the UE 105 is located in. If a NAS Registration Reject message is received, the UE 105 may restart at stage 6 using the provided country.

At stage 19, the AMF 122 returns a NAS Registration Accept message to UE 105 via gNB 106/202/307 if the NGAP message of stage 13 indicates that the UE location and/or country are fully verified by the gNB 106/202/307, or if the country of UE 105 is the same as for the selected PLMN as indicated by LMF 124 at stage 16 or determined by the AMF 122 at stage 17. The NAS Registration Accept message to UE 105 may include the allowed TAs (TACs) and, optionally, location information such as geographic definitions of the allowed TAs and constituent fixed cells for the allowed TAs. A Registration flag may also be included in the NAS Registration Accept message to indicate if the UE 105 is or is not required to perform a registration with the serving PLMN for a change of TA after detecting that the UE 105 is no longer in any of the allowed TAs.

At stage 20, the UE 105 stores the allowed TACs, geographic definitions of the allowed TACs and constituent fixed cells and the Registration flag (if included) to allow later determination of a current TA and cell. As part of stage 20, UE 105 may access the serving PLMN to obtain or enable various services.

Figure 10:
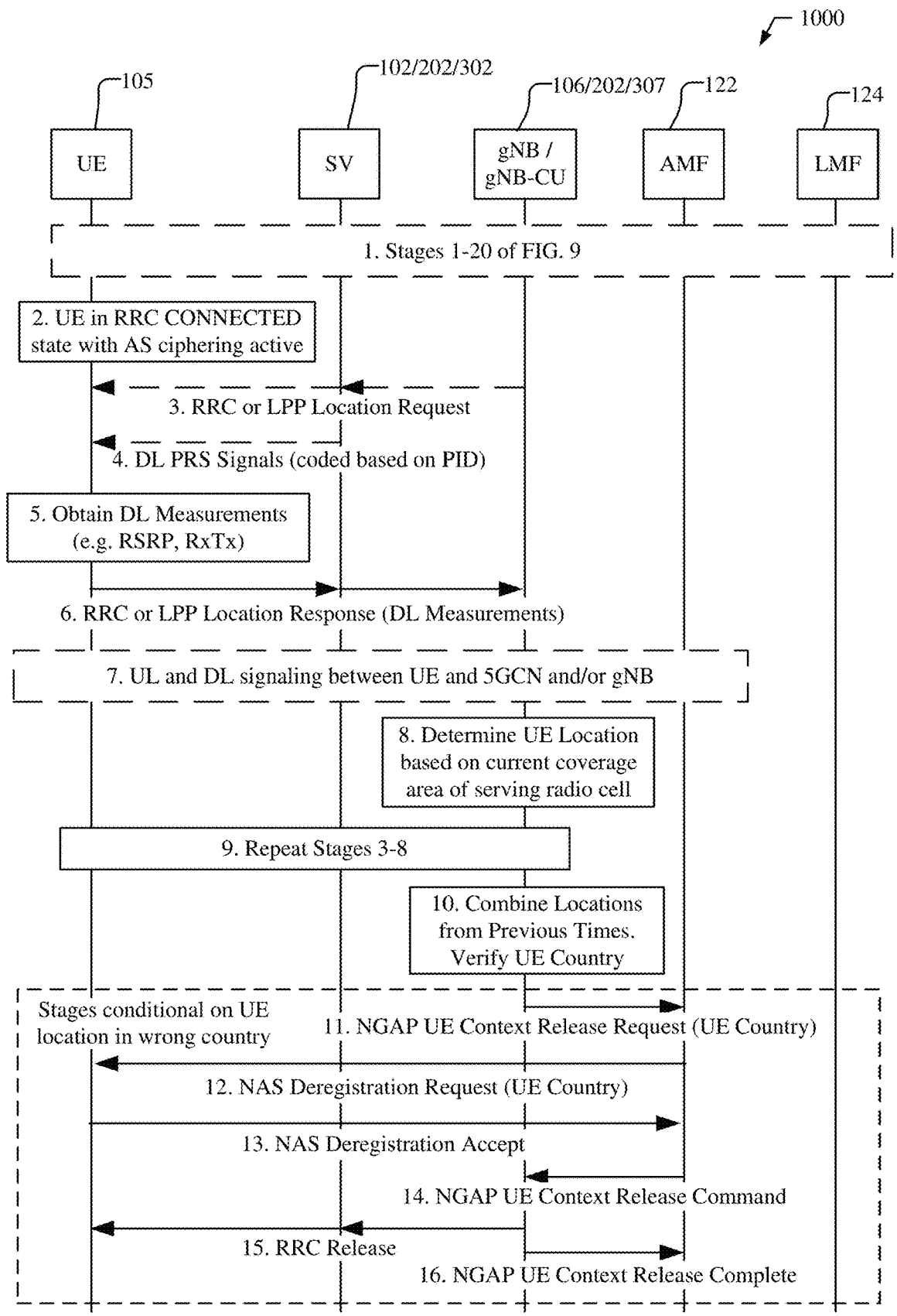
FIG. 10 shows a signaling flow that illustrates various messages sent between components of a communication system to determine the location of the UE based on measurements or communications over a period of time.

FIG. 10 shows a signaling flow 1000 that illustrates various messages sent between components of a communication system in a procedure for the gNB 106/202/307 to determine the location of a UE 105 based on measurements or communications between the UE 105 and a serving SV 102/202/302 acquired over a period of time (e.g. as also described according to FIG. 8). The communication network may be part of communication system 100, 200 or 300 for FIG. 1, 2 or 3, respectively, and is illustrated as including a UE 105, an SV 102/202/302, a gNB 106/202/307, an AMF 122, and an LMF 124. It should be understood that the gNB 106/202/307 or an element of the gNB 106/202/307 may be included within the SV 102/202/302. For example, with an SV 202, a gNB 202 would be completely included within the SV 202 as described for FIG. 2. Alternatively, with an SV 302, a gNB 307 (also referred to as a gNB-CU) would be terrestrial and physically separate from the SV 302, but the SV 302 would include a gNB-DU 302 as described for FIG. 3.

At stage 1 in FIG. 10, an initial registration of the UE 105 with the serving PLMN is performed, for example, as illustrated at stages 1-20 of FIG. 9. It should be understood that the initial registration with the serving PLMN is not limited to the implementations illustrated in FIG. 9 and that other processes of obtaining an initial registration with the serving PLMN may be performed.

At stage 2, the UE 105 is in a RRC connected state with the serving PLMN with Access Stratum (AS) ciphering between the UE 105 and gNB 102/202/307 active.

At stage 3, the gNB 106/202/307 may send an RRC or LPP location request message to the UE 105.

At stage 4, the UE 105 may optionally receive DL signals (e.g. DL PRS signals) as part of a serving radio cell from the serving SV 102/202/302. The DL signals may be coded according to a PID for the serving radio cell if the serving radio cell includes a PID. In some implementations, the UE 105 may receive DL signals (e.g. DL PRS signals) as part of other radio cells from additional SVs 102/202/302 (not shown in FIG. 10). A coverage area of the serving radio cell and coverage areas of the other radio cells may be moving.

At stage 5, the UE 105 may measure characteristics of the DL signals from the serving SV 102/202/302, such as RSRP, RSRQ, RxTx, AoA. If the UE 105 receives DL signals from multiple SVs 102/202/302, the UE 105 may further measure a DAOA and/or RSTD for one or more pairs of SVs 102/202/302.

At stage 6, the UE 105 sends an RRC or LPP location response message to the gNB 106/202/307 via the SV 102/202/302. The location response message includes the DL measurements performed at stage 5, optionally a time of each DL measurement, and an identification (e.g. PID) for each measured radio cell. The DL measurements, the times of the DL measurements (if included) and the PIDs (if included) may be ciphered based on the AS ciphering by UE 105.

At optional stage 7, UL and DL signaling between the UE 105 and the serving 5GCN 110, e.g., AMF 122, may be sent via the serving SV 102/202/302 and the gNB 106/202/307. For example, the UL and DL signaling may be used to (i) transport data and/or voice, and/or (ii) establish or release calls and/or sessions, between the UE 105 and a server or other user (e.g. another UE) via the 5GCN 110. In addition or instead at stage 7, UL and DL signaling may be exchanged between the UE 105 and the gNB 106/202/307 via the serving SV 102/202/302, e.g. in order to provide handover related measurements from the UE 105 to the gNB 106/202/307 or to enable the gNB 106/202/307 to update transmission characteristics in the UE 105 such as a timing advance, a Doppler frequency shift or a transmission power level.

At stage 8, the gNB 106/202/307 may determine the UE 105 location based on the current coverage area of the serving radio cell for UE 105 and any DL measurements for the serving radio cell provided at stage 6. The serving radio cell for the UE 105 may be determined based on, e.g., the UL and DL signaling between the UE 105 and the SV 102/202/302, e.g., from stage 7, and/or the DL location measurements provided at stage 6. The coverage area of the serving radio cell may be inferred by the gNB 106/202/307 based on a known location of the serving SV 102/202/302 and the radio beams direction and angular range of the direction, and/or may be configured in advance in the gNB 106/202/307 by Operations & Maintenance (O&M). In one implementation, the UE 105 location may be determined to be the coverage area(s) of the serving radio cell for the SV 102/202/302 at the time(s) of the receipt of the DL or UL signals at the gNB 106/202/307 at stage 7. The approximate area of the location of the UE 105 may be refined using the DL location measurements provided at stage 6.

At stage 9, stages 3-8 of FIG. 10 may be repeated over time, e.g., over 5-15 minutes. For example, in some implementations, the stages 3-8 of FIG. 10 may be performed three times to produce three estimates of the UE 105 location based on the current coverage area of the serving radio cell at different times, as illustrated in FIG. 8. For example, the coverage area of the serving radio cell may be moving, as discussed for FIG. 8, which may produce different estimates of the UE 105 location at different times. As part of stage 9, the UE 105 may measure characteristics of the DL signals from the serving SV 102/202/302 (as at stage 5) at each of the different times and may provide the DL measurements to the gNB 106/202/307 (as at stage 6).

At stage 10, the multiple locations of the UE 105 from different times are combined, e.g., as illustrated in FIG. 8, to narrow the possible area of location of the UE 105. The country of the UE 105 may be verified using the combined locations. For example, gNB 106/202/307 may map the area of the combined locations to a country and verify the country matches the country of the serving PLMN. If the UE 105 is determined to be in the correct country, i.e., the country matches the country of the serving PLMN, no further action is required, although the serving gNB 106/202/307 may continue to monitor the location and country of the UE 105 by continuing to perform stage 3-10. If the UE 105 country is determined to not match the country of the serving PLMN, the serving gNB 106/202/307 may either handoff the UE 105 to a different PLMN in the country determined for the UE 105 (not shown in FIG. 10), or, as shown at stages 11-16 and as described below, the registration with the serving PLMN may be released and the signaling connection with UE 105 may be further released.

At stage 11, if the UE location is in the wrong country for the serving PLMN, the gNB 106/202/307 sends a Next Generation Application Protocol (NGAP) UE Context Release Request message to the 5GCN, e.g., the AMF 122, indicating the UE country. The Context Release Request message may indicate the UE country (e.g. using an MCC).

At stage 12, the AMF 122 sends a NAS Deregistration Request message to the UE 105. The Deregistration Request message may indicate the UE country (e.g. using an MCC).

At stage 13, the UE 105 sends a NAS Deregistration Accept message to the AMF 122.

At stage 14, the AMF 122 sends an NGAP UE Context Release Command message to the gNB 106/202/307.

At stage 15, the gNB 106/202/307 sends an RRC release message to the UE 105 via the SV 102/202/302. The UE may then attempt to access a PLMN in the country of the UE (e.g. as indicated at stage 12)—e.g. by starting the procedure in FIG. 9.

At stage 16, the AMF 122 sends an NGAP UE Context Release Complete message to the AMF 122.

FIG. 11 shows a signaling flow 1100 that illustrates various messages sent between components of the communication system 100, 200 or 300 depicted in FIGS. 1-3, during a location session between the UE 105 and the LMF 124 to determine the location of the UE 105 based on a UE assisted positioning method using measurements or communications between the UE 105 and the serving SV 102/202/302, e.g., using Long Term Evolution (LTE) Positioning Protocol (LPP). The location procedure, for example, relies on the satellite access for the UE 105 to ensure that the location is fully reliable and may not allow UE spoofing. For example, the LMF 124 may initiate a location procedure that includes satellite suitable positioning methods (e.g. UE assisted rather than UE based methods to make spoofing more difficult). The procedure, for example, may be completely or partially performed at stage 15 of FIG. 9. Some messages in FIG. 9 may be replicated in FIG. 11 for the sake of completeness. Moreover, additional or fewer messages may be included in the signaling flow 1100. In the signaling flow 1100, it is assumed that the UE 105 and LMF 124 communicate using the LPP positioning protocol referred to earlier, although other protocols are also possible, e.g. the LPP Extensions protocol (LPPe) defined by the Open Mobile Alliance (OMA). The AMF 122 and LMF 124 may also belong to a serving and/or selected PLMN for the UE 105.

At stage 1 in FIG. 11, the AMF 122 for the UE 105 invokes an Nlmf_Location_DetermineLocation service operation request towards the LMF 124 to request the current location of the UE 105. Stage 1, for example, may be the same as stage 14 shown in FIG. 9. The AMF 122 may include an indication in the service operation that the UE 105 has 5G satellite access. The indication may be implicit or explicit. For example, in the case of an implicit indication, the AMF 122 may include an identity of a fixed serving cell in the service operation request (e.g. as received by AMF 122 from the gNB 106/202/307 as described for stage 13 of FIG. 9). The fixed serving cell may be associated by LMF 124 with 5G satellite access, e.g. if information for fixed cells for 5G satellite access is configured in the LMF 124. As an alternative, LMF 124 could assume 5G satellite access (implictly) if the service operation received at stage 1 requests LMF 124 to determine a country for UE 105. The AMF 122 may also provide an indication of a required Quality of Service (QoS) in the service operation at stage 1.

At stage 2, the LMF 124 sends an LPP Request Capabilities message, via the serving SV 102/202/302, to the UE 105 to request the positioning capabilities of the UE 105.

At stage 3, the UE 105 returns, via the serving SV 102/202/302, an LPP Provide Capabilities message to the LMF 124 to provide the positioning capabilities of the UE 105.

At stage 4, the LMF 124 may send an LPP Provide Assistance Data message to the UE 105. The LMF 120, for example, may provide A-GNSS assistance data and/or communications SV assistance data.

At stage 5, the LMF 124 sends an LPP Request Location Information message to the UE 105 to request the UE 105 to provide location measurements. For example, the LMF 124 may request location measurements from GNSS SVs 190 for A-GNSS positioning. In some implementations, the LMF 124 may also include a request for measurements from the serving SV 102/202/302 and other communications SVs 102/202/302 (not shown in FIG. 11), such as RSRP, RSRQ, RxTx, AoA, RSTD, or DAOA. In some implementations, the LMF 124 may request measurements for other positioning methods that do not use communication SV signals (e.g. WiFi positioning). The positioning method selected by the LMF 124, for example, may be a satellite suitable method that is difficult for the UE 105 to spoof, such as a UE assisted positioning method. The LMF 124 may further request that the UE 105 transmit uplink (UL) signals to be measured by the serving SV 102/202/302 or by the gNB 106/202/307.

At stage 6, DL signals (e.g. DL PRS signals) from the serving SV 102/202/302 and other SVs 102/202/302 and/or DL signals from GNSS SVs 190 are received by the UE 105.

At stage 7, the UE 105 acquires and measures the DL signals transmitted by the SVs 102/202/302 and/or GNSS SVs 190 at stage 6. For example, the UE 105 may measure GNSS signals from GNSS SVs 190 for A-GNSS positioning. The UE 105 may additionally or alternatively measure RSRP, RSRQ, RxTx, AoA, RSTD, DAOA or other measurements of the DL signals from SVs 102/202/302. The UE 105 may also obtain other non-SV signal measurements in addition if requested at stage 5.

At stage 8, the UE 105 sends an LPP Provide Location Information message to the LMF 124 and includes the positioning measurements obtained at stage 7. The LPP Provide Location Information message may be forwarded to the LMF 124 by the serving SV 102/202/302 and the serving gNB 106/202/307.

At stage 9, the LMF 124 determines the UE 105 location and, optionally, the country, based on the positioning measurements received from the UE 105 at stage 8. In some implementations, the LMF 120 may further determine the UE 105 location using positioning measurements obtained by one or more SVs 102/202/302 and/or by one for more gNBs 106/202/307 that were measured from UE 105 UL signals and that were requested by LMF 124 and subsequently sent to LMF 124, by the serving gNB 106/202/307 and/or by other gNBs 106/202/307, using NRPPa messages (not shown in FIG. 11). If LMF 124 determines the country at stage 9, the LMF 124 may also verify whether the country is associated with a PLMN for the LMF 124 and AMF 122 (e.g. which may also be a serving PLMN for the UE 105).

At stage 10, the LMF 124 returns an Nlmf_Location_DetermineLocation Response to the AMF 122 to return at least one of the determined location, the country (if determined at stage 9), and an indication of whether the LMF 124 verified that the country (if determined) is associated with a PLMN for the LMF 124 and AMF 122.

Figure 12:
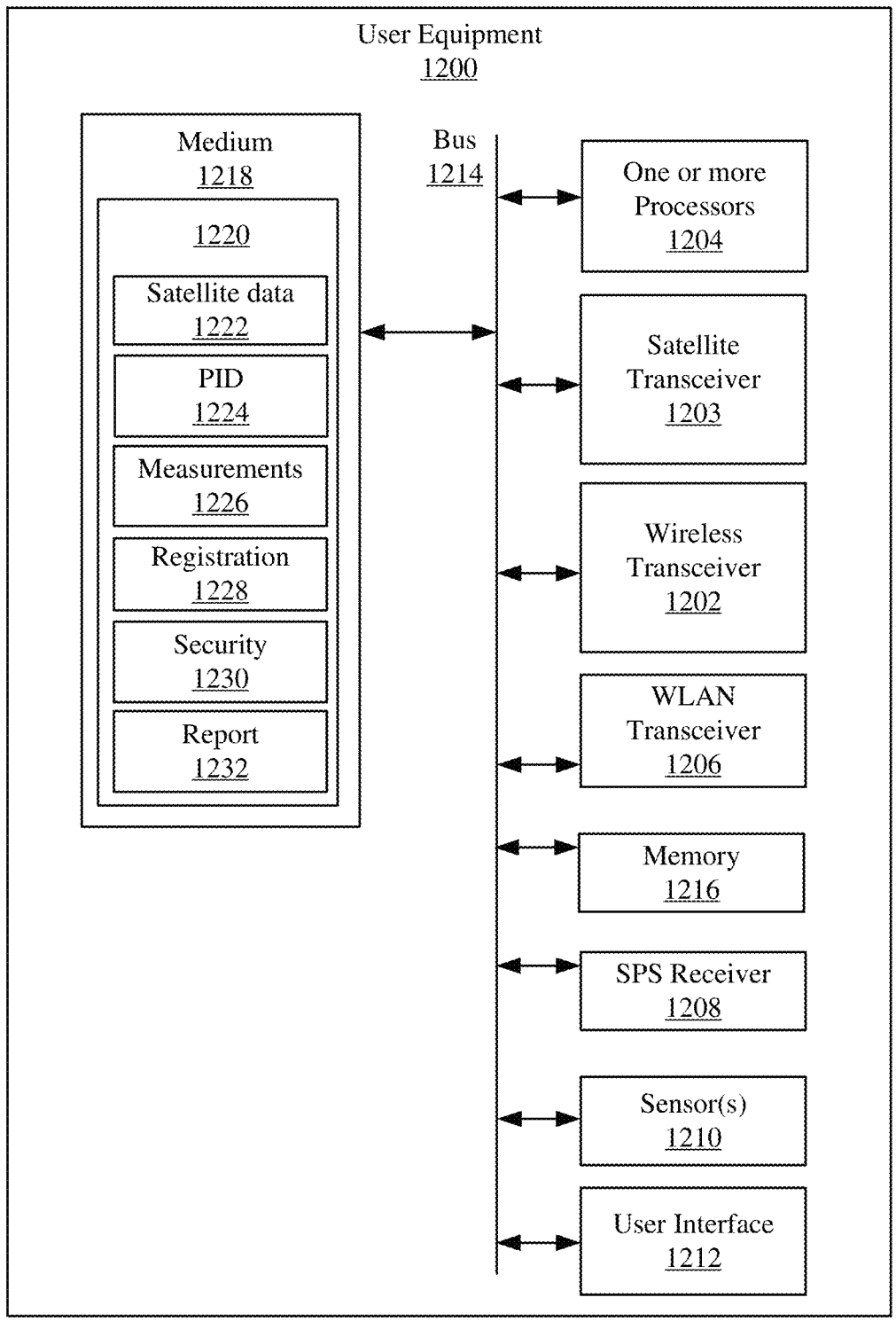
FIG. 12 is a diagram illustrating an example of a hardware implementation of a UE configured to access a serving PLMN through SVs.

FIG. 12 is a diagram illustrating an example of a hardware implementation of UE 1200, such as UE 105 shown in FIGS. 1, 2, and 3. The UE 1200 may perform the signal flows 900, 1000, and 1100 of FIGS. 9, 10 and 11 and process flows 1600 and 1800 of FIGS. 16 and 18 and algorithms disclosed herein. The UE 1200 may include, e.g., hardware components such as a satellite transceiver 1203 to wirelessly communicate with a SV 102/202/302, e.g., as shown in FIGS. 1, 2, and 3. The UE 1200 may further include wireless transceiver 1202 to wirelessly communicate with terrestrial base stations in an NG-RAN 112, e.g., base stations such as gNB 114 or an ng-eNB. The UE 1200 may also include additional transceivers, such a wireless local area network (WLAN) transceiver 1206, as well as an SPS receiver 1208 for receiving and measuring signals from SPS SVs 190 (shown in FIGS. 1, 2, and 3). In some implementations, the UE 1200 may receive data from a satellite, e.g., via satellite transceiver 1203, and may respond to a terrestrial base station, e.g., via wireless transceiver 1202, or via WLAN transceiver 1206. Thus, UE 1200 may include one or more transmitters, one or more receives or both, and these may be integrated, discrete, or a combination of both. The UE 1200 may further include one or more sensors 1210, such as cameras, accelerometers, gyroscopes, electronic compass, magnetometer, barometer, etc. The UE 1200 may further include a user interface 1212 that may include e.g., a display, a keypad or other input device, such as virtual keypad on the display, through which a user may interface with the UE 1200. The UE 1200 further includes one or more processors 1204, memory 1216, and non-transitory computer readable medium 1218, which may be coupled together with bus 1214. The one or more processors 1204 and other components of the UE 1200 may similarly be coupled together with bus 1214, a separate bus, or may be directly connected together or coupled using a combination of the foregoing.

The one or more processors 1204 may be implemented using a combination of hardware, firmware, and software. For example, the one or more processors 1204 may be configured to perform the functions discussed herein by implementing one or more instructions or program code 1220 on a non-transitory computer readable medium, such as medium 1218 and/or memory 1216. In some embodiments, the one or more processors 1204 may represent one or more circuits configurable to perform at least a portion of a data signal computing procedure or process related to the operation of UE 1200.

Figure 16:
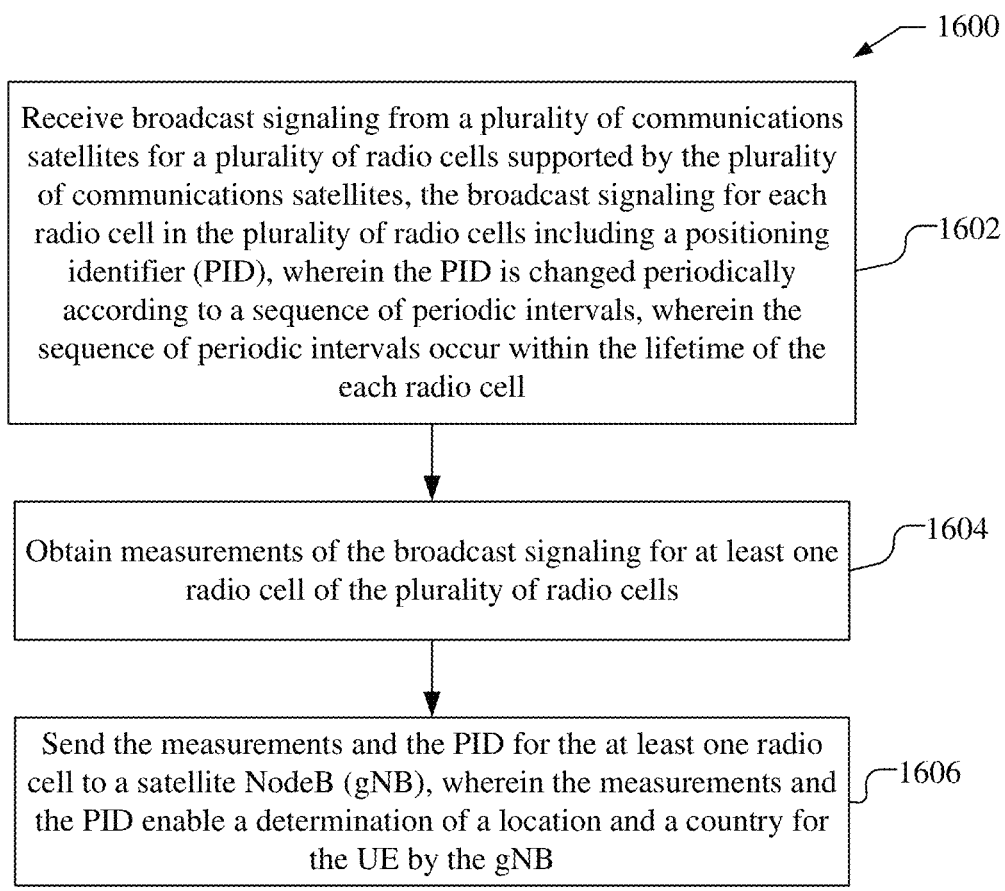
FIG. 16 is a flowchart of an example procedure performed by a UE for access to a serving PLMN through SVs.
Figure 18:
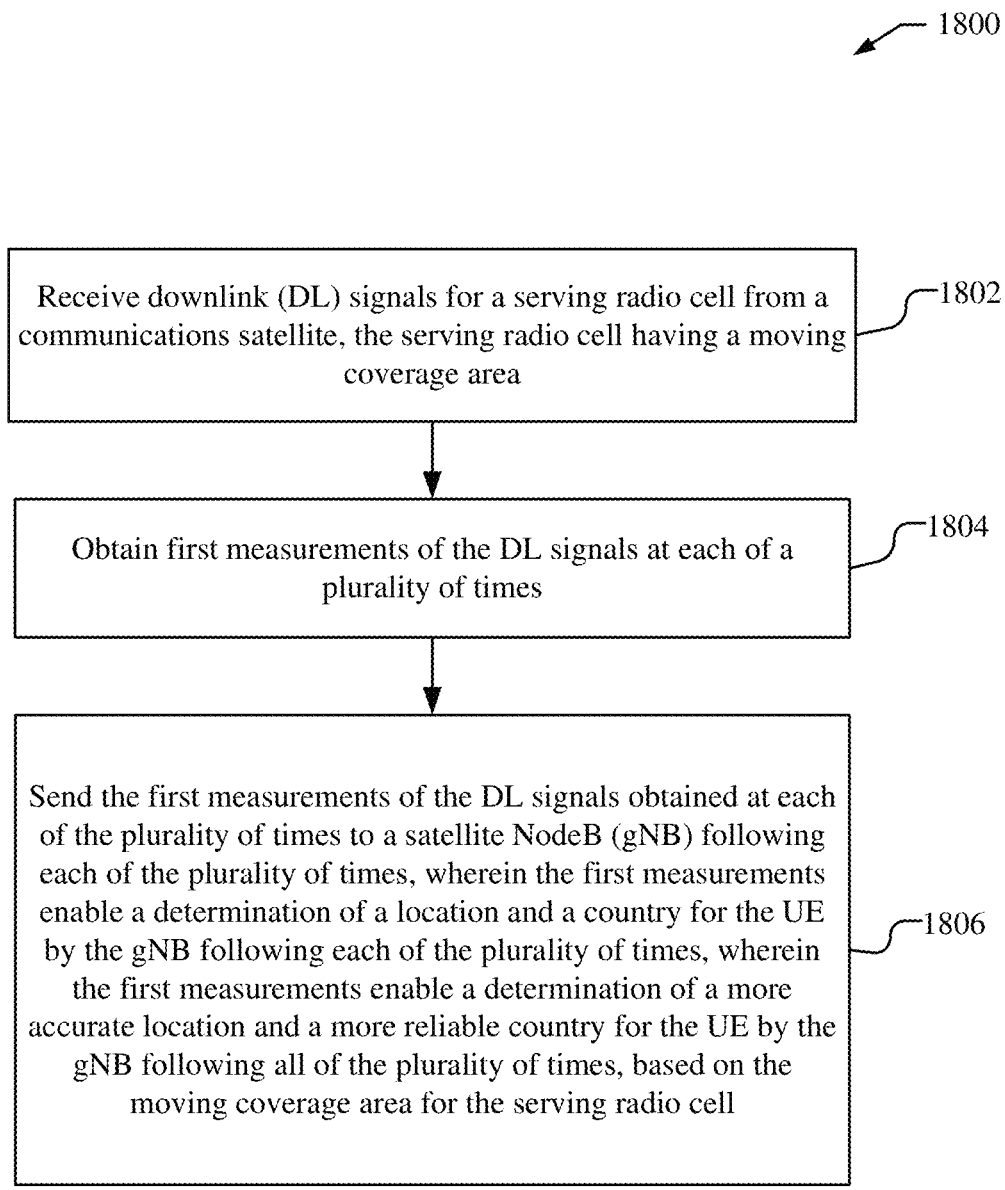
FIG. 18 is a flowchart of an example procedure performed by a UE for access to a serving PLMN through SVs.

The medium 1218 and/or memory 1216 may store instructions or program code 1220 that contain executable code or software instructions that when executed by the one or more processors 1204 cause the one or more processors 1204 to operate as a special purpose computer programmed to perform the techniques disclosed herein (e.g. such as the process flows 1600 and 1800 of FIGS. 16 and 18). As illustrated in UE 1200, the medium 1218 and/or memory 1216 may include one or more components or modules that may be implemented by the one or more processors 1204 to perform the methodologies described herein. While the components or modules are illustrated as software in medium 1218 that is executable by the one or more processors 1204, it should be understood that the components or modules may be stored in memory 1216 or may be dedicated hardware either in the one or more processors 1204 or off the processors.

A number of software modules and data tables may reside in the medium 1218 and/or memory 1216 and be utilized by the one or more processors 1204 in order to manage both communications and the functionality described herein. It should be appreciated that the organization of the contents of the medium 1218 and/or memory 1216 as shown in UE 1200 is merely exemplary, and as such the functionality of the modules and/or data structures may be combined, separated, and/or be structured in different ways depending upon the implementation of the UE 1200. While the components or modules are illustrated as software in medium 1218 and/or memory 1216 that is executable by the one or more processors 1204, it should be understood that the components or modules may be firmware or dedicated hardware either in the one or more processors 1204 or off the processors.

As illustrated, the program code 1220 stored on medium 1218 and/or memory 1216 may include a satellite data module 1222 that when implemented by the one or more processors 1204 configures the one or more processors 1204 to receive DL signals and transmit UL signals with one or more communication satellites via the satellite transceiver 1203. The one or more processors 1204 may be configured, for example, to receive broadcast signaling from one or more communications satellites for supported radio cells. The one or more processors 1204 may be configured, for example, to receiving DL signals for a serving radio cell from a communications satellite, where the serving radio cell has a moving coverage area.

The program code 1220 stored on medium 1218 and/or memory 1216 may include a PID module 1224 that when implemented by the one or more processors 1204 configures the one or more processors 1204 to obtain the positioning identifier (PID) from broadcast signaling received from one or more SVs via the satellite transceiver 1203. The broadcast signaling for each radio cell may include the PID, which may be changed periodically according to a sequence of periodic intervals that occur within a lifetime of the radio cell.

The program code 1220 stored on medium 1218 and/or memory 1216 may include a measurement module 1226 that when implemented by the one or more processors 1204 configures the one or more processors 1204 to obtain measurements of the broadcast signaling from one or more SVs via the satellite transceiver 1203. By way of example, the measurements may include RSRP, RSRQ, RxTx, AoA from one or more SVs, and RSTD or DAOA from one or more pairs of SVs. The measurement module 1226 may further configure the one or more processors 1204 to perform GNSS measurements via SPS receiver 1208, for A-GNSS positioning. The measurement module 1226 may configure the one or more processors 1204 to obtain measurements at each of a plurality of times.

The program code 1220 stored on medium 1218 and/or memory 1216 may include a registration module 1228 that when implemented by the one or more processors 1204 configures the one or more processors 1204 for registration and deregistration with a serving PLMN via the satellite transceiver 1203. For example, the one or more processors 1204 may be configured to send, via the satellite transceiver 1203, one or more PIDs for one or more radio cells and measurements to enable determination of a location and country of the UE by a gNB as part of the registration process. The one or more processors 1204 may be configured to send, via the satellite transceiver 1203, measurements over a period of time to enable determination of a location and country of the UE by a gNB as part of the registration process. The one or more processors 1204 may be configured to send the one or more PIDs and measurements to a gNB in a RRC message to complete an establishment of an RRC Signaling connection between the UE and the gNB. The one or more processors 1204 may be further configured to send, via the satellite transceiver 1203, a request for registration with a core network for the serving PLMN, e.g., in the RRC message.

The program code 1220 stored on medium 1218 and/or memory 1216 may include a security module 1230 that when implemented by the one or more processors 1204 configures the one or more processors 1204 to receive security information from the gNB, e.g., in an RRC message, via the satellite transceiver 1203. The one or more processors 1204 may be configured to cipher the measurements that are sent to the gNB, e.g., in an RRC message, based on the security information.

The program code 1220 stored on medium 1218 and/or memory 1216 may include a report module 1232 that when implemented by the one or more processors 1204 configures the one or more processors 1204 to send to a gNB measurements of the DL signals from communication satellites at each of the plurality of times, via the satellite transceiver 1203, e.g., to enable a determination of a more accurate location and a more reliable country for the UE by the gNB following all of the plurality of times, based on the moving coverage area for the serving radio cell.

The methodologies described herein may be implemented by various means depending upon the application. For example, these methodologies may be implemented in hardware, firmware, software, or any combination thereof. For a hardware implementation, the one or more processors 1204 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1200 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1218 or memory 1216 and executed by one or more processors 1204, causing the one or more processors 1204 to operate as a special purpose computer programmed to perform the techniques disclosed herein. Memory may be implemented within the one or processors 1204 or external to the one or more processors 1204. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1200 may be stored as one or more instructions or code on a non-transitory computer-readable storage medium such as medium 1218 or memory 1216. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1200 may be provided as signals on transmission media included in a communication apparatus. For example, a communication apparatus comprising part or all of UE 1200 may include a transceiver having signals indicative of instructions and data. The instructions and data are stored on non-transitory computer readable medium 1218 or memory 1216, and are configured to cause the one or more processors 1204 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 13:
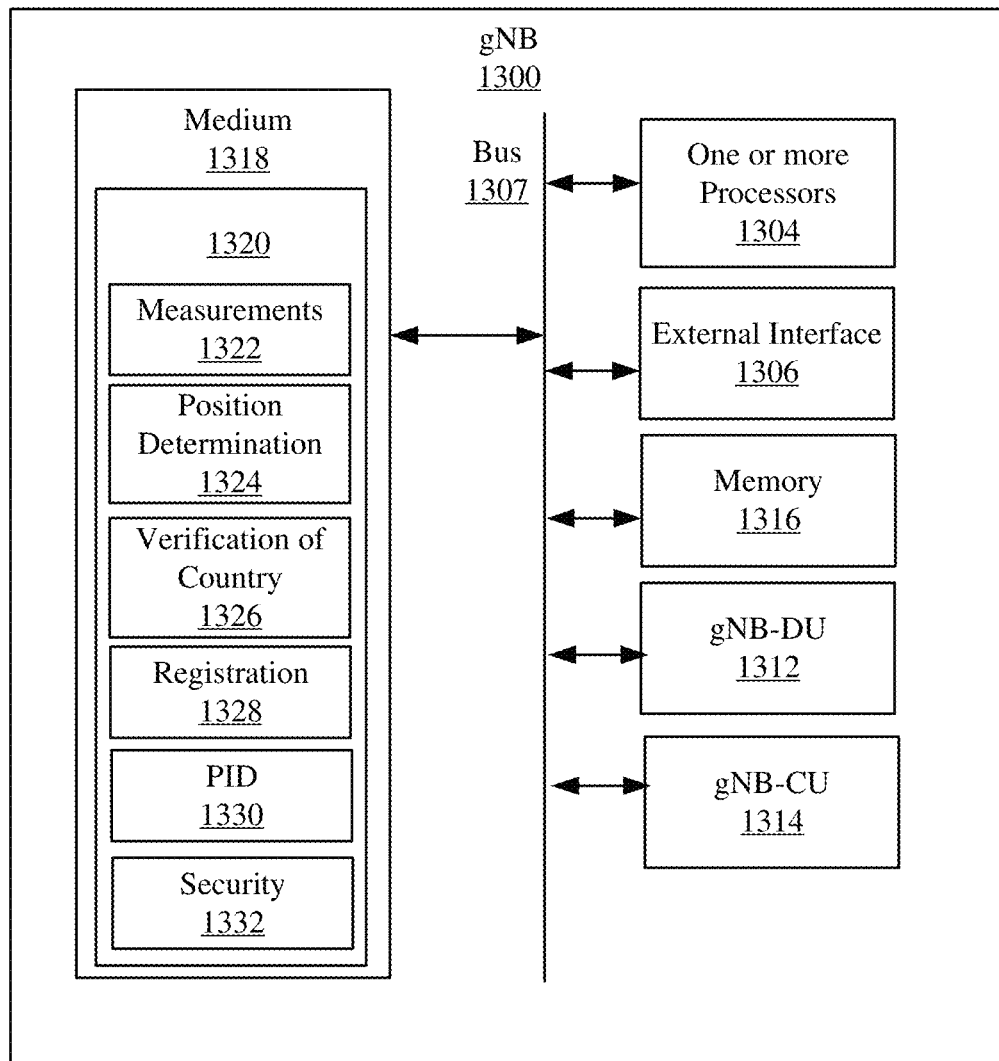
FIG. 13 is a diagram illustrating an example of a hardware implementation of a satellite NodeB (gNB) configured to support UE access to a serving PLMN through SVs.

FIG. 13 is a diagram illustrating an example of a hardware implementation of a satellite node B (gNB) 1300. The gNB 1300 may correspond to any of: (i) gNB 106, gNB-DU 104-3 or 104-4 or gNB-CU 107 illustrated in FIG. 1; (ii) gNB 202 in the SV 202 illustrated in FIG. 2; or (iii) gNB-DU 302 in the SV 302 or gNB-CU 307 illustrated in FIG. 3. The gNB 1300 may perform the signal flows 900, 1000, and 1100 of FIGS. 9, 10 and 11 and process flows 1700, 1900, or 2000 of FIG. 17, 19, or 20 and algorithms disclosed herein. The gNB 1300 may include, e.g., hardware components such as an external interface 1306, which may comprise one or more wired and/or wireless interfaces capable of connecting to and communicating with one or more entities in a core network in a PLMN, such as AMF 122 or UPF 130 in 5GCN 110 shown in FIG. 2, and earth stations 104, as well as other gNBs, UEs 105 (e.g. when gNB 1300 is part of an SV 202 or SV 302) and to other elements in a wireless network directly or through one or more intermediary networks and/or one or more network entities, as shown in FIGS. 1, 2, and 3. The external interface 1306 may include one or more antennas to support a wireless interface and/or a wireless backhaul to elements in the wireless network. The gNB 1300 further includes one or more processors 1304, memory 1316, and non-transitory computer readable medium 1318, which may be coupled together with bus 1307. The gNB 1300 is illustrated as including a gNB-DU 1312 and/or gNB-CU 1314 (e.g. in the case that gNB 1300 corresponds to gNB 106-3 in FIG. 1 or corresponds to gNB 202 in FIG. 2 with gNB 202 comprising a gNB-CU and one or more gNB-DUs), which may be hardware components or implemented by specifically configured one or more processors 1304. gNB-DU 1312 and gNB-CU 1314 may not be present when gNB 1300 itself corresponds to a gNB-DU (e.g. gNB-DU 302) or to a gNB-CU (e.g. gNB-CU 307).

The one or more processors 1304 may be implemented using a combination of hardware, firmware, and software. For example, the one or more processors 1304 may be configured to perform the functions discussed herein by implementing one or more instructions or program code 1320 on a non-transitory computer readable medium, such as medium 1318 and/or memory 1316. In some embodiments, the one or more processors 1304 may represent one or more circuits configurable to perform at least a portion of a data signal computing procedure or process related to the operation of gNB 1300.

Figure 17:
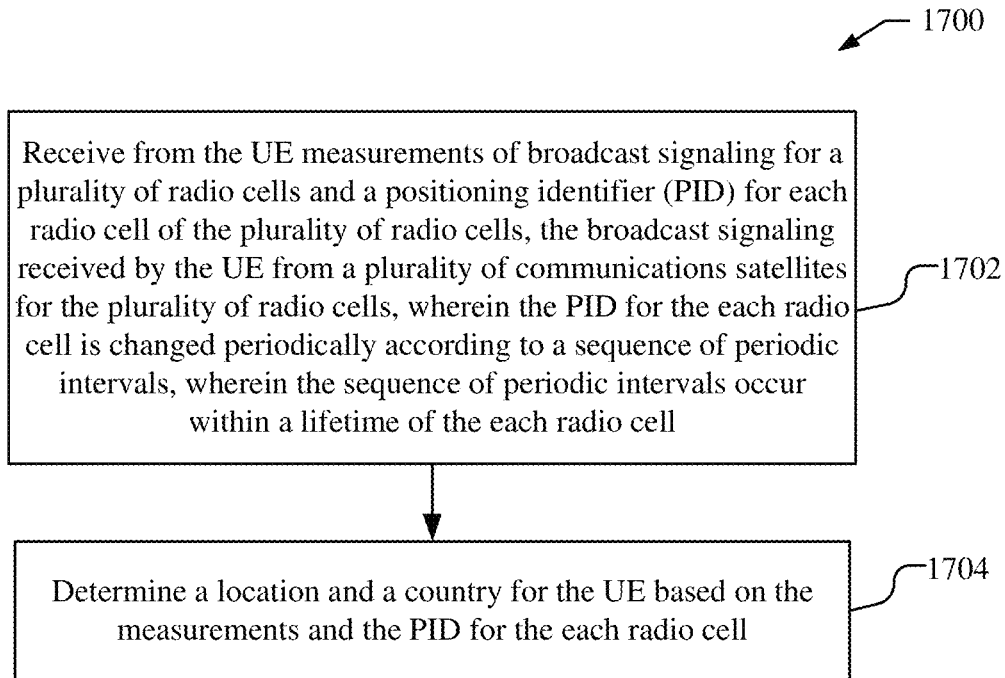
FIG. 17 is a flowchart of an example procedure performed by a satellite NodeB (gNB) for UE access to a serving PLMN through SVs.
Figure 19:
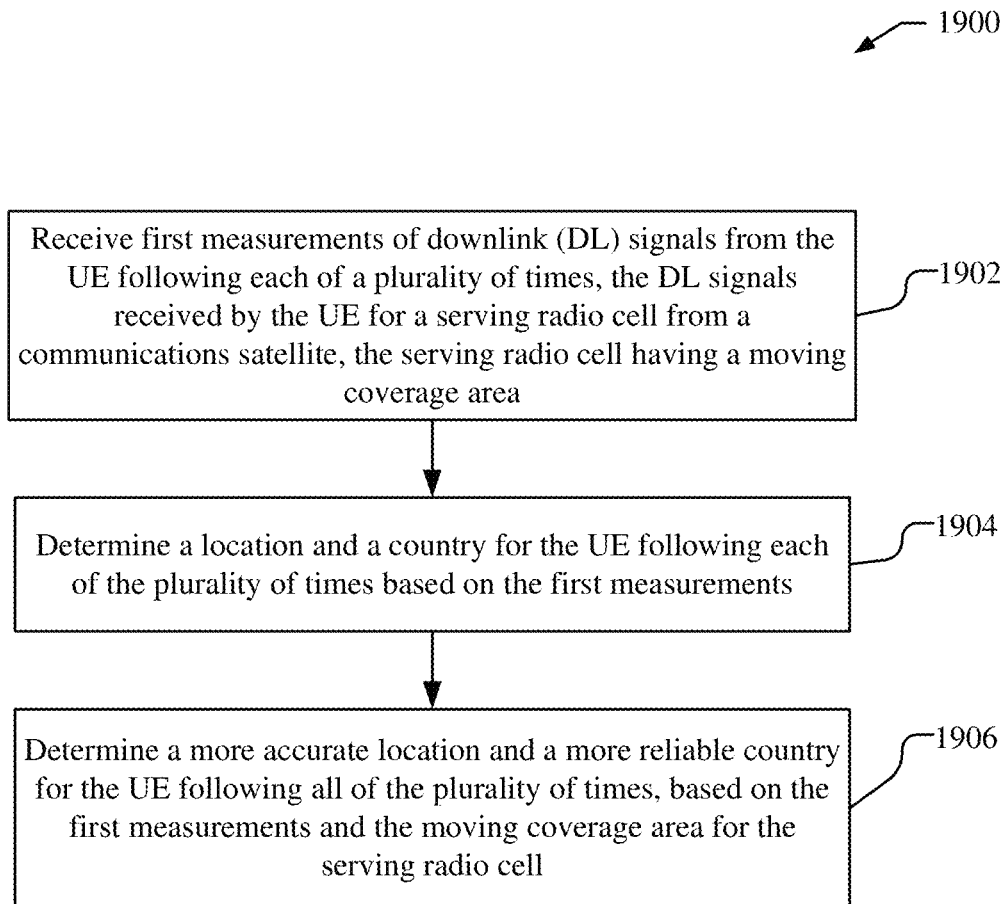
FIG. 19 is a flowchart of an example procedure performed by a satellite NodeB (gNB) for UE access to a serving PLMN through SVs.
Figure 20:
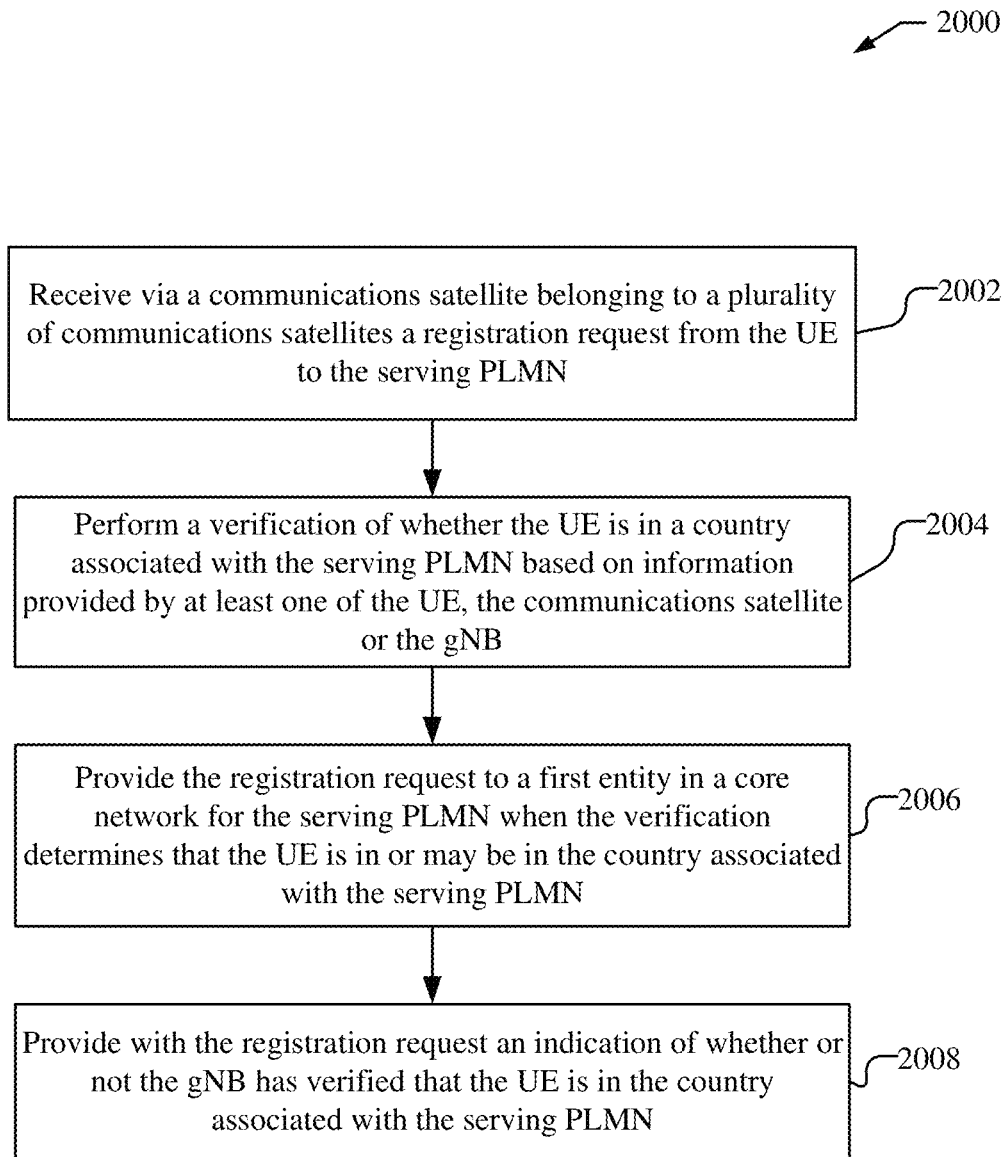
FIG. 20 is a flowchart of an example procedure performed by a satellite NodeB (gNB) for UE access to a serving PLMN through SVs.

The medium 1318 and/or memory 1316 may store instructions or program code 1320 that contain executable code or software instructions that when executed by the one or more processors 1304 cause the one or more processors 1304 to operate as a special purpose computer programmed to perform the techniques disclosed herein (e.g. such as the process flows 1700, 1900, or 2000 of FIG. 17, 19, or 20). As illustrated in gNB 1300, the medium 1318 and/or memory 1316 may include one or more components or modules that may be implemented by the one or more processors 1304 to perform the methodologies described herein. While the components or modules are illustrated as software in medium 1318 that is executable by the one or more processors 1304, it should be understood that the components or modules may be stored in memory 1316 or may be dedicated hardware either in the one or more processors 1304 or off the processors.

A number of software modules and data tables may reside in the medium 1318 and/or memory 1316 and be utilized by the one or more processors 1304 in order to manage both communications and the functionality described herein. It should be appreciated that the organization of the contents of the medium 1318 and/or memory 1316 as shown in gNB 1300 is merely exemplary, and as such the functionality of the modules and/or data structures may be combined, separated, and/or be structured in different ways depending upon the implementation of the gNB 1300. While the components or modules are illustrated as software in medium 1318 and/or memory 1316 that is executable by the one or more processors 1304, it should be understood that the components or modules may be firmware or dedicated hardware either in the one or more processors 1304 or off the processors.

As illustrated, the program code 1320 stored on medium 1318 and/or memory 1316 may include a measurements module 1322 that when implemented by the one or more processors 1304 configures the one or more processors 1304 to receive measurements produced by the UE from DL or broadcast signaling from one or more radio cells, including measurements from a serving radio cell and other radio cells, and/or from the measurements produced by the SV from UL signals transmitted by the UE, via the external interface 1306. The measurements, for example, may include RSRP, RSRQ, RxTx, AoA for one or more SVs or RSTD or DAOA for one or more pairs of SVs. The measurements, for example, may further include measurements of GNSS signals. The measurements may further include one or more PIDs obtained by the UE from broadcast SV signals. The measurements, for example, may be in a RRC, e.g., sent by the UE to complete an establishment of an RRC Signaling Connection between the UE and the gNB.

As illustrated, the program code 1320 stored on medium 1318 and/or memory 1316 may include a position determination module 1324 that when implemented by the one or more processors 1304 configures the one or more processors 1304 to determine a location and country of the UE based on received measurements. For example, the one or more processors 1304 may be configured to determine a location of the UE using an enhanced E-CID process using the PID and UE measurements. The one or more processors 1304 may additionally or alternatively, be configured to determine the location of the UE based measurements received over time, e.g., based on the coverage area of one or more moving radio cells, e.g., to determine a more accurate or more reliable country following reception of a plurality of measurements over time based on the measurements and a moving coverage area of a serving radio cell for the UE. The one or more processors 1304 may be configured to determine the country of the UE by mapping a determined location to the country.

As illustrated, the program code 1320 stored on medium 1318 and/or memory 1316 may include a verification of country module 1326 that when implemented by the one or more processors 1304 configures the one or more processors 1304 to verify whether the UE is in the country associated with the serving PLMN for the UE.

As illustrated, the program code 1320 stored on medium 1318 and/or memory 1316 may include a registration module 1328 that when implemented by the one or more processors 1304 configures the one or more processors 1304 for registration and deregistration of the UE with a serving PLMN via the external interface 1306. For example, the one or more processors 1304 may be configured to transmit and receive registration and deregistration requests with an AMF in the serving PLMN via the external interface 1306. The one or more processors 1304 may be configured to receive from the UE a request for a UE registration with a core network for the serving PLMN via a communications satellite. The one or more processors 1304 may be configured to indicate whether the country of the UE has been verified to be the same as the country associated with the PLMN. For example, the one or more processors 1304 may be configured to provide a request for the UE registration with a core network to an entity in the core network and may include an indication of whether the country of the UE has been verified to be the same as the country associated with the PLMN As illustrated, the program code 1320 stored on medium 1318 and/or memory 1316 may include a PID module 1330 that when implemented by the one or more processors 1304 configures the one or more processors 1304 to assign a numeric value to a PID for at least one radio cell controlled by the gNB and to broadcast, via the external interface 1306, the PID in the at least one radio cell. The assigned numeric value for the PID, for example, may be a pseudo-random value and may be changed periodically, e.g., at least every 60 seconds.

As illustrated, the program code 1320 stored on medium 1318 and/or memory 1316 may include a security module 1332 that when implemented by the one or more processors 1304 configures the one or more processors 1304 to send, via the external interface 1306, security information to the UE, e.g., in an RRC message, that enables ciphering of measurements to be transmitted by the UE, and to decipher the measurements received from the UE based on the security information.

The methodologies described herein may be implemented by various means depending upon the application. For example, these methodologies may be implemented in hardware, firmware, software, or any combination thereof. For a hardware implementation, the one or more processors 1304 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of gNB 1300 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1318 or memory 1316 and executed by one or more processors 1304, causing the one or more processors 1304 to operate as a special purpose computer programmed to perform the techniques disclosed herein. Memory may be implemented within the one or processors 1304 or external to the one or more processors 1304. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by gNB 1300 may be stored as one or more instructions or code on a non-transitory computer-readable storage medium such as medium 1318 or memory 1316. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for gNB 1300 may be provided as signals on transmission media included in a communication apparatus. For example, a communication apparatus comprising part or all of gNB 1300 may include a transceiver having signals indicative of instructions and data. The instructions and data are stored on non-transitory computer readable media, e.g., medium 1318 or memory 1316, and are configured to cause the one or more processors 1304 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 14:
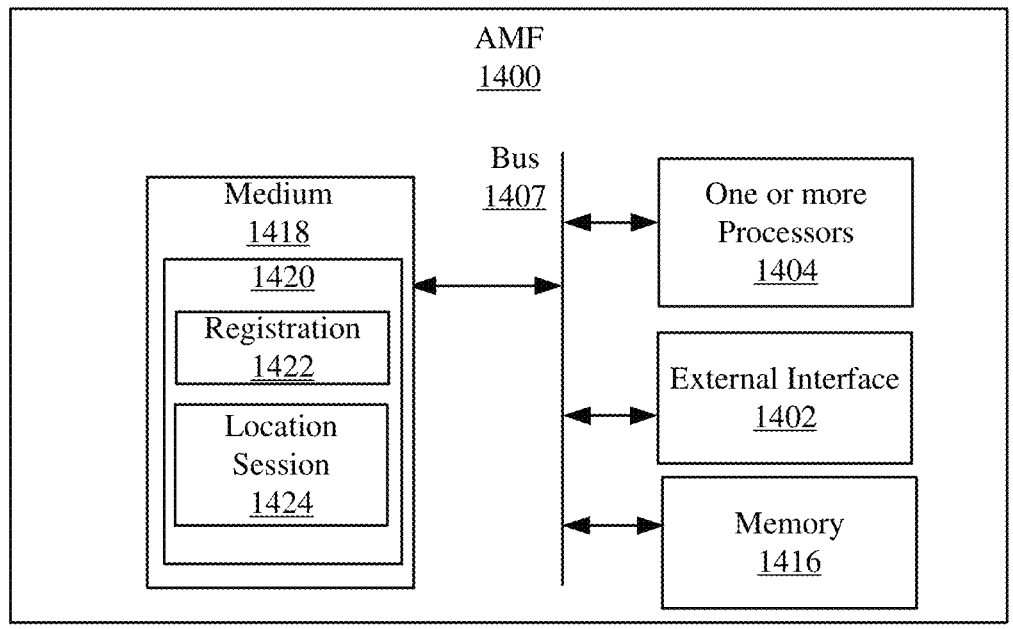
FIG. 14 is a diagram illustrating an example of a hardware implementation of an application management function (AMF) configured to support UE access to a serving PLMN through SVs.

FIG. 14 is a diagram illustrating an example of a hardware implementation of an AMF 1400 in a serving PLMN, e.g., such as AMF 122, shown in FIGS. 1, 2, and 3. The AMF 1400 may perform the signal flows 900, 1000, and 1100 of FIGS. 9, 10 and 11 and process flow 2100 of FIG. 21 and algorithms disclosed herein. The AMF 1400 includes, e.g., hardware components such as an external interface 1402 configured to be communication with a gNB 106 or earth station 104. The AMF 1400 includes one or more processors 1404, memory 1416, and non-transitory computer readable medium 4118, which may be coupled together with bus 1407.

The one or more processors 1404 may be implemented using a combination of hardware, firmware, and software. For example, the one or more processors 1404 may be configured to perform the functions discussed herein by implementing one or more instructions or program code 1420 on a non-transitory computer readable medium, such as medium 1418 and/or memory 1416. In some embodiments, the one or more processors 1404 may represent one or more circuits configurable to perform at least a portion of a data signal computing procedure or process related to the operation of AMF 1400.

Figure 21:
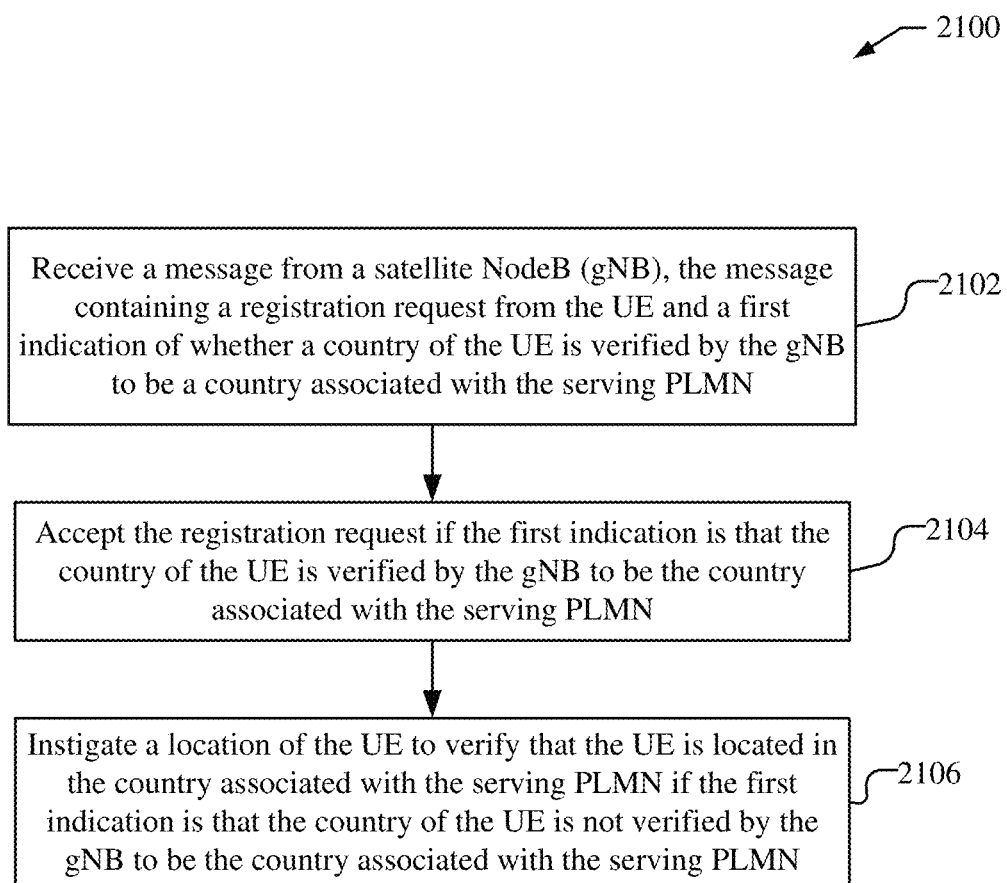
FIG. 21 is a flowchart of an example procedure performed by an AMF for UE access to a serving PLMN through SVs.

The medium 1418 and/or memory 1416 may store instructions or program code 1420 that contain executable code or software instructions that when executed by the one or more processors 1404 cause the one or more processors 1404 to operate as a special purpose computer programmed to perform the techniques disclosed herein (e.g. such as the process flow 2100 of FIG. 21). As illustrated in AMF 1400, the medium 1418 and/or memory 1416 may include one or more components or modules that may be implemented by the one or more processors 1404 to perform the methodologies described herein. While the components or modules are illustrated as software in medium 1418 that is executable by the one or more processors 1404, it should be understood that the components or modules may be stored in memory 1416 or may be dedicated hardware either in the one or more processors 1404 or off the processors.

A number of software modules and data tables may reside in the medium 1418 and/or memory 1416 and be utilized by the one or more processors 1404 in order to manage both communications and the functionality described herein. It should be appreciated that the organization of the contents of the medium 1418 and/or memory 1416 as shown in AMF 1400 is merely exemplary, and as such the functionality of the modules and/or data structures may be combined, separated, and/or be structured in different ways depending upon the implementation of the AMF 1400. While the components or modules are illustrated as software in medium 1418 and/or memory 1416 that is executable by the one or more processors 1404, it should be understood that the components or modules may be firmware or dedicated hardware either in the one or more processors 1404 or off the processors.

As illustrated, the program code 1420 stored on medium 1418 and/or memory 1416 may include a registration module 1422 that when implemented by the one or more processors 1404 configures the one or more processors 1404 for registration and deregistration of the UE with the serving PLMN via the external interface 1402. For example, the one or more processors 1304 may be configured to receive a registration requests for the UE from a gNB via the external interface 1402 that includes an indication of whether the country of the UE is verified by the gNB to be a country associated with the serving PLMN. The one or more processors 1404 may be configured to accept the registration if the country of the UE is verified to be in the country associated with the serving PLMN. The one or more processors 1404 may be configured to send and receive, via the external interface 1402, e.g., registration accept messages, registration reject messages, release request messages, deregistration request messages, deregistration accept messages, context release command messages and context release complete messages.

As illustrated, the program code 1420 stored on medium 1418 and/or memory 1416 may include a location session module 1424 that when implemented by the one or more processors 1404 configures the one or more processors 1404 to initiate and engage in a location session between the UE and an LMF, via the external interface 1402, if the country of the UE is not verified by the gNB to be in the country associated with the serving PLMN. For example, the one or more processors 1404 may be configured to send a location request to the LMF, via the external interface 1402, if the country of the UE is not verified by the gNB to be in the country associated with the serving PLMN. The location request may include an indication that the UE has satellite access. The one or more processors 1404 may be configured to receive a location response from the LMF, via the external interface 1402, where the response from the LMF may include the location of the UE or an indication of whether a country of the UE is verified to be the country associated with the serving PLMN. The one or more processors 1404 may determine the country of the UE based on the location if not provided by the LMF. The one or more processors 1404 may be configured to configured to determine if the country of the UE is in the country associated with the serving PLMN.

The methodologies described herein may be implemented by various means depending upon the application. For example, these methodologies may be implemented in hardware, firmware, software, or any combination thereof. For a hardware implementation, the one or more processors 1404 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of AMF 1400 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1418 or memory 1416 and executed by one or more processors 1404, causing the one or more processors 1404 to operate as a special purpose computer programmed to perform the techniques disclosed herein. Memory may be implemented within the one or processors 1404 or external to the one or more processors 1404. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by AMF 1400 may be stored as one or more instructions or code on a non-transitory computer-readable storage medium such as medium 1418 or memory 1416. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for AMF 1400 may be provided as signals on transmission media included in a communication apparatus. For example, a communication apparatus comprising part or all of AMF 1400 may include a transceiver having signals indicative of instructions and data. The instructions and data are stored on non-transitory computer readable media, e.g., medium 1418 or memory 1416, and are configured to cause the one or more processors 1404 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 15:
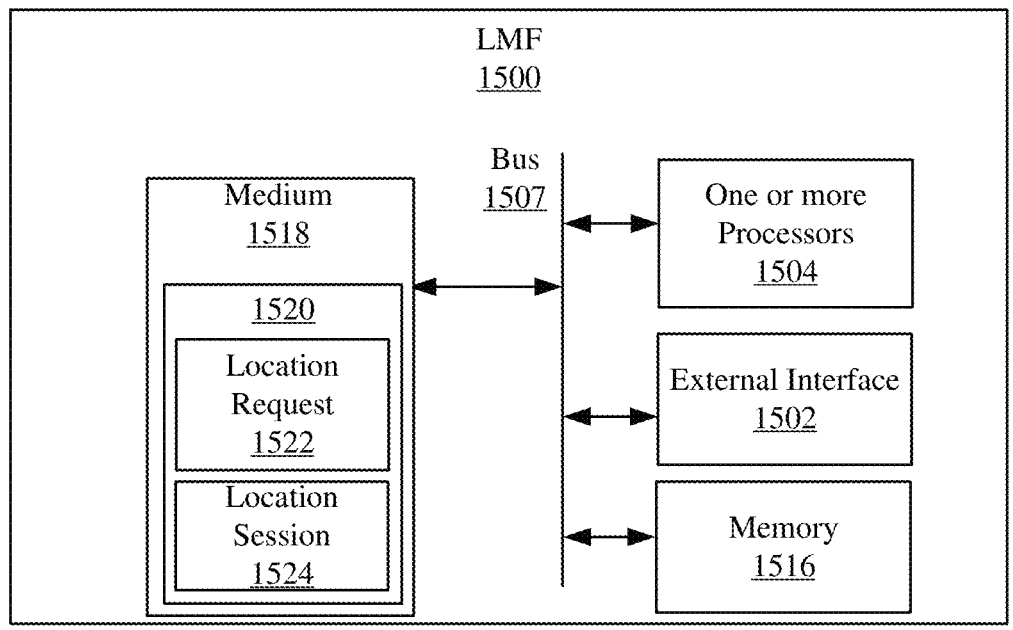
FIG. 15 is a diagram illustrating an example of a hardware implementation of a location management function (LMF) configured to support UE access to a serving PLMN through SVs.

FIG. 15 is a diagram illustrating an example of a hardware implementation of an LMF 1500 in a serving PLMN, e.g., such as LMF 124, shown in FIGS. 1, 2, and 3. The LMF 1500 may perform the signal flows 900, 1000, and 1100 of FIGS. 9, 10 and 11 and process flow 2200 of FIG. 22 and algorithms disclosed herein. The LMF 1500 includes, e.g., hardware components such as an external interface 1502 configured to be communication with an AMF 122. The LMF 1500 includes one or more processors 1504, memory 1516, and non-transitory computer readable medium 4118, which may be coupled together with bus 1507.

The one or more processors 1504 may be implemented using a combination of hardware, firmware, and software. For example, the one or more processors 1504 may be configured to perform the functions discussed herein by implementing one or more instructions or program code 1520 on a non-transitory computer readable medium, such as medium 1518 and/or memory 1516. In some embodiments, the one or more processors 1504 may represent one or more circuits configurable to perform at least a portion of a data signal computing procedure or process related to the operation of LMF 1500.

Figure 22:
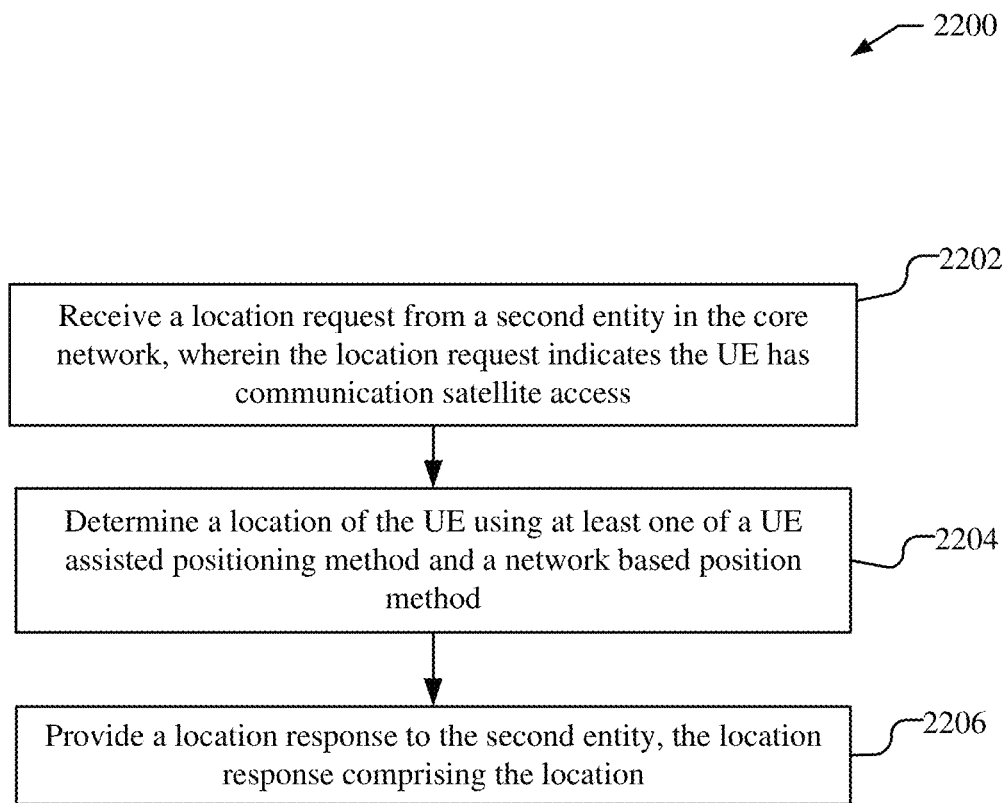
FIG. 22 is a flowchart of an example procedure performed by an LMF for UE access to a serving PLMN through SVs.

The medium 1518 and/or memory 1516 may store instructions or program code 1520 that contain executable code or software instructions that when executed by the one or more processors 1504 cause the one or more processors 1504 to operate as a special purpose computer programmed to perform the techniques disclosed herein (e.g. such as the process flow 2200 of FIG. 22). As illustrated in LMF 1500, the medium 1518 and/or memory 1516 may include one or more components or modules that may be implemented by the one or more processors 1504 to perform the methodologies described herein. While the components or modules are illustrated as software in medium 1518 that is executable by the one or more processors 1504, it should be understood that the components or modules may be stored in memory 1516 or may be dedicated hardware either in the one or more processors 1504 or off the processors.

A number of software modules and data tables may reside in the medium 1518 and/or memory 1516 and be utilized by the one or more processors 1504 in order to manage both communications and the functionality described herein. It should be appreciated that the organization of the contents of the medium 1518 and/or memory 1516 as shown in LMF 1500 is merely exemplary, and as such the functionality of the modules and/or data structures may be combined, separated, and/or be structured in different ways depending upon the implementation of the LMF 1500. While the components or modules are illustrated as software in medium 1518 and/or memory 1516 that is executable by the one or more processors 1504, it should be understood that the components or modules may be firmware or dedicated hardware either in the one or more processors 1504 or off the processors.

As illustrated, the program code 1520 stored on medium 1518 and/or memory 1516 may include a location request module 1522 that when implemented by the one or more processors 1504 configures the one or more processors 1504 to receive a location request for the UE from the AMF, via the external interface 1502, that may include an indication that the UE has communication satellite access.

As illustrated, the program code 1520 stored on medium 1518 and/or memory 1516 may include a location session module 1524 that when implemented by the one or more processors 1504 configures the one or more processors 1504 to engage in a location session with the UE, via the external interface 1502, to determine the location of the UE, e.g., using at least one of a UE assisted positioning method and a network based positioning method. The one or more processors 1504 may verify that the UE is located in the country associated with the serving PLMN. The one or more processors 1504, for example, may be configured to use GNSS signals, communication satellite signals, or a combination thereof. The one or more processors 1504, for example, may be configured to send a location response to the AMF, via the external interface 1502. The one or more processors 1504, for example, may be configured to determine the location of the UE, and in some implementations may be configured to determine the country of the UE or verify that the UE is in a country associated with the serving PLMN based on the location, and to provide an indication of whether the UE is in a country associated with the serving PLMN in the location response to the AMF.

The methodologies described herein may be implemented by various means depending upon the application. For example, these methodologies may be implemented in hardware, firmware, software, or any combination thereof. For a hardware implementation, the one or more processors 1504 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of LMF 1500 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1518 or memory 1516 and executed by one or more processors 1504, causing the one or more processors 1504 to operate as a special purpose computer programmed to perform the techniques disclosed herein. Memory may be implemented within the one or processors 1504 or external to the one or more processors 1504. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by LMF 1500 may be stored as one or more instructions or code on a non-transitory computer-readable storage medium such as medium 1518 or memory 1516. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for LMF 1500 may be provided as signals on transmission media included in a communication apparatus. For example, a communication apparatus comprising part or all of LMF 1500 may include a transceiver having signals indicative of instructions and data. The instructions and data are stored on non-transitory computer readable media, e.g., medium 1518 or memory 1516, and are configured to cause the one or more processors 1504 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

FIG. 16 shows a flowchart of an example process flow 1600 for supporting satellite wireless access by a user equipment (UE) to a serving public land mobile network (PLMN), performed by the UE, such as the UE 105 in FIGS. 1, 2, 3.

As illustrated, at block 1602, the UE receives broadcast signaling from a plurality of communications satellites (e.g. SVs 102, 202 or 302) for a plurality of radio cells supported by the plurality of communications satellites, the broadcast signaling for each radio cell in the plurality of radio cells including a positioning identifier (PID), wherein the PID is changed periodically according to a sequence of periodic intervals, wherein the sequence of periodic intervals occur within the lifetime of the each radio cell, e.g., as discussed at stages 2 and 3 of FIG. 9. In one implementation, the PID may be changed at least every 60 seconds. The PID may be a Physical Cell ID. A means for receiving broadcast signaling from a plurality of communications satellites for a plurality of radio cells supported by the plurality of communications satellites may be, e.g., the satellite transceiver 1203 and one or more processors 1204 with dedicated hardware or implementing executable code or software instructions in memory 1216 and/or medium 1218, such as the satellite data module 1222, in UE 1200 in FIG. 12.

At block 1604, the UE obtains measurements of the broadcast signaling for at least one radio cell of the plurality of radio cells, e.g., as discussed at stage 5 of FIG. 9. In one implementation, the measurements for the at least one radio cell may be at least one of a Reference Signal Received Power (RSRP), Reference Signal Received Quality (RSRQ), Receive Time and Transmit Time (RxTx), Angle of Arrival (AOA), or some combination of these. A means for obtaining measurements of the broadcast signaling for at least one radio cell of the plurality of radio cells may be, e.g., the satellite transceiver 1203 and one or more processors 1204 with dedicated hardware or implementing executable code or software instructions in memory 1216 and/or medium 1218, such as the measurement module 1226, in UE 1200 in FIG. 12.

At block 1606, the UE sends the measurements and the PID for the at least one radio cell to a satellite NodeB (gNB), e.g. a gNB 106, 202 or 307, wherein the measurements and the PID enable a determination of a location and a country for the UE by the gNB, e.g., as discussed at stages 10 and 11 of FIG. 9. In one implementation, the measurements of the broadcast signaling are obtained for the at least one radio cell and a second radio cell for the plurality of radio cells, and the UE may further send the measurements, the PID for the at least one radio cell and a PID for the second radio cell to the gNB, wherein the measurements, the PID for the at least one radio cell and the PID for the second radio cell enable the determination of the location and the country for the UE by the gNB, e.g., as discussed at stages 5, 10 and 11 of FIG. 9. In one implementation, the measurements may include a Reference Signal Time Difference (RSTD), a differential Angle of Arrival (DAOA), or both of these. A means for sending the measurements and the PID for the at least one radio cell to a satellite NodeB (gNB), wherein the measurements and the PID enable a determination of a location and a country for the UE by the gNB may be, e.g., the satellite transceiver 1203 and one or more processors 1204 with dedicated hardware or implementing executable code or software instructions in memory 1216 and/or medium 1218, such as the registration module 1228, in UE 1200 in FIG. 12. A means for sending the measurements, the PID for the at least one radio cell and a PID for the second radio cell to the gNB, wherein the measurements, the PID for the at least one radio cell and the PID for the second radio cell enable the determination of the location and the country for the UE by the gNB may be, e.g., the satellite transceiver 1203 and one or more processors 1204 with dedicated hardware or implementing executable code or software instructions in memory 1216 and/or medium 1218, such as the registration module 1228, in UE 1200 in FIG. 12.

In one implementation, the measurements and the PID for the at least one radio cell may be sent to the gNB in a first Radio Resource Control (RRC) message, wherein the first RRC message is sent to complete an establishment of an RRC Signaling Connection between the UE and the gNB, e.g., as discussed at stages 10 and 11 of FIG. 9. The UE may further receive security information from the gNB in a second RRC message, e.g., as discussed at stage 8 of FIG. 9. The UE may cipher the measurements in the first RRC message based on the security information, e.g., as discussed at stage 10 of FIG. 9. A means for receiving security information from the gNB in a second RRC message and ciphering the measurements in the first RRC message based on the security information may be e.g., the satellite transceiver 1203 and one or more processors 1204 with dedicated hardware or implementing executable code or software instructions in memory 1216 and/or medium 1218, such as the security module 1230, in UE 1200 in FIG. 12. For example, the first RRC message may be an RRC Setup Complete message and the second RRC message may be an RRC Setup message, e.g., as discussed at stages 10 and 7, respectively, of FIG. 9. The UE may further include a request for registration with a core network for the serving PLMN in the first RRC message, wherein the determination of the location and the country for the UE by the gNB enables a verification by the gNB that the UE is located in a country associated with the serving PLMN, e.g., as discussed at stages 10 and 11 of FIG. 9. A means for including request for registration with a core network for the serving PLMN in the first RRC message may be, e.g., the satellite transceiver 1203 and one or more processors 1204 with dedicated hardware or implementing executable code or software instructions in memory 1216 and/or medium 1218, such as the registration module 1228, in UE 1200 in FIG. 12.

FIG. 17 shows a flowchart of an example process flow 1700 for supporting satellite wireless access by a user equipment (e.g. a UE 105) to a serving public land mobile network (PLMN), performed by a satellite NodeB (gNB), such as the gNB 106/202/307 in FIGS. 1, 2, 3.

As illustrated, at block 1702, the gNB may receive from the UE measurements of broadcast signaling for a plurality of radio cells and a positioning identifier (PID) for each radio cell of the plurality of radio cells, the broadcast signaling received by the UE from a plurality of communications satellites (e.g. SVs 102, 202 or 302) for the plurality of radio cells, wherein the PID for the each radio cell is changed periodically according to a sequence of periodic intervals, wherein the sequence of periodic intervals occur within the lifetime of the each radio cell, e.g., as discussed at stages 2, 3, 5 and 10 of FIG. 9. In one implementation, the measurements may comprise at least one of a Reference Signal Received Power (RSRP), Reference Signal Received Quality (RSRQ), Receive Time-Transmit Time difference (RxTx), Angle of Arrival (AOA), Reference Signal Time Difference (RSTD), differential Angle of Arrival (DAOA), or some combination of these. In one implementation, the PID for the each radio cell may be a Physical Cell ID. A means for receiving from the UE measurements of broadcast signaling for a plurality of radio cells and a positioning identifier (PID) for each radio cell of the plurality of radio cells may be, e.g., the external interface 1306 and one or more processors 1304 with dedicated hardware or implementing executable code or software instructions in memory 1316 and/or medium 1318, such as measurements module 1322, in gNB 1300 in FIG. 13.

At block 1704, the gNB may determine a location and a country for the UE based on the measurements and the PID for the each radio cell, e.g., as discussed at stage 11 of FIG. 9. A means for determining a location and a country for the UE based on the measurements and the PID for the each radio cell may be, e.g., the one or more processors 1304 with dedicated hardware or implementing executable code or software instructions in memory 1316 and/or medium 1318, such as position determination module 1324, in gNB 1300 in FIG. 13.

In one implementation, the plurality of radio cells may include at least one radio cell controlled by the gNB and the gNB may assign a numeric value to a PID for the at least one radio cell, e.g., as discussed in stage 2 of FIG. 9. The gNB may broadcast the PID in the at least one radio cell, e.g., as discussed at stage 2 and stage 3 of FIG. 9. In one implementation, the numeric value for the PID may be a pseudo-random value. In one implementation, the numeric value for the PID may be changed at least every 60 seconds. A means for assigning a numeric value to a PID for the at least one radio cell may be, e.g., the one or more processors 1304 with dedicated hardware or implementing executable code or software instructions in memory 1316 and/or medium 1318, such as PID module 1330, in gNB 1300 in FIG. 13. A means for broadcasting the PID in the at least one radio cell may be, e.g., the external interface 1306 and one or more processors 1304 with dedicated hardware or implementing executable code or software instructions in memory 1316 and/or medium 1318, such as PID module 1330, in gNB 1300 in FIG. 13, as well the SV 102/202/302.

In one implementation, the measurements of the broadcast signaling and the PID for the each radio cell may be received from the UE in a first Radio Resource Control (RRC) message, wherein the first RRC message is sent by the UE to complete an establishment of an RRC Signaling Connection between the UE and the gNB, e.g., as discussed at stage 10 of FIG. 9. In one implementation, the gNB may further send security information to the UE in a second RRC message, wherein the security information enables ciphering of the measurements by the UE in the first RRC message, e.g., as discussed at stage 8 of FIG. 9. The gNB may decipher the measurements received in the first RRC message, based on the security information, e.g., as discussed at stages 10 and 11 of FIG. 9. For example, the first RRC message may be an RRC Setup Complete message and the second RRC message may be an RRC Setup message, e.g., as discussed at stages 10 and 7, respectively, in FIG. 9. A means for sending security information to the UE in a second RRC message, wherein the security information enables ciphering of the measurements by the UE in the first RRC message may be, e.g., the external interface 1306 and one or more processors 1304 with dedicated hardware or implementing executable code or software instructions in memory 1316 and/or medium 1318, such as security module 1332, in gNB 1300 in FIG. 13. A means for deciphering the measurements received in the first RRC message, based on the security information may be, e.g., the one or more processors 1304 with dedicated hardware or implementing executable code or software instructions in memory 1316 and/or medium 1318, such as security module 1332, in gNB 1300 in FIG. 13.

In one implementation, the gNB may receive from the UE a request for a UE registration with a core network for the serving PLMN in the first RRC message, e.g., as discussed at stage 10 of FIG. 9. The gNB may verify that the UE is located in a country associated with the serving PLMN based on the location and the country determined for the UE, e.g., as discussed at stage 11 of FIG. 9. A means for receiving a request for a UE registration with a core network for the serving PLMN in the first RRC message may be, e.g., the external interface 1306 and one or more processors 1304 with dedicated hardware or implementing executable code or software instructions in memory 1316 and/or medium 1318, such as registration module 1328, in gNB 1300 in FIG. 13. A means for verifying that the UE is located in a country associated with the serving PLMN based on the location and the country determined for the UE may be, e.g., the one or more processors 1304 with dedicated hardware or implementing executable code or software instructions in memory 1316 and/or medium 1318, such as verification of country module 1326, in gNB 1300 in FIG. 13. The gNB may further provide (e.g. may send) the request for the UE registration with the core network to an entity in the core network with an indication of whether the gNB verified that the UE is located in the country associated with the serving PLMN, e.g., as discussed at stage 13 in FIG. 9. A means for providing the request for the UE registration with the core network to an entity in the core network with an indication of whether the gNB verified that the UE is located in the country associated with the serving PLMN may be, e.g., the external interface 1306 and one or more processors 1304 with dedicated hardware or implementing executable code or software instructions in memory 1316 and/or medium 1318, such as registration module 1328, in gNB 1300 in FIG. 13.

FIG. 18 shows a flowchart of an example process flow 1800 for supporting satellite wireless access by a user equipment (UE) to a serving public land mobile network (PLMN), performed by the UE, such as the UE 105 in FIGS. 1, 2, 3.

As illustrated, at block 1802, the UE receives downlink (DL) signals for a serving radio cell from a communications satellite (e.g. an SV 102, 202 or 302), the serving radio cell having a moving coverage area, e.g., as discussed in association with FIG. 8 and at stage 4 of FIG. 10. A means for receiving downlink (DL) signals for a serving radio cell from a communications satellite, the serving radio cell having a moving coverage area may be, e.g., the satellite transceiver 1203 and one or more processors 1204 with dedicated hardware or implementing executable code or software instructions in memory 1216 and/or medium 1218, such as satellite data module 1222, in UE 1200 in FIG. 12.

At block 1804, the UE obtains first measurements of the DL signals at each of a plurality of times, e.g., as discussed at stages 5 and 9 of FIG. 10. In one implementation, the first measurements comprise at least one of a Reference Signal Received Power (RSRP), Reference Signal Received Quality (RSRQ), Receive Time-Transmit Time difference (RxTx), Angle of Arrival (AoA), or some combination of these. A means for obtaining first measurements of the DL signals at each of a plurality of times may be, e.g., the satellite transceiver 1203 and one or more processors 1204 with dedicated hardware or implementing executable code or software instructions in memory 1216 and/or medium 1218, such as measurement module 1226, in UE 1200 in FIG. 12.

At block 1806, the UE sends the first measurements of the DL signals obtained at each of the plurality of times to a satellite NodeB (gNB), e.g. a gNB 106, 202 or 307, following each of the plurality of times, wherein the first measurements enable a determination of a location and a country for the UE by the gNB following each of the plurality of times, wherein the first measurements enable a determination of a more accurate location and a more reliable country for the UE by the gNB following all of the plurality of times, based on the moving coverage area for the serving radio cell, e.g., as discussed at stages 8, 9 and 10 of FIG. 10. The gNB may control the serving radio cell, wherein the gNB is a serving gNB for the UE. A means for sending the first measurements of the DL signals obtained at each of the plurality of times to a satellite NodeB (gNB) following each of the plurality of times may be, e.g., the satellite transceiver 1203 and one or more processors 1204 with dedicated hardware or implementing executable code or software instructions in memory 1216 and/or medium 1218, such as report module 1232, in UE 1200 in FIG. 12.

In one implementation, the UE may further send a request for a registration with a core network for the serving PLMN to the gNB, wherein the gNB forwards the request for the registration to the core network, e.g., as discussed at stages 10 and 13 of FIG. 9. For example, the determination of the more accurate location and the more reliable country for the UE by the gNB may enable a verification by the gNB that the UE is located in a country associated with the serving PLMN. A means for sending a request for a registration with a core network for the serving PLMN to the gNB, wherein the gNB forwards the request for the registration to the core network may be, e.g., the satellite transceiver 1203 and one or more processors 1204 with dedicated hardware or implementing executable code or software instructions in memory 1216 and/or medium 1218, such as registration module 1228, in UE 1200 in FIG. 12.

In one implementation, the UE may further receive DL signals for other radio cells from other communications satellites (e.g. SVs 102, 202 or 302), the other radio cells having moving coverage areas, e.g., as discussed at stages 4 and 9 of FIG. 10. A means for receiving DL signals for other radio cells from other communications satellites, the other radio cells having moving coverage areas may be, e.g., the satellite transceiver 1203 and one or more processors 1204 with dedicated hardware or implementing executable code or software instructions in memory 1216 and/or medium 1218, such as satellite data module 1222, in UE 1200 in FIG. 12. The UE may obtain second measurements of the DL signals for the serving radio cell and the other radio cells at each of the plurality of times, e.g., as discussed at stage 5 and 9 of FIG. 10. In one implementation, the second measurements may be at least one of a Reference Signal Received Power (RSRP), Reference Signal Received Quality (RSRQ), Receive Time-Transmit Time difference (RxTx), Angle of Arrival (AOA), Reference Signal Time Difference (RSTD), differential Angle of Arrival (DAOA), or some combination of these. A means for obtaining second measurements of the DL signals for the serving radio cell and the other radio cells at each of the plurality of times may be, e.g., the satellite transceiver 1203 and one or more processors 1204 with dedicated hardware or implementing executable code or software instructions in memory 1216 and/or medium 1218, such as measurement module 1226, in UE 1200 in FIG. 12. The UE may send the second measurements with the first measurements to the gNB following each of the plurality of times, wherein the first measurements and second measurements enable the determination of the more accurate location and the more reliable country for the UE by the gNB following all of the plurality of times, based on the moving coverage areas for the serving radio cell and the other radio cells, e.g., as discussed at stages 8 and 10 of FIG. 10. A means for sending the second measurements with the first measurements to the gNB following each of the plurality of times may be, e.g., the satellite transceiver 1203 and one or more processors 1204 with dedicated hardware or implementing executable code or software instructions in memory 1216 and/or medium 1218, such as report module 1232, in UE 1200 in FIG. 12.

FIG. 19 shows a flowchart of an example process flow 1900 for supporting satellite wireless access by a user equipment (e.g. a UE 105) to a serving public land mobile network (PLMN), performed by a satellite NodeB (gNB), such as the gNB 106/202/307 in FIGS. 1, 2, 3.

As illustrated, at block 1902, the gNB receives first measurements of downlink (DL) signals from the UE following each of a plurality of times, the DL signals received by the UE for a serving radio cell from a communications satellite (e.g. an SV 102, 202 or 302), the serving radio cell having a moving coverage area, e.g., as discussed at stages 6 and 9 of FIG. 10. The gNB may control the serving radio cell and the gNB may be a serving gNB for the UE. In one implementation, the first measurements comprise at least one of a Reference Signal Received Power (RSRP), Reference Signal Received Quality (RSRQ), Receive Time-Transmit Time difference (RxTx), Angle of Arrival (AoA), or some combination of these. A means for receiving first measurements of downlink (DL) signals from the UE following each of a plurality of times, the DL signals received by the UE for a serving radio cell from a communications satellite, the serving radio cell having a moving coverage area may be, e.g., the external interface 1306 and one or more processors 1304 with dedicated hardware or implementing executable code or software instructions in memory 1316 and/or medium 1318, such as measurements module 1322, in gNB 1300 in FIG. 13.

At block 1904, the gNB determines a location and a country for the UE following each of the plurality of times based on the first measurements, e.g., as discussed at stages 8 and 9 of FIG. 10. A means for determining a location and a country for the UE following each of the plurality of times based on the first measurements may be, e.g., the one or more processors 1304 with dedicated hardware or implementing executable code or software instructions in memory 1316 and/or medium 1318, such as position determination module 1324, in gNB 1300 in FIG. 13.

At block 1906, the gNB determines a more accurate location and a more reliable country for the UE following all of the plurality of times, based on the first measurements and the moving coverage area for the serving radio cell, e.g., as discussed at stage 10 of FIG. 10. A means for determining a more accurate location and a more reliable country for the UE following all of the plurality of times, based on the first measurements and the moving coverage area for the serving radio cell may be, e.g., the one or more processors 1304 with dedicated hardware or implementing executable code or software instructions in memory 1316 and/or medium 1318, such as position determination module 1324, in gNB 1300 in FIG. 13.

In one implementation, the gNB may receive from the UE a request for a registration with a core network for the serving PLMN, e.g., as discussed at stage 10 of FIG. 9. A means for receiving from the UE a request for a registration with a core network for the serving PLMN may be, e.g., the external interface 1306 and one or more processors 1304 with dedicated hardware or implementing executable code or software instructions in memory 1316 and/or medium 1318, such as registration module 1328, in gNB 1300 in FIG. 13. The gNB may further forward the request for the registration to the core network, e.g., as discussed at stage 13 of FIG. 9. A means for forwarding the request for the registration to the core network may be, e.g., the external interface 1306 and one or more processors 1304 with dedicated hardware or implementing executable code or software instructions in memory 1316 and/or medium 1318, such as registration module 1328, in gNB 1300 in FIG. 13. In one implementation, the gNB determines the more accurate location and the more reliable country for the UE for the request for the registration and may verify whether the UE is located in a country associated with the serving PLMN based on the more reliable country, e.g., as discussed at stage 10 of FIG. 10. A means for verifying whether the UE is located in a country associated with the serving PLMN based on the more reliable country may be, e.g., the one or more processors 1304 with dedicated hardware or implementing executable code or software instructions in memory 1316 and/or medium 1318, such as verification of country module 1326, in gNB 1300 in FIG. 13. In one implementation, the gNB may verify the UE is not located in the country associated with the serving PLMN based on the more reliable country and may send a message to the core network, the message indicating the UE is not located in the country associated with the serving PLMN, wherein the message enables the serving PLMN to deregister the UE, e.g., as described for stages 11-16 of FIG. 10. A means for verifying the UE is not located in the country associated with the serving PLMN based on the more reliable country may be, e.g., the one or more processors 1304 with dedicated hardware or implementing executable code or software instructions in memory 1316 and/or medium 1318, such as verification of country module 1326, in gNB 1300 in FIG. 13. A means for sending a message to the core network, the message indicating the UE is not located in the country associated with the serving PLMN, wherein the message enables the serving PLMN to deregister the UE may be, e.g., the external interface 1306 and one or more processors 1304 with dedicated hardware or implementing executable code or software instructions in memory 1316 and/or medium 1318, such as registration module 1328, in gNB 1300 in FIG. 13.

In one implementation, the gNB may further receive from the UE, following each of the plurality of times, second measurements of DL signals received by the UE from the serving radio cell and other radio cells, the DL signals for the other radio cells received by the UE from other communication satellites (e.g. SVs 102, 202 or 302), the other radio cells having moving coverage areas, e.g., as discussed at stages 6 and 9 of FIG. 10. In one implementation, the second measurements may comprise at least one of a Reference Signal Received Power (RSRP), Reference Signal Received Quality (RSRQ), Receive Time-Transmit Time difference (RxTx), Angle of Arrival (AOA), Reference Signal Time Difference (RSTD), differential Angle of Arrival (DAOA), or some combination of these. A means for receiving from the UE, following each of the plurality of times, second measurements of DL signals received by the UE from the serving radio cell and other radio cells, the DL signals for the other radio cells received by the UE from other communication satellites, the other radio cells having moving coverage areas may be, e.g., the external interface 1306 and one or more processors 1304 with dedicated hardware or implementing executable code or software instructions in memory 1316 and/or medium 1318, such as measurements module 1322, in gNB 1300 in FIG. 13. The gNB may determine the more accurate location and the more reliable country for the UE following all of the plurality of times based on the first measurements, the second measurements and the moving coverage areas for the serving radio cell and the other radio cells, e.g., as discussed at stages 8 and 10 of FIG. 10. A means for determining the more accurate location and the more reliable country for the UE following all of the plurality of times based on the first measurements, the second measurements and the moving coverage areas for the serving radio cell and the other radio cells may be, e.g., the one or more processors 1304 with dedicated hardware or implementing executable code or software instructions in memory 1316 and/or medium 1318, such as position determination module 1324, in gNB 1300 in FIG. 13.

FIG. 20 shows a flowchart of an example process flow 2000 for supporting satellite wireless access by a user equipment (e.g. a UE 105) to a serving public land mobile network (PLMN), performed by a satellite NodeB (gNB), such as the gNB 106/202/307 in FIGS. 1, 2, 3.

As illustrated, at block 2002, the gNB may receive via a communications satellite (e.g. an SV 102, 202 or 302) belonging to a plurality of communications satellites (e.g. SVs 102, 202 or 302) a registration request from the UE to the serving PLMN, e.g., as discussed at stage 10 of FIG. 9. A means for receiving via a communications satellite belonging to a plurality of communications satellites a registration request from the UE to the serving PLMN may be, e.g., the external interface 1306 and one or more processors 1304 with dedicated hardware or implementing executable code or software instructions in memory 1316 and/or medium 1318, such as measurements module 1322, in gNB 1300 in FIG. 13.

At block 2004, the gNB may perform a verification of whether the UE is in a country associated with the serving PLMN based on information provided by at least one of the UE, the communications satellite or the gNB, e.g., as discussed at stage 11 of FIG. 9.

For example, to verify the country, the gNB may obtain a location of the UE based on the information and map the location to a country, e.g., as discussed at stage 11 of FIG. 9. A means for obtaining a location of the UE based on the information and a means for mapping the location to a country may be, e.g., the one or more processors 1304 with dedicated hardware or implementing executable code or software instructions in memory 1316 and/or medium 1318, such as position determination module 1324, in gNB 1300 in FIG. 13. The information provided by the UE may include at least one of first measurements of Global Navigation Satellite System (GNSS) signals received by the UE (e.g. from SVs 190), second measurements of downlink (DL) signals received from the plurality of communication satellites, or a combination thereof. In one implementation, the second measurements comprise at least one of a Reference Signal Received Power (RSRP), Reference Signal Received Quality (RSRQ), Receive Time-Transmit Time difference (RxTx), Angle of Arrival (AOA), Reference Signal Time Difference (RSTD), differential Angle of Arrival (DAOA), or some combination of these.

A means for performing a verification of whether the UE is in a country associated with the serving PLMN based on information provided by at least one of the UE, the communications satellite or the gNB may be, e.g., the one or more processors 1304 with dedicated hardware or implementing executable code or software instructions in memory 1316 and/or medium 1318, such as verification of country module 1326, in gNB 1300 in FIG. 13.

At block 2006, the gNB provides the registration request to a first entity (e.g. an AMF 122) in a core network for the serving PLMN when the verification determines that the UE is in or may be in the country associated with the serving PLMN, e.g., as described for stage 13 of FIG. 9. A means for providing the registration request to a first entity in a core network for the serving PLMN when the verification determines that the UE is in or may be in the country associated with the serving PLMN may be, e.g., the external interface 1306 and one or more processors 1304 with dedicated hardware or implementing executable code or software instructions in memory 1316 and/or medium 1318, such as registration module 1328, in gNB 1300 in FIG. 13.

At block 2008, the gNB provides (to the first entity) with the registration request an indication of whether or not the gNB has verified that the UE is in the country associated with the serving PLMN, e.g. as described for stage 13 of FIG. 9. A means for providing with the registration request an indication of whether or not the gNB has verified that the UE is in the country associated with the serving PLMN may be, e.g., the external interface 1306 and one or more processors 1304 with dedicated hardware or implementing executable code or software instructions in memory 1316 and/or medium 1318, such as registration module 1328, in gNB 1300 in FIG. 13.

In one implementation, the indication is that the country is verified by the gNB to be the country associated with the serving PLMN, wherein the indication enables the first entity to accept the registration request without determining a location for the UE, e.g. as discussed for stage 13 in FIG. 9. In one implementation, the indication is that the country is not verified by the gNB to be the country associated with the serving PLMN, wherein the core network obtains a location of the UE to verify that the UE is located in the country associated with the serving PLMN, e.g. as discussed for stages 14-17 in FIG. 9. A means for providing the registration request to a first entity in a core network for the serving PLMN with an indication of whether the country is verified by the gNB to be in the country associated with the serving PLMN may be, e.g., the external interface 1306 and one or more processors 1304 with dedicated hardware or implementing executable code or software instructions in memory 1316 and/or medium 1318, such as registration module 1328, in gNB 1300 in FIG. 13.

FIG. 21 shows a flowchart of an example process flow 2100 for supporting satellite wireless access by a user equipment (e.g. a UE 105) to a serving public land mobile network (PLMN), performed by a first entity in a core network for the serving PLMN, such as the AMF 122 in FIGS. 1, 2, 3.

As illustrated, at block 2102, the first entity may receive a message from a satellite NodeB (gNB), such as a gNB 106, 202 or 307, the message containing a registration request from the UE and a first indication of whether a country of the UE is verified by the gNB to be a country associated with the serving PLMN, e.g., as discussed at stage 13 of FIG. 9. A means for receiving a message from a satellite NodeB (gNB), the message containing a registration request from the UE and a first indication of whether a country of the UE is verified by the gNB to be a country associated with the serving PLMN may be, e.g., the external interface 1402 and one or more processors 1404 with dedicated hardware or implementing executable code or software instructions in memory 1416 and/or medium 1418, such as the registration module 1422, in AMF 1400 in FIG. 14.

At block 2104, the first entity may accept the registration request if the first indication is that the country of the UE is verified by the gNB to be the country associated with the serving PLMN, e.g., as discussed at stage 13 of FIG. 9. A means for accepting the registration request if the first indication is that the country of the UE is verified by the gNB to be the country associated with the serving PLMN may be, e.g., the external interface 1402 and one or more processors 1404 with dedicated hardware or implementing executable code or software instructions in memory 1416 and/or medium 1418, such as the registration module 1422, in AMF 1400 in FIG. 14.

At block 2106, the first entity may instigate a location of the UE to verify that the UE is located in the country associated with the serving PLMN if the first indication is that the country of the UE is not verified by the gNB to be the country associated with the serving PLMN, e.g., as discussed at stage 14 of FIG. 9. A means for instigating a location of the UE to verify that the UE is located in the country associated with the serving PLMN if the first indication is that the country of the UE is not verified by the gNB to be the country associated with the serving PLMN may be, e.g., the external interface 1402 and one or more processors 1404 with dedicated hardware or implementing executable code or software instructions in memory 1416 and/or medium 1418, such as the location session module 1424, in AMF 1400 in FIG. 14.

In one implementation, the first indication may be that the country of the UE is verified to be the country associated with the serving PLMN, and the first entity may further send a registration accept message to the UE, e.g., as discussed at stages 13 and 19 of FIG. 9. A means for sending registration accept message to the UE may be, e.g., the external interface 1402 and one or more processors 1404 with dedicated hardware or implementing executable code or software instructions in memory 1416 and/or medium 1418, such as the registration module 1422, in AMF 1400 in FIG. 14.

In one implementation, the first indication is that the country of the UE is not verified to be the country associated with the serving PLMN, and the first entity may further send a location request to a second entity in the core network (e.g. an LMF 124) to determine the location of the UE, e.g., as discussed at stage 14 of FIG. 9. The first entity may further receive a response from the second entity, the response including at least one of the location of the UE, an indication of a country of the UE (which corresponds to a country in which the UE is located), or a second indication of whether a country of the UE is verified by the second entity to be the country associated with the serving PLMN, e.g., as discussed for stage 16 of FIG. 9. A means for sending a location request to a second entity in the core network to determine the location of the UE and a means for receiving a response from the second entity may be, e.g., the external interface 1402 and one or more processors 1404 with dedicated hardware or implementing executable code or software instructions in memory 1416 and/or medium 1418, such as the location session module 1424, in AMF 1400 in FIG. 14. A means for receiving a response from the second entity, the response comprising at least one of the location of the UE, an indication of a country of the UE, or a second indication of whether a country of the UE is verified by the second entity to be the country associated with the serving PLMN may be, e.g., the external interface 1402 and one or more processors 1404 with dedicated hardware or implementing executable code or software instructions in memory 1416 and/or medium 1418, such as the location session module 1424, in AMF 1400 in FIG. 14. In one implementation, the response may include the location of the UE and the first entity may further verify whether the location of the UE is in the country associated with the serving PLMN, e.g., as discussed for stage 17 of FIG. 9. In one implementation, the first entity may further include an indication in the location request that the UE has communication satellite access, wherein the indication enables the second entity to obtain the location of the UE using a UE assisted positioning method, a network based positioning method, or both, e.g., as discussed at stage 15 of FIG. 9. A means for including an indication in the location request that the UE has communication satellite access may be, e.g., the external interface 1402 and one or more processors 1404 with dedicated hardware or implementing executable code or software instructions in memory 1416 and/or medium 1418, such as the location session module 1424, in AMF 1400 in FIG. 14. For example, the UE assisted positioning method may be based on the transfer of measurements from the UE to the second entity for at least one of Global Navigation Satellite System (GNSS) signals (e.g. signals for SVs 190), communication satellite signals (e.g. signals for SVs 102, 202 and/or 302), or a combination thereof. By way of example, the first entity may be an Access and Mobility Management Function (e.g. an AMF 122) and the second entity may be a Location Management Function (e.g. an LMF 124).

FIG. 22 shows a flowchart of an example process flow 2200 for supporting satellite wireless access by a user equipment (e.g. a UE 105) to a serving public land mobile network (PLMN), performed by a first entity in a core network for the serving PLMN, such as the LMF 124 in FIGS. 1, 2, 3.

As illustrated, at block 2202, the first entity receives a location request from a second entity in the core network, wherein the location request indicates the UE has communication satellite access (e.g. to an SV 102, 202 or 302), e.g., as discussed at stage 14 of FIG. 9. The location request may be sent by the second entity to the first entity based on the second entity receiving a message from a serving satellite NodeB (gNB), such as a gNB 106, 202 or 307, the message comprising a registration request for the UE and an indication that a country of the UE (i.e. a country in which the UE is located) is not verified by the gNB to be a country associated with the serving PLMN. The first entity may be a Location Management Function (e.g. an LMF 124) and the second entity may be an Access and Mobility Management Function (e.g. an AMF 122). A means for receiving a location request from a second entity in the core network, wherein the location request indicates the UE has communication satellite access may be, e.g., the external interface 1502 and one or more processors 1504 with dedicated hardware or implementing executable code or software instructions in memory 1516 and/or medium 1518, such as the location request module 1522, in LMF 1500 in FIG. 15.

At block 2204, the first entity determines a location of the UE using at least one of a UE assisted positioning method and/or a network based positioning method, e.g., as discussed at stage 15 of FIG. 9 and stages 2-9 of FIG. 11. The UE assisted positioning method may be based on the transfer of measurements from the UE to the first entity for at least one of Global Navigation Satellite System (GNSS) signals (e.g. from SVs 190), communication satellite signals (e.g. from SVs 102, 202 or 302), or a combination thereof. A means for determining a location of the UE using at least one of a UE assisted positioning method and a network based positioning method may be, e.g., the external interface 1502 and one or more processors 1504 with dedicated hardware or implementing executable code or software instructions in memory 1516 and/or medium 1518, such as the location session module 1524, in LMF 1500 in FIG. 15

At block 2206, the first entity provides a location response to the second entity, the location response comprising the location, e.g., as discussed at stage 16 of FIG. 9 and stage 10 of FIG. 11. In one implementation, the location response enables the second entity to verify whether the UE is located in a country associated with the serving PLMN. In one implementation, the first entity may perform a verification that the UE is in a country associated with the serving PLMN based on the location and includes an indication in the location response indicating whether the UE is in the country associated with the serving PLMN, e.g., as discussed at stages 15 and 16 of FIG. 9. In one implementation, the first entity may determine a country in which the UE is located based on the location, and may include an indication of the country in the location response, e.g., as discussed at stages 15 and 16 of FIG. 9. A means for providing a location response to the second entity, the location response comprising the location may be, e.g., the external interface 1502 and one or more processors 1504 with dedicated hardware or implementing executable code or software instructions in memory 1516 and/or medium 1518, such as the location session module 1524, in LMF 1500 in FIG. 15. A means for performing a verification that the UE is in a country associated with the serving PLMN based on the location and a means for including an indication in the location response indicating whether the UE is in the country associated with the serving PLMN may be, e.g., the external interface 1502 and one or more processors 1504 with dedicated hardware or implementing executable code or software instructions in memory 1516 and/or medium 1518, such as the location session module 1524, in LMF 1500 in FIG. 15. A means for determining a country in which the UE is located based on the location may be, e.g., the one or more processors 1504 with dedicated hardware or implementing executable code or software instructions in memory 1516 and/or medium 1518, such as the location session module 1524, in LMF 1500 in FIG. 15. A means for including an indication of the country in the location response may be, e.g., the external interface 1502 and one or more processors 1504 with dedicated hardware or implementing executable code or software instructions in memory 1516 and/or medium 1518, such as the location session module 1524, in LMF 1500 in FIG. 15

Abbreviations used herein may be identified in Table 1 as follows:

TABLE 1

| | |
|---|---|
| EM | Emergency |
| ES | Earth Station |
| GEO | Geostationary Earth Orbit |
| ISL | Inter-Satellite Links |
| LEO | Low Earth Orbit |
| LI | Lawful Interception |
| MEO | Medium Earth Orbit |
| MNO | Mobile Network Operator |
| NGEO | Non-Geostationary Earth Orbiting |
| NTN | Non-Terrestrial Network |
| gNB | satellite Node B |
| SV | Space Vehicle |
| SVO | SV Operator |
| TA | Tracking Area |
| TAC | Tracking Area Code |
| TAI | Tracking Area Identity |
| WEA | Wireless Emergency Alerting |

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

Example dependent claims may include one or more of the following features. The wireless access type is Fifth Generation (5G), New Radio (NR) or Long Term Evolution (LTE). The location-related information comprises a Positioning Reference Signal (PRS). The increased quantity of location-related information comprises an increased PRS bandwidth, an increased frequency of PRS positioning occasions, an increased duration for a PRS positioning occasion, an increased number of separate PRS signals, a transmission of PRS using an uplink carrier frequency, or some combination thereof. The method may further include sending a second request for a muting of transmission to a second wireless node for the wireless access type, wherein the muting of transmission is based on avoiding radio interference with the broadcast of the increased quantity of location-related information by the first wireless node. The location-related information may comprise location assistance data. The location assistance data may comprise assistance data for DL-TDOA, assistance data for Assisted Global Navigation Satellite System (A-GNSS), assistance data for Real Time Kinematics (RTK), assistance data for Precise Point Positioning (PPP), assistance data for Differential GNSS (DGNSS), or any combination thereof. The increased quantity of location-related information may comprise an increased quantity of location assistance data, additional types of location assistance data, an increased frequency of broadcasting location assistance data, an increased repetition of the broadcasting of the location assistance data, or any combination thereof. The first request may be received from a third wireless node. The first request may be received from the UE. The first request may be received using a Radio Resource Control (RRC) protocol for the wireless access type. The first wireless node may be a serving wireless node for the UE based on the wireless access type. The method may further include sending a third request for the broadcast of an increased quantity of location-related information to a fourth wireless node for the wireless access type, wherein the third request is based on the first request. The method may further include sending a response to the UE, wherein the response comprises a confirmation of the broadcasting of the increased quantity of location-related information by the first wireless node. The method may further include receiving a fourth request from the UE for a termination of the broadcast of the increased quantity of location-related information, and terminating the broadcasting of the increased quantity of location-related information using the wireless access type based on the fourth request.

While some of the techniques, processes, and/or implementations presented herein may comply with all or part of one or more standards, such techniques, processes, and/or implementations may not, in some embodiments, comply with part or all of such one or more standards.

In view of this description embodiments may include different combinations of features. Implementation examples are described in the following numbered clauses:

Clause 1. A method performed by a user equipment (UE) for supporting satellite wireless access by the UE to a serving public land mobile network (PLMN), the method comprising: receiving broadcast signaling from a plurality of communications satellites for a plurality of radio cells supported by the plurality of communications satellites, the broadcast signaling for each radio cell in the plurality of radio cells including a positioning identifier (PID), wherein the PID is changed periodically according to a sequence of periodic intervals, wherein the sequence of periodic intervals occur within a lifetime of the each radio cell; obtaining measurements of the broadcast signaling for at least one radio cell of the plurality of radio cells; and sending the measurements and the PID for the at least one radio cell to a satellite NodeB (gNB), wherein the measurements and the PID enable a determination of a location and a country for the UE by the gNB.

Clause 2. The method of clause 1, wherein the measurements for the at least one radio cell comprise at least one of a Reference Signal Received Power (RSRP), Reference Signal Received Quality (RSRQ), Receive Time-Transmit Time difference (RxTx), Angle of Arrival (AOA), or some combination of these.

Clause 3. The method of either of clauses 1 or 2, wherein the measurements of the broadcast signaling are obtained for the at least one radio cell and a second radio cell for the plurality of radio cells, and further comprising: sending the measurements, the PID for the at least one radio cell and a PID for the second radio cell to the gNB, wherein the measurements, the PID for the at least one radio cell and the PID for the second radio cell enable the determination of the location and the country for the UE by the gNB.

Clause 4. The method of clause 3, wherein the measurements include a Reference Signal Time Difference (RSTD), a differential Angle of Arrival (DAOA), or both of these.

Clause 5. The method of any of clauses 1-4, wherein the PID is changed at least every 60 seconds.

Clause 6. The method of any of clauses 1-5, wherein the PID is a Physical Cell ID.

Clause 7. The method of any of clauses 1-6, wherein the measurements and the PID for the at least one radio cell are sent to the gNB in a first Radio Resource Control (RRC) message, wherein the first RRC message is sent to complete an establishment of an RRC Signaling Connection between the UE and the gNB.

Clause 8. The method of clause 7, further comprising: receiving security information from the gNB in a second RRC message; and ciphering the measurements in the first RRC message based on the security information.

Clause 9. The method of clause 8, wherein the first RRC message is an RRC Setup Complete message and the second RRC message is an RRC Setup message.

Clause 10. The method of any of clauses 7-9, further comprising: including a request for registration with a core network for the serving PLMN in the first RRC message, wherein the determination of the location and the country for the UE by the gNB enables a verification by the gNB that the UE is located in a country associated with the serving PLMN.

Clause 11. A user equipment (UE) configured to support satellite wireless access by the UE to a serving public land mobile network (PLMN), comprising: a wireless transceiver configured to wirelessly communicate with a communication satellite; at least one memory; at least one processor coupled to the wireless transceiver and the at least one memory, wherein the at least one processor is configured to: receive, via the wireless transceiver, broadcast signaling from a plurality of communications satellites for a plurality of radio cells supported by the plurality of communications satellites, the broadcast signaling for each radio cell including a positioning identifier (PID), wherein the PID is changed periodically according to a sequence of periodic intervals, wherein the sequence of periodic intervals occur within a lifetime of the each radio cell; obtain measurements of the broadcast signaling for at least one radio cell of the plurality of radio cells; and send, via the wireless transceiver, the measurements and the PID for the at least one radio cell to a satellite NodeB (gNB), wherein the measurements and the PID enable a determination of a location and a country for the UE by the gNB.

Clause 12. The UE of clause 11, wherein the measurements for the at least one radio cell comprise at least one of a Reference Signal Received Power (RSRP), Reference Signal Received Quality (RSRQ), Receive Time-Transmit Time difference (RxTx), Angle of Arrival (AOA), or some combination of these.

Clause 13. The UE of either of clauses 11 or 12, wherein the measurements of the broadcast signaling are obtained for the at least one radio cell and a second radio cell for the plurality of radio cells, and the at least one processor further configured to: send, via the wireless transceiver, the measurements, the PID for the at least one radio cell and a PID for the second radio cell to the gNB, wherein the measurements, the PID for the at least one radio cell and the PID for the second radio cell enable the determination of the location and the country for the UE by the gNB.

Clause 14. The UE of clause 13, wherein the measurements include a Reference Signal Time Difference (RSTD), a differential Angle of Arrival (DAOA), or both of these.

Clause 15. The UE of any of clauses 11-14, wherein the PID is changed at least every 60 seconds.

Clause 16. The UE of any of clauses 11-15, wherein the PID is a Physical Cell ID.

Clause 17. The UE of any of clauses 11-16, wherein the measurements and the PID for the at least one radio cell are sent to the gNB in a first Radio Resource Control (RRC) message, wherein the first RRC message is sent to complete an establishment of an RRC Signaling Connection between the UE and the gNB.

Clause 18. The UE of clause 17, the at least one processor further configured to: receive, via the wireless transceiver, security information from the gNB in a second RRC message; and cipher the measurements in the first RRC message based on the security information.

Clause 19. The UE of clause 18, wherein the first RRC message is an RRC Setup Complete message and the second RRC message is an RRC Setup message.

Clause 20. The UE of any of clauses 17-19, the at least one processor further configured to: include a request for registration with a core network for the serving PLMN in the first RRC message, wherein the determination of the location and the country for the UE by the gNB enables a verification by the gNB that the UE is located in a country associated with the serving PLMN.

Clause 21. A user equipment (UE) for supporting satellite wireless access by the UE to a serving public land mobile network (PLMN), comprising: means for receiving broadcast signaling from a plurality of communications satellites for a plurality of radio cells supported by the plurality of communications satellites, the broadcast signaling for each radio cell in the plurality of radio cells including a positioning identifier (PID), wherein the PID is changed periodically according to a sequence of periodic intervals, wherein the sequence of periodic intervals occur within a lifetime of the each radio cell; means for obtaining measurements of the broadcast signaling for at least one radio cell of the plurality of radio cells; and means for sending the measurements and the PID for the at least one radio cell to a satellite NodeB (gNB), wherein the measurements and the PID enable a determination of a location and a country for the UE by the gNB.

Clause 22. The UE of clause 21, wherein the measurements for the at least one radio cell comprise at least one of a Reference Signal Received Power (RSRP), Reference Signal Received Quality (RSRQ), Receive Time-Transmit Time difference (RxTx), Angle of Arrival (AOA), or some combination of these.

Clause 23. The UE of either of clauses 21 or 22, wherein the measurements of the broadcast signaling are obtained for the at least one radio cell and a second radio cell for the plurality of radio cells, and further comprising: means for sending the measurements, the PID for the at least one radio cell and a PID for the second radio cell to the gNB, wherein the measurements, the PID for the at least one radio cell and the PID for the second radio cell enable the determination of the location and the country for the UE by the gNB.

Clause 24. The UE of clause 23, wherein the measurements include a Reference Signal Time Difference (RSTD), a differential Angle of Arrival (DAOA), or both of these.

Clause 25. The UE of any of clauses 21-24, wherein the PID is changed at least every 60 seconds.

Clause 26. The UE of any of clauses 21-25, wherein the PID is a Physical Cell ID.

Clause 27. The UE of any of clauses 21-26, wherein the measurements and the PID for the at least one radio cell are sent to the gNB in a first Radio Resource Control (RRC) message, wherein the first RRC message is sent to complete an establishment of an RRC Signaling Connection between the UE and the gNB.

Clause 28. The UE of clause 27, further comprising: means for receiving security information from the gNB in a second RRC message; and means for ciphering the measurements in the first RRC message based on the security information.

Clause 29. The UE of clause 28, wherein the first RRC message is an RRC Setup Complete message and the second RRC message is an RRC Setup message.

Clause 30. The UE of any of clauses 27-29, further comprising: means for including a request for registration with a core network for the serving PLMN in the first RRC message, wherein the determination of the location and the country for the UE by the gNB enables a verification by the gNB that the UE is located in a country associated with the serving PLMN.

Clause 31. A non-transitory computer-readable storage medium including program code stored thereon, the program code is operable to configure at least one processor in a user equipment for supporting satellite wireless access by the UE to a serving public land mobile network (PLMN), the program code comprising instructions to: receive broadcast signaling from a plurality of communications satellites for a plurality of radio cells supported by the plurality of communications satellites, the broadcast signaling for each radio cell in the plurality of radio cells including a positioning identifier (PID), wherein the PID is changed periodically according to a sequence of periodic intervals, wherein the sequence of periodic intervals occur within a lifetime of the each radio cell; obtain measurements of the broadcast signaling for at least one radio cell of the plurality of radio cells; and send the measurements and the PID for the at least one radio cell to a satellite NodeB (gNB), wherein the measurements and the PID enable a determination of a location and a country for the UE by the gNB.

Clause 32. The non-transitory computer-readable storage medium of clause 31, wherein the measurements for the at least one radio cell comprise at least one of a Reference Signal Received Power (RSRP), Reference Signal Received Quality (RSRQ), Receive Time-Transmit Time difference (RxTx), Angle of Arrival (AOA), or some combination of these.

Clause 33. The non-transitory computer-readable storage medium of either of clauses 31 or 32, wherein the measurements of the broadcast signaling are obtained for the at least one radio cell and a second radio cell for the plurality of radio cells, and wherein the program code further comprises instructions to: send the measurements, the PID for the at least one radio cell and a PID for the second radio cell to the gNB, wherein the measurements, the PID for the at least one radio cell and the PID for the second radio cell enable the determination of the location and the country for the UE by the gNB.

Clause 34. The non-transitory computer-readable storage medium of clause 33, wherein the measurements include a Reference Signal Time Difference (RSTD), a differential Angle of Arrival (DAOA), or both of these.

Clause 35. The non-transitory computer-readable storage medium of any of clauses 31-34, wherein the PID is changed at least every 60 seconds.

Clause 36. The non-transitory computer-readable storage medium of any of clauses 31-35, wherein the PID is a Physical Cell ID.

Clause 37. The non-transitory computer-readable storage medium of any of clauses 31-36, wherein the measurements and the PID for the at least one radio cell are sent to the gNB in a first Radio Resource Control (RRC) message, wherein the first RRC message is sent to complete an establishment of an RRC Signaling Connection between the UE and the gNB.

Clause 38. The non-transitory computer-readable storage medium of clause 37, wherein the program code further comprises instructions to: receive security information from the gNB in a second RRC message; and cipher the measurements in the first RRC message based on the security information.

Clause 39. The non-transitory computer-readable storage medium of clause 38, wherein the first RRC message is an RRC Setup Complete message and the second RRC message is an RRC Setup message.

Clause 40. The non-transitory computer-readable storage medium of any of clauses 37-39, wherein the program code further comprises instructions to: include a request for registration with a core network for the serving PLMN in the first RRC message, wherein the determination of the location and the country for the UE by the gNB enables a verification by the gNB that the UE is located in a country associated with the serving PLMN.

Clause 41. A method performed by a satellite NodeB (gNB) for supporting satellite wireless access by a user equipment (UE) to a serving public land mobile network (PLMN), the method comprising: receiving from the UE measurements of broadcast signaling for a plurality of radio cells and a positioning identifier (PID) for each radio cell of the plurality of radio cells, the broadcast signaling received by the UE from a plurality of communications satellites for the plurality of radio cells, wherein the PID for the each radio cell is changed periodically according to a sequence of periodic intervals, wherein the sequence of periodic intervals occur within a lifetime of the each radio cell; and determining a location and a country for the UE based on the measurements and the PID for the each radio cell.

Clause 42. The method of clause 41, wherein the measurements comprise at least one of a Reference Signal Received Power (RSRP), Reference Signal Received Quality (RSRQ), Receive Time-Transmit Time difference (RxTx), Angle of Arrival (AOA), Reference Signal Time Difference (RSTD), differential Angle of Arrival (DAOA), or some combination of these.

Clause 43. The method of either of clauses 41 or 42, wherein the PID for the each radio cell is a Physical Cell ID.

Clause 44. The method of any of clauses 41-43, wherein the plurality of radio cells include at least one radio cell controlled by the gNB and further comprising: assigning a numeric value to a PID for the at least one radio cell; and broadcasting the PID in the at least one radio cell.

Clause 45. The method of clause 44, wherein the numeric value for the PID is a pseudo-random value.

Clause 46. The method of any of clauses 44-45, wherein the numeric value for the PID is changed at least every 60 seconds.

Clause 47. The method of any of clauses 41-46, wherein the measurements of the broadcast signaling and the PID for the each radio cell are received from the UE in a first Radio Resource Control (RRC) message, wherein the first RRC message is sent by the UE to complete an establishment of an RRC Signaling Connection between the UE and the gNB.

Clause 48. The method of clause 47, further comprising: sending security information to the UE in a second RRC message, wherein the security information enables ciphering of the measurements by the UE in the first RRC message; and deciphering the measurements received in the first RRC message, based on the security information.

Clause 49. The method of clause 48, wherein the first RRC message is an RRC Setup Complete message and the second RRC message is an RRC Setup message.

Clause 50. The method of any of clauses 47-49, further comprising: receiving from the UE a request for a UE registration with a core network for the serving PLMN in the first RRC message; and verifying that the UE is located in a country associated with the serving PLMN based on the location and the country determined for the UE.

Clause 51. The method of clause 50, further comprising providing the request for the UE registration with the core network to an entity in the core network with an indication of whether the gNB verified that the UE is located in the country associated with the serving PLMN.

Clause 52. A satellite NodeB (gNB) configured to support satellite wireless access by a user equipment (UE) to a serving public land mobile network (PLMN), comprising: an external interface configured to communicate with network entities; at least one memory; at least one processor coupled to the external interface and the at least one memory, wherein the at least one processor is configured to: receive, via the external interface, from the UE measurements of broadcast signaling for a plurality of radio cells and a positioning identifier (PID) for each radio cell of the plurality of radio cells, the broadcast signaling received by the UE from a plurality of communications satellites for the plurality of radio cells, wherein the PID for the each radio cell is changed periodically according to a sequence of periodic intervals, wherein the sequence of periodic intervals occur within a lifetime of the each radio cell; and determine a location and a country for the UE based on the measurements and the PID for the each radio cell.

Clause 53. The gNB of clause 52, wherein the measurements comprise at least one of a Reference Signal Received Power (RSRP), Reference Signal Received Quality (RSRQ), Receive Time-Transmit Time difference (RxTx), Angle of Arrival (AOA), Reference Signal Time Difference (RSTD), differential Angle of Arrival (DAOA), or some combination of these.

Clause 54. The gNB of either of clauses 52 or 53, wherein the PID for the each radio cell is a Physical Cell ID.

Clause 55. The gNB of any of clauses 52-54, wherein the plurality of radio cells include at least one radio cell controlled by the gNB and the at least one processor further configured to: assign a numeric value to a PID for the at least one radio cell; and broadcast, via the external interface, the PID in the at least one radio cell.

Clause 56. The gNB of clause 55, wherein the numeric value for the PID is a pseudo-random value.

Clause 57. The gNB of any of clauses 55-56, wherein the numeric value for the PID is changed at least every 60 seconds.

Clause 58. The gNB of any of clauses 52-57, wherein the measurements of the broadcast signaling and the PID for the each radio cell are received from the UE in a first Radio Resource Control (RRC) message, wherein the first RRC message is sent by the UE to complete an establishment of an RRC Signaling Connection between the UE and the gNB.

Clause 59. The gNB of clause 58, the at least one processor further configured to: send, via the external interface, security information to the UE in a second RRC message, wherein the security information enables ciphering of the measurements by the UE in the first RRC message; and decipher the measurements received in the first RRC message, based on the security information.

Clause 60. The gNB of clause 59, wherein the first RRC message is an RRC Setup Complete message and the second RRC message is an RRC Setup message.

Clause 61. The gNB of any of clauses 58-60, the at least one processor further configured to: receive from the UE, via the external interface, a request for a UE registration with a core network for the serving PLMN in the first RRC message; and verify that the UE is located in a country associated with the serving PLMN based on the location and the country determined for the UE.

Clause 62. The gNB of clause 61, the at least one processor further configured to provide, via the external interface, the request for the UE registration with the core network to an entity in the core network with an indication of whether the gNB verified that the UE is located in the country associated with the serving PLMN.

Clause 63. A satellite NodeB (gNB) for supporting satellite wireless access by a user equipment (UE) to a serving public land mobile network (PLMN), comprising: means for receiving from the UE measurements of broadcast signaling for a plurality of radio cells and a positioning identifier (PID) for each radio cell of the plurality of radio cells, the broadcast signaling received by the UE from a plurality of communications satellites for the plurality of radio cells, wherein the PID for the each radio cell is changed periodically according to a sequence of periodic intervals, wherein the sequence of periodic intervals occur within a lifetime of the each radio cell; and means for determining a location and a country for the UE based on the measurements and the PID for the each radio cell.

Clause 64. The gNB of clause 63, wherein the measurements comprise at least one of a Reference Signal Received Power (RSRP), Reference Signal Received Quality (RSRQ), Receive Time-Transmit Time difference (RxTx), Angle of Arrival (AOA), Reference Signal Time Difference (RSTD), differential Angle of Arrival (DAOA), or some combination of these.

Clause 65. The gNB of either of clauses 63 or 64, wherein the PID for the each radio cell is a Physical Cell ID.

Clause 66. The gNB of any of clauses 63-65, wherein the plurality of radio cells include at least one radio cell controlled by the gNB and further comprising: means for assigning a numeric value to a PID for the at least one radio cell; and means for broadcasting the PID in the at least one radio cell.

Clause 67. The gNB of clause 66, wherein the numeric value for the PID is a pseudo-random value.

Clause 68. The gNB of any of clauses 66-67, wherein the numeric value for the PID is changed at least every 60 seconds.

Clause 69. The gNB of any of clauses 63-68, wherein the measurements of the broadcast signaling and the PID for the each radio cell are received from the UE in a first Radio Resource Control (RRC) message, wherein the first RRC message is sent by the UE to complete an establishment of an RRC Signaling Connection between the UE and the gNB.

Clause 70. The gNB of clause 69, further comprising: means for sending security information to the UE in a second RRC message, wherein the security information enables ciphering of the measurements by the UE in the first RRC message; and means for deciphering the measurements received in the first RRC message, based on the security information.

Clause 71. The gNB of clause 70, wherein the first RRC message is an RRC Setup Complete message and the second RRC message is an RRC Setup message.

Clause 72. The gNB of any of clauses 69-71, further comprising: means for receiving from the UE a request for a UE registration with a core network for the serving PLMN in the first RRC message; and means for verifying that the UE is located in a country associated with the serving PLMN based on the location and the country determined for the UE.

Clause 73. The gNB of clause 72, further comprising means for providing the request for the UE registration with the core network to an entity in the core network with an indication of whether the gNB verified that the UE is located in the country associated with the serving PLMN.

Clause 74. A non-transitory computer-readable storage medium including program code stored thereon, the program code is operable to configure at least one processor in a satellite NodeB (gNB) for supporting satellite wireless access by a user equipment (UE) to a serving public land mobile network (PLMN), the program code comprising instructions to: receive from the UE measurements of broadcast signaling for a plurality of radio cells and a positioning identifier (PID) for each radio cell of the plurality of radio cells, the broadcast signaling received by the UE from a plurality of communications satellites for the plurality of radio cells, wherein the PID for the each radio cell is changed periodically according to a sequence of periodic intervals, wherein the sequence of periodic intervals occur within a lifetime of the each radio cell; and determine a location and a country for the UE based on the measurements and the PID for the each radio cell.

Clause 75. The non-transitory computer-readable storage medium of clause 74, wherein the measurements comprise at least one of a Reference Signal Received Power (RSRP), Reference Signal Received Quality (RSRQ), Receive Time-Transmit Time difference (RxTx), Angle of Arrival (AOA), Reference Signal Time Difference (RSTD), differential Angle of Arrival (DAOA), or some combination of these.

Clause 76. The non-transitory computer-readable storage medium of either of clauses 74 or 75, wherein the PID for the each radio cell is a Physical Cell ID.

Clause 77. The non-transitory computer-readable storage medium of any of clauses 74-76, wherein the plurality of radio cells include at least one radio cell controlled by the gNB and wherein the program code further comprises instructions to: assign a numeric value to a PID for the at least one radio cell; and broadcast the PID in the at least one radio cell.

Clause 78. The non-transitory computer-readable storage medium of clause 77, wherein the numeric value for the PID is a pseudo-random value.

Clause 79. The non-transitory computer-readable storage medium of any of clauses 77-78, wherein the numeric value for the PID is changed at least every 60 seconds.

Clause 80. The non-transitory computer-readable storage medium of any of clauses 74-79, wherein the measurements of the broadcast signaling and the PID for the each radio cell are received from the UE in a first Radio Resource Control (RRC) message, wherein the first RRC message is sent by the UE to complete an establishment of an RRC Signaling Connection between the UE and the gNB.

Clause 81. The non-transitory computer-readable storage medium of clause 80, wherein the program code further comprises instructions to: send security information to the UE in a second RRC message, wherein the security information enables ciphering of the measurements by the UE in the first RRC message; and decipher the measurements received in the first RRC message, based on the security information.

Clause 82. The non-transitory computer-readable storage medium of clause 81, wherein the first RRC message is an RRC Setup Complete message and the second RRC message is an RRC Setup message.

Clause 83. The non-transitory computer-readable storage medium of any of clauses 80-82, wherein the program code further comprises instructions to: receive from the UE a request for a UE registration with a core network for the serving PLMN in the first RRC message; and verify that the UE is located in a country associated with the serving PLMN based on the location and the country determined for the UE.

Clause 84. The non-transitory computer-readable storage medium of clause 83, wherein the program code further comprises instructions to provide the request for the UE registration with the core network to an entity in the core network with an indication of whether the gNB verified that the UE is located in the country associated with the serving PLMN.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method performed by a user equipment (UE) for supporting satellite wireless access by the UE to a serving public land mobile network (PLMN), the method comprising:
receiving broadcast signaling from a plurality of communications satellites for a plurality of radio cells supported by the plurality of communications satellites, the broadcast signaling for each radio cell in the plurality of radio cells including a positioning identifier (PID), wherein the PID is changed periodically according to a sequence of periodic intervals, wherein the sequence of periodic intervals occur within a lifetime of the each radio cell;
obtaining measurements of the broadcast signaling for at least one radio cell of the plurality of radio cells; and
sending the measurements and the PID for the at least one radio cell to a satellite NodeB (gNB), wherein the measurements and the PID enable a determination of a location and a country for the UE by the gNB.

2. The method of claim 1, wherein the measurements for the at least one radio cell comprise at least one of a Reference Signal Received Power (RSRP), Reference Signal Received Quality (RSRQ), Receive Time-Transmit Time difference (RxTx), Angle of Arrival (AOA), or some combination of these.

3. The method of claim 1, wherein the measurements of the broadcast signaling are obtained for the at least one radio cell and a second radio cell for the plurality of radio cells, and further comprising:
sending the measurements, the PID for the at least one radio cell and a PID for the second radio cell to the gNB, wherein the measurements, the PID for the at least one radio cell and the PID for the second radio cell enable the determination of the location and the country for the UE by the gNB.

4. The method of claim 1, wherein the PID is changed at least every 60 seconds.

5. The method of claim 1, wherein the PID is a Physical Cell ID.

6. The method of claim 1, wherein the measurements and the PID for the at least one radio cell are sent to the gNB in a first Radio Resource Control (RRC) message, wherein the first RRC message is sent to complete an establishment of an RRC Signaling Connection between the UE and the gNB.

7. The method of claim 6, further comprising:
including a request for registration with a core network for the serving PLMN in the first RRC message, wherein the determination of the location and the country for the UE by the gNB enables a verification by the gNB that the UE is located in a country associated with the serving PLMN.

8. A user equipment (UE) configured to support satellite wireless access by the UE to a serving public land mobile network (PLMN), comprising:
a wireless transceiver configured to wirelessly communicate with a communication satellite;
at least one memory;
at least one processor coupled to the wireless transceiver and the at least one memory, wherein the at least one processor is configured to:
receive, via the wireless transceiver, broadcast signaling from a plurality of communications satellites for a plurality of radio cells supported by the plurality of communications satellites, the broadcast signaling for each radio cell including a positioning identifier (PID), wherein the PID is changed periodically according to a sequence of periodic intervals, wherein the sequence of periodic intervals occur within a lifetime of the each radio cell;
obtain measurements of the broadcast signaling for at least one radio cell of the plurality of radio cells; and
send, via the wireless transceiver, the measurements and the PID for the at least one radio cell to a satellite NodeB (gNB), wherein the measurements and the PID enable a determination of a location and a country for the UE by the gNB.

9. The UE of claim 8, wherein the measurements for the at least one radio cell comprise at least one of a Reference Signal Received Power (RSRP), Reference Signal Received Quality (RSRQ), Receive Time-Transmit Time difference (RxTx), Angle of Arrival (AOA), or some combination of these.

10. The UE of claim 8, wherein the measurements of the broadcast signaling are obtained for the at least one radio cell and a second radio cell for the plurality of radio cells, and the at least one processor further configured to:
send, via the wireless transceiver, the measurements, the PID for the at least one radio cell and a PID for the second radio cell to the gNB, wherein the measurements, the PID for the at least one radio cell and the PID for the second radio cell enable the determination of the location and the country for the UE by the gNB.

11. The UE of claim 8, wherein the PID is changed at least every 60 seconds.

12. The UE of claim 8, wherein the PID is a Physical Cell ID.

13. The UE of claim 8, wherein the measurements and the PID for the at least one radio cell are sent to the gNB in a first Radio Resource Control (RRC) message, wherein the first RRC message is sent to complete an establishment of an RRC Signaling Connection between the UE and the gNB.

14. The UE of claim 13, the at least one processor further configured to:
include a request for registration with a core network for the serving PLMN in the first RRC message, wherein the determination of the location and the country for the UE by the gNB enables a verification by the gNB that the UE is located in a country associated with the serving PLMN.

15. A method performed by a satellite NodeB (gNB) for supporting satellite wireless access by a user equipment (UE) to a serving public land mobile network (PLMN), the method comprising:
receiving from the UE measurements of broadcast signaling for a plurality of radio cells and a positioning identifier (PID) for each radio cell of the plurality of radio cells, the broadcast signaling received by the UE from a plurality of communications satellites for the plurality of radio cells, wherein the PID for the each radio cell is changed periodically according to a sequence of periodic intervals, wherein the sequence of periodic intervals occur within a lifetime of the each radio cell; and
determining a location and a country for the UE based on the measurements and the PID for the each radio cell.

16. The method of claim 15, wherein the measurements comprise at least one of a Reference Signal Received Power (RSRP), Reference Signal Received Quality (RSRQ), Receive Time-Transmit Time difference (RxTx), Angle of Arrival (AOA), Reference Signal Time Difference (RSTD), differential Angle of Arrival (DAOA), or some combination of these.

17. The method of claim 15, wherein the PID for the each radio cell is a Physical Cell ID.

18. The method of claim 15, wherein the plurality of radio cells include at least one radio cell controlled by the gNB and further comprising:
assigning a numeric value to a PID for the at least one radio cell; and
broadcasting the PID in the at least one radio cell.

19. The method of claim 18, wherein the numeric value for the PID is changed at least every 60 seconds.

20. The method of claim 15, wherein the measurements of the broadcast signaling and the PID for the each radio cell are received from the UE in a first Radio Resource Control (RRC) message, wherein the first RRC message is sent by the UE to complete an establishment of an RRC Signaling Connection between the UE and the gNB.

21. The method of claim 20, further comprising:
receiving from the UE a request for a UE registration with a core network for the serving PLMN in the first RRC message; and
verifying that the UE is located in a country associated with the serving PLMN based on the location and the country determined for the UE.

22. The method of claim 21, further comprising providing the request for the UE registration with the core network to an entity in the core network with an indication of whether the gNB verified that the UE is located in the country associated with the serving PLMN.

23. A satellite NodeB (gNB) configured to support satellite wireless access by a user equipment (UE) to a serving public land mobile network (PLMN), comprising:
an external interface configured to communicate with network entities;
at least one memory;
at least one processor coupled to the external interface and the at least one memory, wherein the at least one processor is configured to:
receive, via the external interface, from the UE measurements of broadcast signaling for a plurality of radio cells and a positioning identifier (PID) for each radio cell of the plurality of radio cells, the broadcast signaling received by the UE from a plurality of communications satellites for the plurality of radio cells, wherein the PID for the each radio cell is changed periodically according to a sequence of periodic intervals, wherein the sequence of periodic intervals occur within a lifetime of the each radio cell; and
determine a location and a country for the UE based on the measurements and the PID for the each radio cell.

24. The gNB of claim 23, wherein the measurements comprise at least one of a Reference Signal Received Power (RSRP), Reference Signal Received Quality (RSRQ), Receive Time-Transmit Time difference (RxTx), Angle of Arrival (AOA), Reference Signal Time Difference (RSTD), differential Angle of Arrival (DAOA), or some combination of these.

25. The gNB of claim 23, wherein the PID for the each radio cell is a Physical Cell ID.

26. The gNB of claim 23, wherein the plurality of radio cells include at least one radio cell controlled by the gNB and the at least one processor further configured to:
assign a numeric value to a PID for the at least one radio cell; and
broadcast, via the external interface, the PID in the at least one radio cell.

27. The gNB of claim 26, wherein the numeric value for the PID is changed at least every 60 seconds.

28. The gNB of claim 23, wherein the measurements of the broadcast signaling and the PID for the each radio cell are received from the UE in a first Radio Resource Control (RRC) message, wherein the first RRC message is sent by the UE to complete an establishment of an RRC Signaling Connection between the UE and the gNB.

29. The gNB of claim 28, the at least one processor further configured to:
receive from the UE, via the external interface, a request for a UE registration with a core network for the serving PLMN in the first RRC message; and
verify that the UE is located in a country associated with the serving PLMN based on the location and the country determined for the UE.

30. The gNB of claim 29, the at least one processor further configured to provide, via the external interface, the request for the UE registration with the core network to an entity in the core network with an indication of whether the gNB verified that the UE is located in the country associated with the serving PLMN.

* * * * *